US012173875B2

(12) United States Patent
Chen

(10) Patent No.: US 12,173,875 B2
(45) Date of Patent: Dec. 24, 2024

(54) DECORATIVE LIGHTING WITH REINFORCED WIRING

(71) Applicant: Willis Electric Co., Ltd., Taipei (TW)

(72) Inventor: Johnny Chen, Taipei (TW)

(73) Assignee: Willis Electric Co., Ltd., Taipei (TW)

( * ) Notice: Subject to any disclaimer, the term of this patent is extended or adjusted under 35 U.S.C. 154(b) by 0 days.

(21) Appl. No.: 18/487,793

(22) Filed: Oct. 16, 2023

(65) Prior Publication Data

US 2024/0035651 A1 Feb. 1, 2024

Related U.S. Application Data

(63) Continuation of application No. 17/490,665, filed on Sep. 30, 2021, now Pat. No. 11,852,327, which is a continuation of application No. 16/983,288, filed on Aug. 3, 2020, now Pat. No. 11,149,929, which is a continuation of application No. 16/751,056, filed on Jan. 23, 2020, now abandoned, which is a continuation of application No. 16/241,745, filed on Jan. 7, 2019, now Pat. No. 10,578,289, which is a continuation of application No. 15/588,114, filed on May 5, 2017, now Pat. No. 10,222,037, which is a continuation of application No. 14/886,344, filed on Oct. 19, 2015, now Pat. No. 9,671,097, which is a continuation of application No. 14/627,427, filed on Feb. 20, 2015, now Pat. No. 9,243,788, which is a (Continued)

(51) Int. Cl.

*F21V 23/00* (2015.01)
*F21S 4/10* (2016.01)
*F21S 4/15* (2016.01)
*H01B 7/04* (2006.01)
*H01B 7/18* (2006.01)
*F21W 121/00* (2006.01)
*F21W 121/04* (2006.01)
*F21Y 105/10* (2016.01)
*F21Y 105/12* (2016.01)

(52) U.S. Cl.

CPC .............. *F21V 23/001* (2013.01); *F21S 4/10* (2016.01); *F21S 4/15* (2016.01); *H01B 7/04* (2013.01); *H01B 7/18* (2013.01); *F21W 2121/00* (2013.01); *F21W 2121/04* (2013.01); *F21Y 2105/10* (2016.08); *F21Y 2105/12* (2016.08)

(58) Field of Classification Search

CPC ............ G02B 23/2461; G02B 27/1006; G02B 27/141; G02B 23/26; A61B 1/00105; A61B 1/00126; A61B 1/0638; A61B 1/0646; A61B 1/0669; A61B 1/0684; A61B 2090/3937; H04N 5/2256; H04N 2005/2255

See application file for complete search history.

(56) References Cited

U.S. PATENT DOCUMENTS 6,559,385 B1 * 5/2003 Johnson ................. H01B 5/105 174/128.1
2007/0230174 A1 * 10/2007 Hicks ...................... F21S 13/14 362/249.16

* cited by examiner

*Primary Examiner* — Elmito Breval
(74) *Attorney, Agent, or Firm* — Christensen, Fonder, Dardi & Herbert PLLC; John P. Fonder

(57) ABSTRACT

A decorative light string for draping on an external structure, comprising a plurality of decorative-lighting wires, each of the plurality of decorative-lighting wires including an outer insulation layer, one or more conductors, and one or more reinforcing strands; and a plurality of lamps electrically connected to one another by the plurality of decorative-lighting wires.

24 Claims, 28 Drawing Sheets

Related U.S. Application Data continuation of application No. 14/485,911, filed on Sep. 15, 2014, now Pat. No. 9,140,438, which is a continuation-in-part of application No. 14/328,221, filed on Jul. 10, 2014, now Pat. No. 9,157,588.

(60) Provisional application No. 61/877,854, filed on Sep. 13, 2013.

DECORATIVE LIGHTING WITH REINFORCED WIRING

CROSS-REFERENCE TO RELATED APPLICATIONS

The present application is a continuation of U.S. patent application Ser. No. 17/490,665, filed Sep. 30, 2021, which is a continuation of U.S. patent application Ser. No. 16/983,288, filed Aug. 3, 2020, now U.S. Pat. No. 11,149,929, issued Oct. 19, 2021, which is a continuation of U.S. patent application Ser. No. 16/751,056, filed Jan. 23, 2020, which is a continuation of U.S. patent application Ser. No. 16/241,745, filed Jan. 7, 2019, now U.S. Pat. No. 10,578,289, issued Mar. 3, 2020, which is a continuation of U.S. patent application Ser. No. 15/588,114, filed May 5, 2017, now U.S. Pat. No. 10,222,037, issued Mar. 5, 2019, which is a continuation of U.S. patent application Ser. No. 14/886,344, filed Oct. 19, 2015, now U.S. Pat. No. 9,671,097, issued Jun. 6, 2017, which is a continuation of U.S. patent application Ser. No. 14/627,427, filed on Feb. 20, 2015, now U.S. Pat. No. 9,243,788, issued Jan. 26, 2016, which is a continuation of U.S. patent application Ser. No. 14/485,911, filed Sep. 15, 2014, now U.S. Pat. No. 9,140,438, issued Sep. 22, 2015, which is a continuation-in-part of U.S. patent application Ser. No. 14/328,221, filed Jul. 10, 2014, now U.S. Pat. No. 9,157,588, issued Oct. 13, 2015, which claims the benefit of U.S. Provisional Application No. 61/877,854, filed Sep. 13, 2013, all of which are incorporated herein by reference in their entireties.

FIELD OF THE INVENTION

The present invention is generally directed to decorative lighting. More specifically, the present invention is directed to decorative lighting wiring, decorative light strings, lighted trees, lighted sculptures, and lamp assemblies having reinforced wiring, as well as methods of manufacturing and using same.

BACKGROUND OF THE INVENTION

Decorative lighting, such as seasonal holiday lighting, generally includes decorative light strings, lighted trees, lighted decorative sculptures and other such lights and lighted objects. Such decorative lighting often comprises one or more strings of lights constructed of multiple wires, lamp assemblies and an electrical connector or power plug. Wires used in decorative lighting typically include an electrical conductor surrounded by an insulating material. The electrical conductor usually comprises multiple, individual strands of copper conductors. For example, a typical 50 light string of incandescent Christmas lights may be constructed using 22 AWG wire that includes 16 individual copper strands twisted together and covered with an insulating polymer material, such as polyvinyl chloride (PVC).

To ensure safety, such wiring as used in decorative lighting applications may be required to meet various standards and requirements relating to both electrical and mechanical performance. For example, wires may be subject to dielectric testing, tensile-strength testing, breakage testing, cold temperature bending, flammability testing, and so on. From a mechanical perspective, some important and often-tested wire characteristics include tensile strength, breakage strength, and elongation. Not only does a decorative light string need to be able to conduct electricity safely, but it also needs to withstand physical abuse with limited risk of breakage. Breakage, including breakage of any portion of the wiring, could result in shock or electrocution to persons coming into contact with the decorative lighting or structures touching the decorative lighting, such as a tree.

One simple way to increase the mechanical integrity of wiring is to rely on relatively large gauge wiring. For example, while a 22 AWG wire may be sufficient to safely conduct the expected electrical current of a light string, a 20 AWG wire may actually be used to increase mechanical strength. However, while simply increasing the wire gauge may provide mechanical strength, the material cost to use oversized wire generally outweighs the resulting benefits.

Another known and commonly-used method of increasing mechanical strength of a decorative light string is to twist pairs of wires together. While this technique does not increase the mechanical strength of an individual wire, twisting two wires together, such as a first polarity wire and a second polarity wire, mechanically strengthens the overall decorative light string along its length. Such a known arrangement is depicted in FIG. 1, which illustrates a typical "twisted-pair" light string. In the light string of FIG. 1, the wires L1, L2, and L3 of the light string are twisted along the length of the light string. As such, if opposing forces were applied to the light string, for example pulling power plug 1 and end connector 2 in opposite directions, the twisted pairs of wires are stronger than single wires, and the likelihood of a wire breaking is decreased.

Referring to FIG. 2, a portion of a prior art net light is depicted. The net light depicts a second known method for strengthening decorative light strings, namely, wrapping a non-conductive, reinforcing strand about each individual conductive wire or wire segment. For example, the prior art net light of FIG. 2 includes non-conductive reinforcing strands 211 and 212 wrapped or twisted about multiple individual wires 13 that connect the various lamp assemblies 12. Should a portion of the net light be subject to pulling, the reinforcing strands serve to diminish the possibility that any individual wire will break.

SUMMARY

Embodiments of the invention resolve the deficiencies of known decorative lighting wiring, decorative light strings, lighted trees, lighted decorative sculptures and other such lights and lighted objects.

In an embodiment, the invention comprises a reinforced wire for decorative lighting, the wire defining a central longitudinal wire axis and comprising: a longitudinally-extending reinforcing strand, the reinforcing strand comprising one or more fibers comprising a polymer material and defining a reinforcing-strand axis; a plurality of conductor strands wound about the reinforcing strand, each of the plurality of conductor strands defining a conductor strand axis; an outer insulating layer adjacent to, and covering, one or more of the conductor strands; wherein the reinforcing strand in cross section normal to the wire axis defines an asymmetrical shape.

In another embodiment, the invention comprises a reinforced wire for decorative lighting, the wire defining a central longitudinal wire axis and comprising: a longitudinally-extending reinforcing strand, the reinforcing strand comprising a polymer material and defining a central reinforcing-strand axis; a plurality of conductor strands wound about the reinforcing strand, each of the plurality of conductor strands defining a central conductor-strand axis; an outer insulating layer adjacent to, and covering, one or more of the conductor strands; wherein the central reinforcing-strand arranged within the wire such that the central reinforcing-strand axis is offset from the wire axis and the plurality of conductor strands are asymmetrically wound about the reinforcing strand.

Embodiments also include various reinforced decorative lighting assemblies, including an assembly comprising: a first lamp assembly including a first lamp holder and a first lamp element, a second lamp assembly including a second lamp holder and a second lamp element, and a first reinforced decorative-lighting wire having a first end and a second end, the first reinforced decorative-lighting wire defining a central longitudinal wire axis and including: a longitudinally-extending reinforcing strand, the reinforcing strand comprising one or more fibers comprising a polymer material and defining a reinforcing-strand axis; a plurality of conductor strands helically twisted about the reinforcing strand; an outer insulating layer adjacent to, and covering, one or more of the conductor strands; wherein the reinforcing strand in cross section normal to the wire axis defines an asymmetrical shape, and the first end of the first reinforced decorative-lighting wire is received by the first lamp holder and is in electrical connection with the first lamp element, and the second end of the first reinforced decorative-lighting wire is received by the second lamp holder, and is in electrical connection with the second lamp element.

Another embodiment includes a reinforced decorative lighting assembly, comprising: a first power wire having a plurality of conductor strands and having a first ampacity; a second power wire having a plurality of conductor strand; a plurality of lamp assemblies including a plurality of lamp elements, the plurality of lamp assemblies including a first lamp assembly in electrical connection with the first power wire, and a second lamp assembly in electrical connection with the second power wire; a plurality of reinforced decorative-lighting wires electrically connecting the plurality of lamp elements, each of the reinforced decorative-lighting wires having a second ampacity and including: a longitudinally-extending reinforcing strand, the reinforcing strand comprising one or more fibers comprising a polymer material and defining a reinforcing-strand axis; a plurality of conductor strands helically twisted with the reinforcing strand; an outer insulating layer adjacent to, and covering, one or more of the conductor strands; wherein the first ampacity of the first power wire is greater than the second ampacity of the reinforced decorative lighting wire.

Such embodiments may include reinforced decorative light strings, trees, sculptures, and other such assemblies.

Other embodiments include methods of manufacturing embodiments of reinforced decorative lighting wiring and assemblies, as described herein.

BRIEF DESCRIPTION OF THE FIGURES

The invention can be understood in consideration of the following detailed description of various embodiments of the invention in connection with the accompanying drawings, in which.

Figure 1:
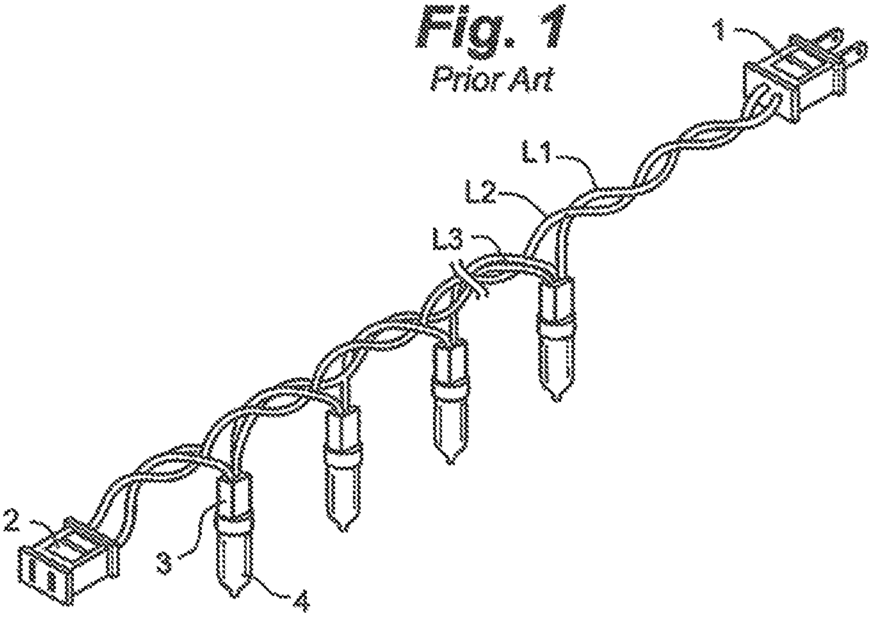
Fig. 1 Prior Art
FIG. 1 depicts a prior art decorative light string having a twisted-pair wiring construction.
Figure 2:
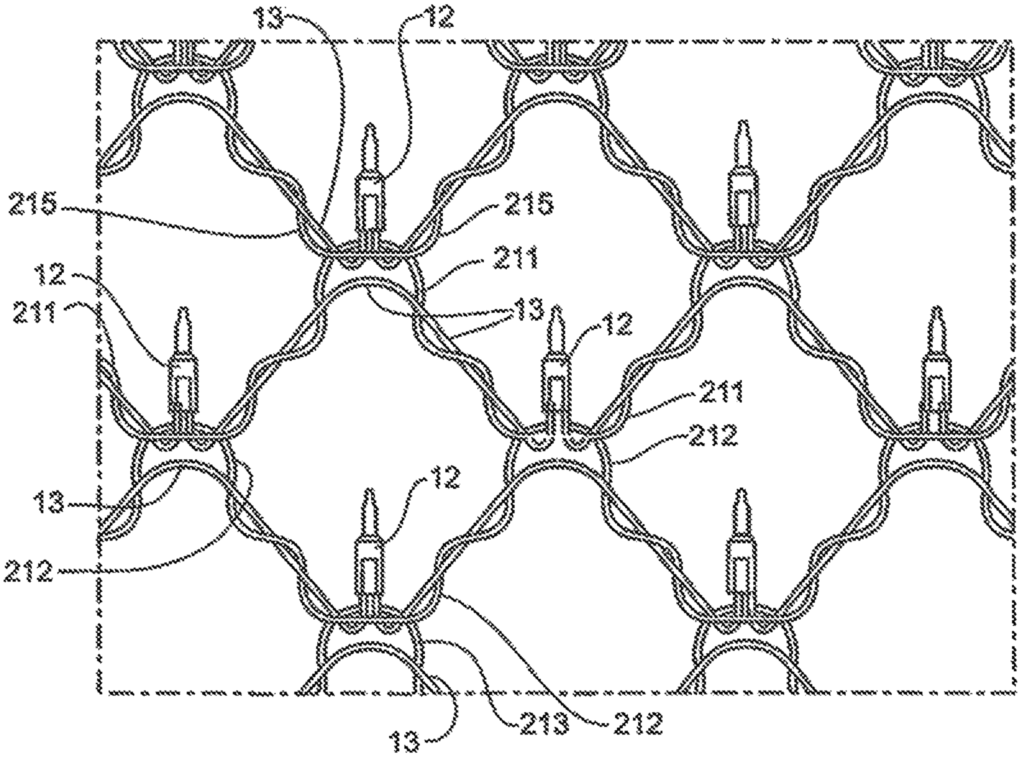
Fig. 2 Prior Art
FIG. 2 depicts a prior art net light having that includes external wire-reinforcing strands.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The prior art methods of reinforcing and strengthening decorative lighting each have their own drawbacks. Oversized wire and twisted pair configurations tends to drive up material cost and make lighting heavier and bulkier, while non-conductive, reinforcing strands may be considered not only unattractive, but expensive to manufacture due to increased complexity.

Embodiments of the claimed invention overcome the shortcomings of the prior art by providing internally-reinforced, electrically-conducting wires having superior tensile strength and elongation for decorative lighting, decorative lighting wiring structures, reinforced wiring, lighted trees, nets, and other reinforced-wire decorative lighting apparatuses and methods.

Unlike known electrically-conducting wire or "cords" used in decorative lighting applications which typically consist of multiple conductor strands twisted together and surrounded by an insulating material, embodiments of the present invention generally non-conductive reinforcing strands or threads of material combined with conductor strands of material. While all materials may be considered to embody some degree of conductivity, herein, the term "conductive" will be understood to refer to materials exhibiting a relatively high degree of electrical conductivity or low electrical resistance, for example, a metal or a conductive polymer. "Non-conductive" will be understood to refer to those materials exhibiting a relatively low degree of electrical conductivity, or low electrical resistivity, including insulators, nonmetallic materials, including materials such as most polymers and plastics.

Figure 3:
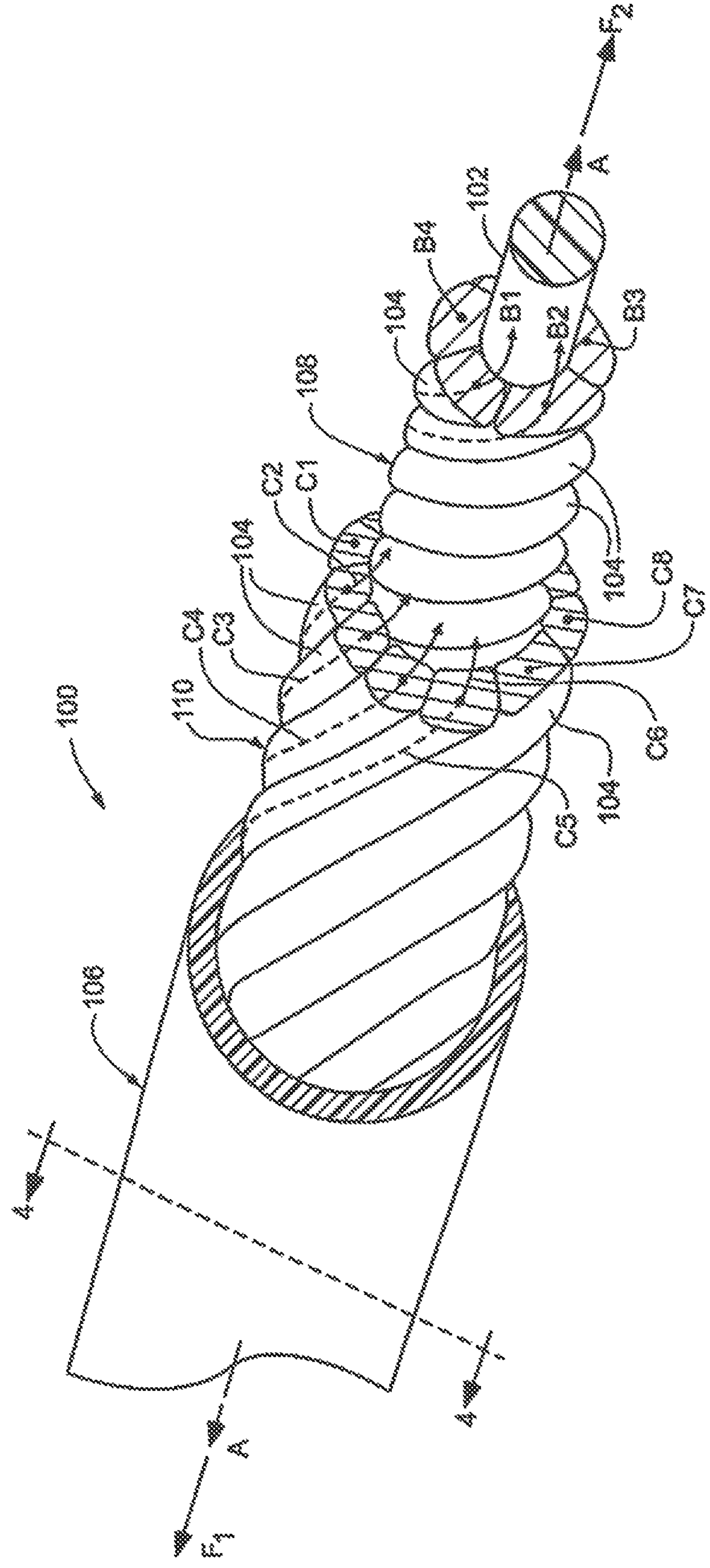
FIG. 3 is a perspective view of a reinforced decorative wire, according to an embodiment of the claimed invention.

Referring to FIG. 3, an embodiment of reinforced decorative-lighting wire or cord 100 is depicted. In an embodiment, reinforced decorative-lighting wire 100 includes one or more reinforcing strands or threads 102, one or more conductor strands 104, and insulating layer or jacket 106. Conductor strands 104 may form one or more layers, such as the depicted first conductor layer 108 and second conductor layer 110. As will be described further below, reinforcing strands 102 and conductor strands 104 may be arranged in a variety of manners, and in a variety of quantities, dependent upon a number of factors, including desired wire properties, including, but not limited to, tensile strength, resistivity and conductivity.

Reinforced decorative-lighting wire 100 may comprise a variety of sizes, resistances, and ampacities, and may be described in terms of electrically-equivalent wire gauge standards, e.g., AWG (American Wire Gauge), 22 AWG, 24 AWG, etc. For example, in an embodiment, wire 100 may comprise a conductive equivalent to a wire normally described as a 22 AWG wire having an equivalent cross sectional area of conductive copper of approximately 0.326 $mm^2$ and having a typical resistance of approximately 52.96 ohms/km, though the overall diameter of the complete wire may be greater than a standard 22 AWG wire due to the additional reinforcing strands.

Reinforced decorative-lighting wire 100 may also be described in terms of other equivalent wire standards, such as Underwriter's Laboratories Standard UL 62 insofar as it pertains to decorative-lighting wire, including standards directed to Type XTW or Type CXTW as typically used in decorative-lighting applications. For example, an embodiment of a reinforced decorative-lighting wire 100 may be designed to include characteristics equivalent to selected characteristics of an 18, 20 22, 25, or 25 AWG CXTW wire, particularly conductive characteristics such as DC resistance per conductor strand, and insulative characteristics.

As depicted in FIG. 3, an embodiment of reinforced decorative-lighting wire 100 comprises a single reinforcing strand 102, and multiple conductor strands 104. In an embodiment, conductor strands 104 form two layers: first conductor layer 108 and second layer 110, though it will be understood that conductors 104 may form one, two, or more than two layers. Layers 108 and 110 form a stranded conductor of reinforced wire 100. A reinforced wire 100 having the stranded conductor comprising multiple conductor strands 104 may also be referred to as a "single" conductor reinforced wire 100 to differentiate from standard twisted pairs of wires typically used in decorative lighting. However, it will be understood that in some applications, pairs of single-conductor reinforced wires 100 may be twisted about one another to form reinforced twisted-pair wire sets.

In an embodiment, and as depicted, reinforcing strand 102 extends axially along a length of wire 100, and along central wire Axis A, surrounded by, or adjacent to, conductor strands 104. In an embodiment, reinforcing strand 102 is generally located radially at a center of wire 100.

Reinforcing strand 102 may define a generally cylindrical shape defining a circular cross-sectional area, though the cross-sectional area may define other shapes, such as square, oval, rectangular, and so on. In other embodiments, and as will be described further below with respect to FIGS. 4B and 9A-13B, reinforcing strand 102 may define a generally circular cross-sectional shape prior to assembly into wire 100, but then define a different, shape, such as an asymmetrical shape, after a manufacturing assembly process.

In an embodiment, central reinforcing strand 102 comprises one or more fibers or strands of fibrous reinforcing material. In the depicted embodiment, reinforcing strand 102 comprises a single strand or fiber of reinforcing material. In other embodiments, reinforcing strand 102 comprises multiple strands of reinforcing material that may comprise twisted strands, threads or fibers such that reinforcing strand 102 comprises a yarn of multiple strands or fibers.

In the embodiment depicted, reinforcing strand 102 comprises a single 1500 Denier fiber having an outside diameter of approximately 0.45 mm. In another embodiment, reinforcing strand 102 comprises a fiber ranging from 500 Denier to 2500 Denier. In other embodiments, reinforcing strand 102 may comprise a larger or smaller diameter and/or greater or lesser Denier fiber depending on the properties of the reinforcing material and desired reinforcing properties. In an embodiment, reinforcing strand 102 comprises a single or multi-fiber strand sized to be within the range of 1000 to 1500 Denier. Reinforced wire 100 with reinforcing strands 102 comprising such a size may provide appropriate reinforcing strength for wires 100 that most decorative lighting applications that would typically use an 18-24 AWG standard wire.

The reinforcing material of reinforcing strand 102 may comprise a generally non-conductive or nonmetallic material, such as a plastic or polymer, including a polyester or polyethylene (PE) material. In one such embodiment, reinforcing strand 102 comprises a polyethylene terephthalate (PET) material. Other reinforcing materials may include, though will not be limited to, polystyrene, polyvinyl chloride (PVC), polyamide (PA), and so on. Reinforcing strand 102 may consist entirely or substantially of a non-conductive or nonmetallic material, such as PET, though in some embodiments, reinforcing strand 102 may comprise a composite material. Such a composite material may comprise a non-conductive material, such as PET, as well as some other conductive, partially-conductive, or other non-conductive material.

In an embodiment, and as depicted, reinforcing strand 102 comprises a substantially solid structure in cross section (radially), as compared to a hollow core strand such as a pipe or other annular shape. Further, in an embodiment, reinforcing strand 102 comprises the same material continuously along its axial length. In an embodiment, reinforcing strand 102 may have a hardness that is less than a hardness of a conductor strand 104. In an embodiment, reinforcing strand 102 has a Rockwell hardness of R117.

In an embodiment, reinforcing strand 102 comprises primarily a PET material, having a specific gravity ranging from 1380-1405 kg/$m^3$, and a melting point of 200-250 degrees Celsius. In other embodiments, reinforcing strand 102 comprises a polymer having a specific gravity that ranges from 1000-2000 kg/$m^3$, and a melting point of 150-300 degrees Celsius. Material in such a range may provide an appropriate balance of strength and flexibility for decorative light string applications. Further, as will be explained further below, such properties allow for deformation of reinforcing strand 102 during the manufacturing assembly process.

In an embodiment, wherein reinforcing strand 102 comprises primarily a PET material, strand 102 comprises an elongation at break of 300%, or may comprise an elongation range of 200% to 400%, and a tensile strength of 55 MPa (7,977 psi). Herein, tensile strength refers to its ordinary meaning as understood in the field of conductive wires, including tensile strength being the maximum amount of stress that wire 100 can withstand before failing or breaking, while being stretched or pulled axially along axis A (along a length of wire 100) by opposing axial forces labeled F1 and F2 in FIG. 3.

In another embodiment wherein strand 102 comprises a PET material, an elongation property of strand 102 ranges from 200% to 400%, and a tensile strength ranges from 45 to 65 MPa. In an embodiment, the elongation of strand 102 may be less than an elongation of conductor strand 104. In another embodiment, the elongation of a strand 102 may be approximately the same as, or greater than, a conductor strand 104. In an embodiment, the tensile strength of a strand 102 may be less than the tensile strength of a conductor strand 104. In another embodiment, the tensile strength may be approximately the same as, or greater than, a conductor strand 104. In an embodiment, the elongation of a strand 102 may be less than the overall elongation of reinforced wire 100. In another embodiment, the elongation may be approximately the same as, or greater than, reinforced wire 100. In an embodiment, the tensile strength of a strand 102 may be less than the overall tensile strength of reinforced wire 100. In another embodiment, the tensile strength may be approximately the same as, or greater than, reinforced wire 100.

Conductor strands 104 may comprise any number of known conductive materials, including metals and metal alloys, such as copper, aluminum, steel, nickel, aluminum, and so on. Embodiments of alloys may include copper aluminum alloy, copper steel alloy, and so on. In an embodiment, one or more conductor strands comprise soft-annealed copper strands, which may be uncoated, or in some embodiments, coated with tin. Conductor strands 104 comprised of copper, including comprised primarily of copper, provide not only superior tensile strength, but also superior ductility properties as compared to conductor strands 104 comprising other metals, such as aluminum. A relatively higher ductility deriving from the use of copper conductor strands 104, in combination with a polymer reinforcing strand 102, allows deformation, particularly elongation when wire 100 is subjected to tensile stress. Such a feature provides advantages in decorative lighting. In contrast, stranded conductors commonly used in overhead power line applications typically rely on aluminum conductors having low ductility, resulting in low elongation. In such an application, sagging of the heavy power lines/conductors is a concern, and the desirable low ductility or inability to elongate, is an important consideration. On the other hand, in decorative lighting, the ability of a wire to deform or elongate (relatively high ductility, e.g., the ductility of copper) may be advantageous. For example, when subjected to a tensile stress or force, wire 100 may elongate rather than break, thereby preventing exposure of conductor strands 104, and preventing a potentially hazardous situation. Elongation properties of reinforced decorative lighting wire 100 are discussed further below.

Further, properties of high tensile strength, flexibility, and the ability to stretch or elongate when subjected to axial pulling may be advantageous for reinforced wire 100 when applied to a decorative lighting apparatus. Unlike cables and wires used in overhead power transmission applications, wires used in decorative lighting applications tend to be supported over much of their length. For example, decorative light strings applied to trees, such as Christmas trees, are generally affixed to the branches of the tree and are well supported, with only very short runs of wire that are unsupported. Conversely, in overhead power transmission applications, extremely long lengths of wire are unsupported between power poles. Consequently, the materials and properties of cables and wires for such power transmission applications may be significantly different than those of reinforced decorative lighting wire 100 as described herein.

In addition to ductility, tensile strength of conductor strands 104 and associated conductor layers 106 and 108, as well as overall tensile strength of reinforced wire 100 remains a consideration. In an embodiment of reinforced wire 100 comprising soft-annealed copper conductor strands 104, a tensile strength of each copper strand 104 will have a higher tensile strength, for example, ranging from 200-250 $N/mm^2$, as compared to aluminum alloys, for example, 100 $N/mm^2$. In an embodiment, each conductor strand 104 has a tensile strength that is less than a tensile strength of reinforcing strand 102. In one such embodiment, conductor strands 104 comprise a copper material, and reinforcing strand 102 comprises PET.

In an embodiment, each conductor strand 104 comprises a continuous, solid-core strand, though the entire wire 100 comprises a multi-stranded wire. In other embodiments, each conductor strand 104 may comprise multiple, individual strands. In an embodiment, all strands have approximately the same average diameter.

In a stranded conductor embodiment of wire 100, individual conductor strands comprise 27 to 36 AWG copper conductor strands. In an embodiment, conductor strands comprise 27 AWG strands. In an embodiment, conductor strands comprise copper strands having diameters measuring, on average, 0.16 mm (34 AWG, or 0.16 AS). In other embodiments, copper strands comprise other diameters, including strands that have average diameters of 0.16 mm, or average diameters of approximately 0.16 mm, such as 0.16 mm+/−10%. In another embodiment, average diameters of copper strands used in a single wire 100 range from 0.15 mm to 0.16 mm, or in another embodiment 0.25 mm+/−10%. In decorative lighting applications, a relatively wide range or tolerance in strand diameter may be sufficient due to a common practice of operating decorative light strands at currents significantly below maximum safe ampacity limits. Conductor strands 104 may comprise copper strands complying with ASTM B 3-90 standards.

Conductor strands 104 extend axially along Axis A, and may or may not be twisted about reinforcing strand 102 or other conductor strands 104.

Conductor strands 104 may generally be cylindrical, presenting a generally circular cross section, though in other embodiments, each strand 104 may present other cross-sectional shapes.

The number of conductor strands 104 may vary based on a combination of factors, including desired conductive properties, and mechanical design characteristics. For example, for a 22 AWG equivalent wire, which in the decorative lighting industry may typically comprise 16 copper strands, reinforced decorative-lighting wire 100 may also comprise 16 conductor strands. In another embodiment reinforced wire 100 may be equivalent to 25 AWG in its current-carrying capability (maximum of 0.73 A), and may comprise 8 conductor strands, which in an embodiment comprises (8) 0.16 mm diameter strands. In other embodiments of 25 AWG equivalent wire, reinforced wire 100 may include 8-10 conductor strands 104; in an embodiment, each conductor strand 104 may have a diameter averaging 0.16 mm, or alternatively, 0.157-0.154 mm.

In other embodiments of wire 100, which in an embodiment may comprise 24 AWG equivalent wire, reinforced wire 100 may include 8 conductor strands 104; in an embodiment, each conductor strand 104 may have a diameter averaging 0.16 mm, or alternatively, 0.157-0.154 mm.

In embodiments, the above configurations of strands 104 may be combined with polymer reinforcing strands 102 sized to fall within a range of 1000 to 1500 Denier.

The number of conductor strands 104 may be greater or fewer than that of an equivalent wire having similar conductive properties, though it will be understood that particular embodiments of wire 100 are intended to match the electrical or conductive properties of equivalent standard wires described by the American Wire Gauge standard, e.g., 22 AWG wire, such that even if the number of strands is not equal to the number of strands in an equivalent standard wire, the size of each conductor strand 104 will be increased or decreased to maintain electrical equivalence. An embodiment of a reinforced decorative wire 100 having electrical properties similar or equivalent to a 22 AWG wire will be described below to further clarify and emphasize the above.

Referring also to FIG. 4, in the embodiment depicted, first conductor layer 108 is formed of multiple conductor strands 104 twisted about centrally-positioned reinforcing fiber 102. In the depicted embodiment, first conductor layer 108 comprises five conductor strands 104. In other embodiments, first conductor layer 108 comprises more or fewer strands.

In an embodiment, the number of strands 104 in first conductor layer 108 ranges from three strands to eight strands.

Strands 104 extend axially along Axis A and in an embodiment, are twisted about reinforcing strand 102. As depicted, strands 104 are helically twisted about reinforcing strand 102 in a counter-clockwise direction, though in other embodiments, strands 104 may be twisted or wrapped about reinforcing wire 102 in a clockwise direction.

Figure 4A:
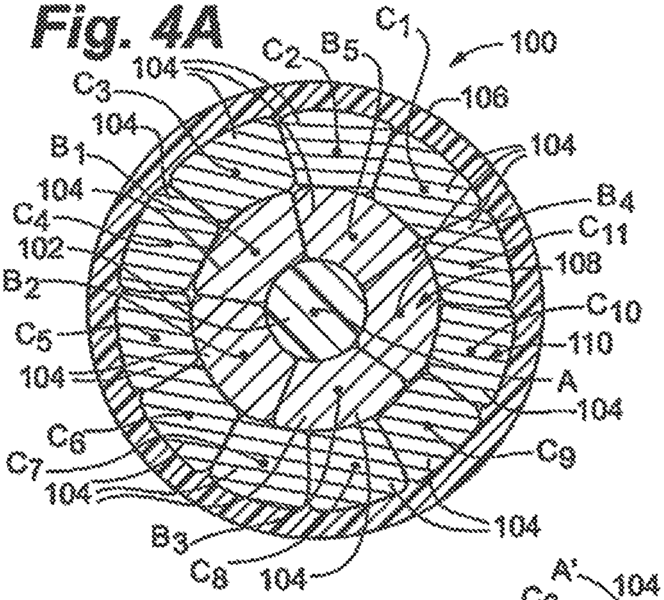
FIG. 4A is a cross-sectional view of the reinforced decorative wire of FIG. 3.
Figure 4B:
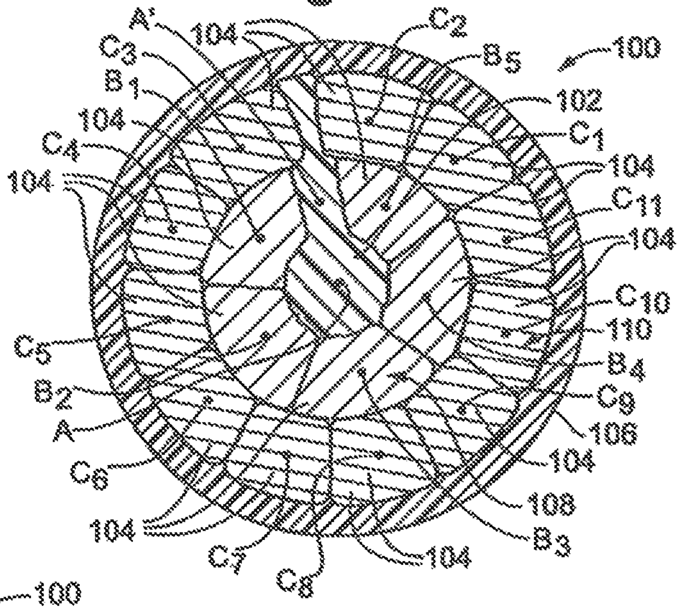
FIG. 4B is a cross-sectional view of the reinforced decorative wire of FIG. 3, depicting variations in conductor and strand position caused during manufacturing.

Central axes of conductor strands 104 are depicted in FIGS. 3, 4A and 4B by arrows B1-B5 (first layer 108) and C1-C11 (second layer 110).

The twist or "pitch" of conductor strands 104 may be defined by a "length of lay", or the length of conductor strand 104 required to turn a full rotation, or turn 360 degrees. As compared to standard gauge wire having equivalent electrical properties, wire 100 of the claimed invention may have lesser lengths of lay when the same number of conductor strands 104 are used. For example, in an embodiment of a 22 AWG equivalent wire, a length of lay of a conductor strand 104 of first layer 108 is approximately 18.5 mm, as compared to approximately 32 mm for an equivalent standard 22 AWG wire commonly used for decorative lighting. The additional twists per unit of length, or decreased length of lay provides axial reinforcing strength in addition to the reinforcing strength added by reinforcing strands 102.

Furthermore, the shorter length of lay may allow further stretching and elongation of wire 100 without breakage when subjected to axial opposing forces, such as F1 and F2 as depicted in FIG. 3.

In an embodiment, conductor strands 104 of layer 108 each have an approximately equal length of lay, though in other embodiments, including some described further below, conductor strands 104 may have different lengths of lay.

Additionally, unlike typical wires used in decorative lighting that comprise only conductive strands, i.e., no reinforcing strand, the use of one or more reinforcing strands 102 in wire 100 may allow for some slight radial compression of strands 102 by conductor strands 104 when wire 100 is subjected to axial forces. This provides the added advantage of allowing wire 100 to elongate even further than a typical decorative lighting wire of a similar wire gauge and ampacity.

Second conductor layer 110 is formed on first conductor layer 108, and also comprises a plurality of conductor strands 104. In an embodiment, and as depicted, second conductor layer 110 comprises eleven conductor strands 104. In other embodiments, second conductor layer 110 comprises more or fewer strands 104. In an embodiment, the number of conductor strands 104 in second layer 110 ranges from four strands to 30 strands.

Strands 104 extend axially along Axis A, and are adjacent strands 104 of first layer 108. In an embodiment, strands 104 of second layer 110 are adjacent to, and twisted about first layer 108. As depicted, strands 104 are twisted about layer 108 and its strands 104 in a counter-clockwise direction. As such, in an embodiment, conductor strands 104 of second conductor layer 110 twists in the same direction as the direction that conductor strands 104 of second conductor layer 108 twist. In other embodiments, strands 104 may be twisted over layer 108 in a clockwise direction, and may twist in a direction opposite to a twist direction of first conductor layer 110. Strands 104 forming conductor layer 108 generally are positioned adjacent one another.

In an embodiment, conductor strands 104 of layer 110 each have an approximately equal length of lay, though in other embodiments, including some described further below, conductor strands 104 may have different lengths of lay.

Insulating layer (or jacket) 106 wraps about second conductive layer 110, covering and insulating conductor strands 104 and reinforcing strand 102. Insulating layer 106 may comprise any of a variety of known insulating materials, including polymers such as PVC, PE, thermoplastics, and so on. In addition to providing insulative properties, insulating layer 106 may add mechanical strength through its other properties. In an embodiment, insulating layer 106 has a minimum elongation percentage of 150%. In an embodiment, insulating layer 106 comprises a polymer having a composition different than the polymer comprising reinforcing strand 102.

Referring still to FIGS. 3 and 4, in an embodiment, wire 100 comprises a reinforced 22 AWG-electrically-equivalent wire comprising a single reinforcing strand 102 extending axially along a center of wire 100, surrounded by 16 twisted conductor strands 104, and overlaid with an insulating jacket layer 106. The 16 conductor strands 104 comprise first conductive layer 108, consisting of 5 conductive strands 104, and second conductive layer 110, consisting of 11 conductive strands 104. In an embodiment, reinforcing strand 102 comprises PET material in the form of a 1500 Denier strand; conductive strands 104 comprise primarily copper; and insulating layer 106 comprises PVC.

Each conductive strand 104 defines an approximately 0.16 mm diameter, circular or round wire, such that the equivalent cross-sectional area of the conductive portion of wire 100 is approximately the same as a standard 22 AWG wire, also denoted as 16/0.16 AS, meaning 16 strands of 0.16 mm diameter conductor strands. In this embodiment, the resistivity ranges from 54 to 57 ohms/km. In an embodiment, the resistivity is 56.8 ohms/km or less. In an embodiment, the resistivity is substantially 55 ohms/km.

The length of lay, sometimes referred to as lay of strand, of each conductor strand 104 of first layer 108, in an embodiment is 32 mm or less. In an embodiment, the length of lay of conductor strand 104 of first layer 108 ranges from 15 mm to 25 mm. In an embodiment, the length of lay of conductor strands 104 of first layer 108 is approximately 18.5 mm. In an embodiment the length of lay of all conductor strands 104 of first layer 108 are approximately the same. In an embodiment, a lineal length of each strand per unit length is within 5% of an average lineal length (note: the lineal length of a strand will be longer than a unit length due to the helical twisting of a wire, e.g., a 1 foot length of wire 100 will include strands 104 having lineal lengths longer than 1 ft. In other embodiments, the lineal length of individual strands 104 may vary more substantially per unit length of wire 100, particularly when lengths of lay of individual strands 104 are allowed to vary from strand to strand.

The length of lay of conductor strands 104 of second conductive layer 110 may be the same as conductor strands 104 of first conductor layer 108, or in some embodiments, may be different. In an embodiment a length of lay of conductor strands 104 of second layer 110 is 32 mm or less. In an embodiment, the length of lay of conductor strand 104 of second layer 110 ranges from 15 mm to 25 mm. In an embodiment, the length of lay of conductor strands 104 of second layer 110 is substantially 18.5 mm. In an embodiment, lengths of lay of conductor strands 104 of both layers 108 and 110 are, on average, approximately 18.5 mm. In an embodiment, the direction of twisting is the same, as depicted in FIG. 3.

In an embodiment, including an embodiment of 22 AWG reinforced wire 100, insulation layer 106, comprising primarily PVC material, has a minimum thickness of 0.69 mm. In an embodiment, insulation 106 comprises a thickness ranging from 0.69 mm to 1.0 mm. In an embodiment, an average thickness of insulating layer 106 has an average thickness of 0.76 mm or greater. In one such embodiment, insulating layer 106 has an average thickness of 0.84. In an embodiment insulating layer 106 has an insulation resistance of at least 225 MΩ/Kft.

In an embodiment, the overall diameter of wire 100 in 22 AWG ranges from 2.40 to 2.70 mm. In an embodiment, an average overall diameter is approximately 2.6 mm; in an embodiment, an average overall wire 100 diameter is 101 mil.

With respect to elongation, in an embodiment, wire 100 has an elongation of 150% or greater. In an embodiment, the elongation of wire 100 ranges from 150% to 400%. In one embodiment, wire 100 exhibits 300% elongation, significantly longer than standard, all-copper multi-stranded 22 AWG CXTW wire.

With respect to tensile strength, embodiments of wire 100 have an improved tensile strength, which in one embodiment includes a tensile strength of 1,500 PSI or greater. In an embodiment, the tensile strength ranges from 1,500 PSI to 4,000 PSI, in another embodiment, the tensile strength ranges from 2,500 to 3,500 PSI. Such a range may provide sufficient strength for various decorative lighting applications, including trees, net lights, sculptures, and so on. In some applications where wires are affixed tightly to supporting structure, such as trees of metal frames, a required tensile strength may be on the lower end of the range, while wires of light strings that are not affixed to, or are less supported, may require higher tensile strength due to possible pulling or yanking by a user.

Another method of describing and measuring "strength" of a wire, including a reinforced wire 100, and as commonly used in decorative lighting is to measure an axially-applied pulling force required to cause the wire to begin to break, such that an outer insulation shows breakage, or an inner conductor shows breakage. In an embodiment, reinforced wire 100 may withstand axial pulling forces of various ranges depending on the particular reinforced wire 100 configuration.

In an embodiment, reinforced wire 100 may withstand a minimum axially-applied pulling force ranging from 22 lbf to 46 lbf. In one such embodiment, reinforced wire 100 comprises an ampacity equivalent to a 22 AWG wire, and can withstand a minimum 22.4 lbf without breaking; in another embodiment, reinforced wire 100 comprises an ampacity equivalent to a 20 AWG wire, and can withstand a minimum 30 lbf without breaking; in another embodiment, reinforced wire 100 comprises an ampacity equivalent to a 18 AWG wire, and can withstand a minimum 46 lbf without breaking.

In another embodiment, reinforced wire 100 comprises 7-10 conductor strands 104 defining a range of minimum axial pulling force ranging from 22.4 lbf to 46 lbf. In one such embodiment, reinforced wire 100 comprises 8 conductor strands and has a minimum axial pulling force at breakage of 46 lbf, in one such embodiment, each conductor strand 104 may have an average diameter in the range of 0.15 mm to 0.17 mm; alternatively, each conductor strand 104 may have an average diameter of 0.154 mm to 0.157 mm. Such ranges accommodate expected current flows in various decorative lighting applications, while offering substantial overall tensile strength.

In an embodiment, wire 100 includes a 1500 Denier PET reinforcing strand 102 extending axially along Axis A, 16 copper conductor strands of 0.16 mm average diameter (5 first layer 108 strands and 11 second layer 110 strands) having a 55 Ω/km resistivity, and insulating layer 106 of PVC material. In one such embodiment, elongation is greater than 300% (in an embodiment is 306%), with a tensile strength of 2800 PSI, requiring a force of approximately 21 kg to break. Such a wire may be used as a substitute for standard 22 AWG wire, including 22 AWG CXTW wire for improved decorative-lighting applications.

Referring to FIG. 4B, the wire 100 of FIGS. 3 and 4A is depicted again, but in this case, the configuration of wire 100, namely the relative positions of conductor strands 104 and reinforcing strand 102, are somewhat different. In an embodiment, because of the malleable properties of reinforcing strand 102, including the fibrous nature, pliability, and so on, during manufacturing of wire 100, reinforcing strand 102 may be deformed somewhat, which in turn, may cause first and second layer strands 108 and 110 to move relative to one another, and relative to reinforcing strand 102. As depicted in FIG. 4*b*, at a particular cross section, reinforcing strand 102 does not comprise a circular cross section, but rather, comprises another shape due to deformation. Such "deformation", may actually be the result of radial displacement of individual strands or fibers of reinforcing strand 102 that occur when layers of conductor strands 104 are wound or twisted about generally central reinforcing strand 102. As will be explained further below with respect to FIGS. 7-13B, such variation, may be caused by radial movement or deformation of reinforcing strand 102 and may vary axially, or along a length of wire 100. Consequently, while FIG. 4A depicts an ideal embodiment of wire 100 in cross section, in other embodiments wire 100 may comprise the relative structure depicted in FIG. 4B, or some other similar structure. As such, embodiments of reinforced decorative wire 100 may include a central reinforcing strand that may only be substantially, or mostly centrally located. Further, in such an embodiment, conductor strands 104 may not be evenly spaced about reinforcing strand 102, as depicted, nor will strands 104 of layer 110 be evenly spaced about layer 108.

As described above, embodiments of wire 100 are not limited to the 1-5-11 configuration described above (1 reinforcing strand 102, 5 first layer conductors 105 and 11 second layer conductors 110).

Although embodiments of reinforced wire 100 may comprise multi-layer conductor strand embodiments, such as those depicted in FIGS. 3-4B, embodiments of reinforced wire 100 may include only a single layer of conductor strands 104 and a single reinforcing strand 102. Some such embodiments will be further described below, and may include the following embodiments: 10 conductor strands 104 with a single reinforcing strand 102, which in an embodiment includes 0.15-0.16 mm diameter strands 104 and 1000 Denier strand 102; 9 conductor strands 104 with a single reinforcing strand 102, which in an embodiment includes 0.15-0.16 mm diameter strands 104 and 1000 Denier strand 102; 8 conductor strands 104 with a single reinforcing strand 102, which in an embodiment includes 0.15-0.16 mm diameter strands 104 and 1500 Denier strand 102; and 7 conductor strands 104 with a single reinforcing strand 102, which in an embodiment includes 0.15-0.16 mm diameter strands 104 and 1500 Denier strand 102. In some such 7, 8, 9, or 10 stranded embodiments, when fewer conductor strands 104 are used, a larger diameter and stronger reinforcing strand 102 may be included to make up for the decrease in tensile strength due to fewer conductor strands 104.

Figure 5:
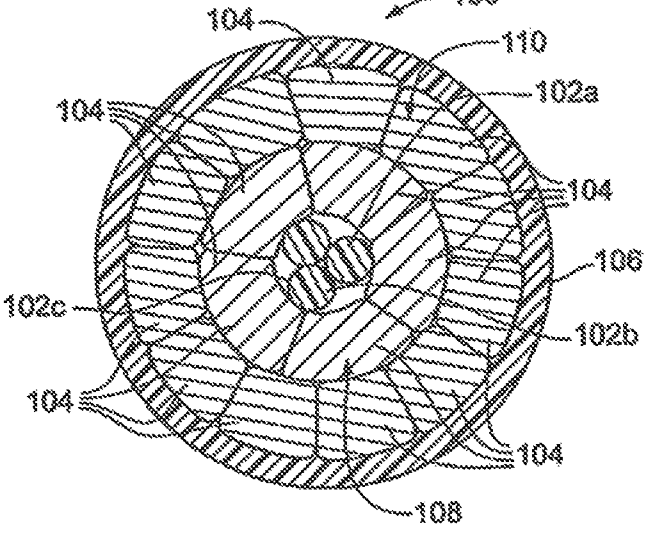
FIG. 5 is a cross-sectional view of another embodiment of a reinforced decorative wire, according to an embodiment of the claimed invention.

Referring to FIG. 5, another embodiment of reinforced decorative-lighting wire 100 is depicted. This alternate embodiment of wire 100 is substantially the same as the embodiment depicted in FIGS. 3 and 4, and described above, with the exception of reinforcing strands 102. In this embodiment, rather than a single reinforcing strand 102, wire 100 includes three reinforcing strands 102*a*, 102*b*, and 102*c*. Reinforcing strands 102*a*-102*c* extend axially through the center portion of wire 102. Strands 102*a*-102*c* may or may not be twisted about one another. Twisting multiple strands 102 may provide an additional reinforcing strength.

In an embodiment, fewer than three strands 102, namely two strands may be used. In other embodiments, greater than three strands 102 may be used.

In an embodiment, the cross-sectional area of the three reinforcing strands 102*a*, 102*b*, and 102*c* is equivalent to the 1500 Denier strand described above with respect to the embodiment of FIGS. 3 and 4. In other embodiments, the size of reinforcing strands 102 may be larger or smaller, depending on desired wire 100 strength, with larger size strands and/or more strands 102 being used for stronger reinforced wire 100.

Figure 6:
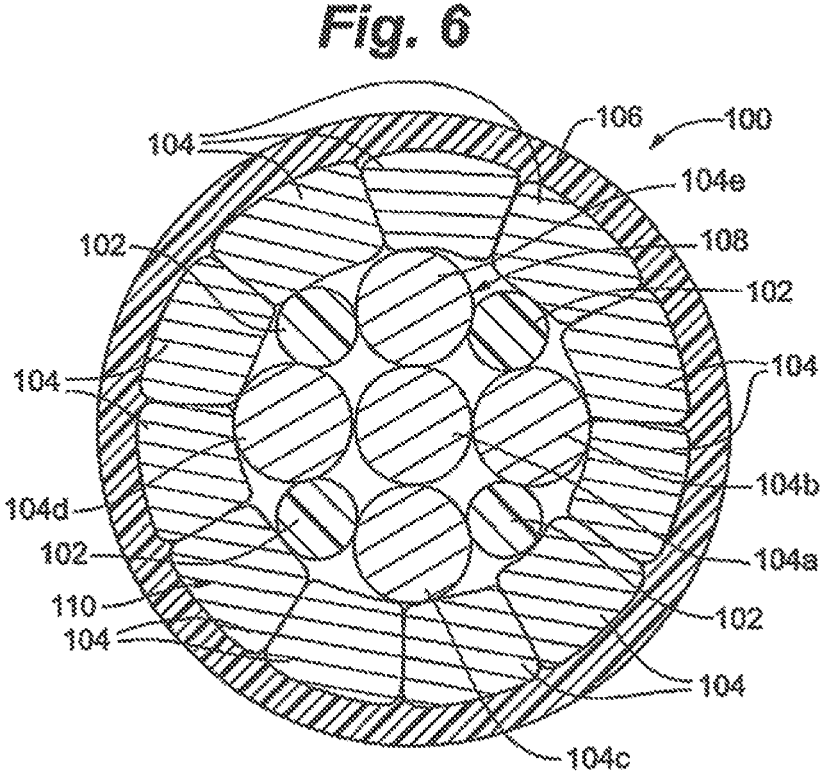
FIG. 6 is a cross-sectional view of another embodiment of a reinforced decorative wire, according to an embodiment of the invention.

Referring to FIG. 6, another embodiment of wire 100 is depicted. In this embodiment, wire 100 still includes multiple reinforcing strands 102, first conductor layer 108 comprising multiple conductors 104, second conductor layer 110 comprising multiple conductors 104, and outer insulating layer 106. In the depicted embodiment, first conductor layer 108 includes five conductors 104 and second conductor layer 110 includes eleven conductors 104, similar to the embodiments described above with respect to FIGS. 3-5. However, in this embodiment, wire 100 includes four reinforcing strands 102.

As depicted, first conductor layer 108 actually includes a single, central conductor 104*a* surrounded by four outer conductors 104*b*, 104*c*, 104*d*, and 104*e*. Between each outer conductor 104*b*, 104*c*, 104*d* and 104*f* is a reinforcing strand 102. Second conductor layer 110 is adjacent both the four conductors 104*b*-*e*, and the four reinforcing strands 102.

Embodiments of the invention are not intended to be limited to the specific patterns and structures depicted in FIGS. 3-6. It will be understood that the number of conductors 104, number of reinforcing strands 102, and their combinations, may vary.

Figure 7:
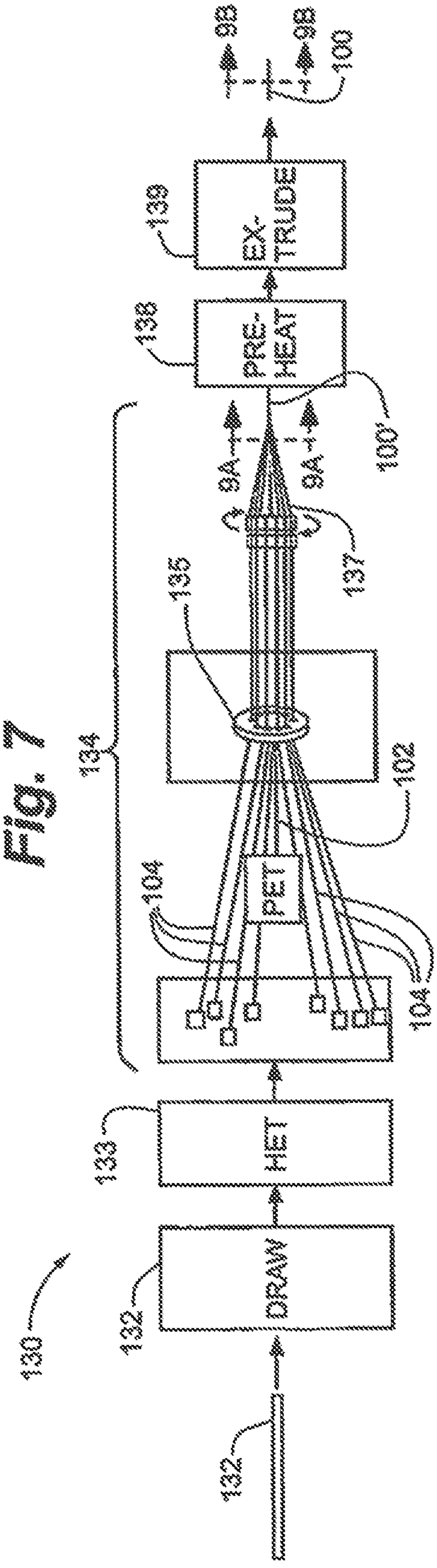
FIG. 7 is a block diagram of a process for manufacturing reinforced decorative wire, according to an embodiment.

Referring to FIG. 7, a simplified block diagram of an embodiment of a manufacturing assembly process 130 of the invention for manufacturing reinforced decorative lighting wire 100 is depicted. In an embodiment, metal rod 131, which may comprise a copper rod, is drawn to a smaller diameter, as will be understood by those skilled in the art, at drawing process 132. Drawing process or step 132 may include multiple stages of drawing, such as two stages of drawing, to reduce the diameter of rod 131 down to a small diameter of a conductor strand 104. At step 133, heat treating or annealing equipment may be used to treat conductor strands 104 to improve ductility of strands 104. Although a single rod 131 is depicted as fed into process 132 and 133, it will be understood that multiple rods 131 may be drawn and heated simultaneously.

In an embodiment, at step 134, a "stranding process" twists multiple conductor strands 104 about one or more reinforcing strands 102. In an embodiment, multiple spools feed multiple conductor strands 104 to perforated plate 135, and one or more spools (labeled "RS" to represent reinforcing strand 102) feeds one or more reinforcing strands 102.

Figure 8:
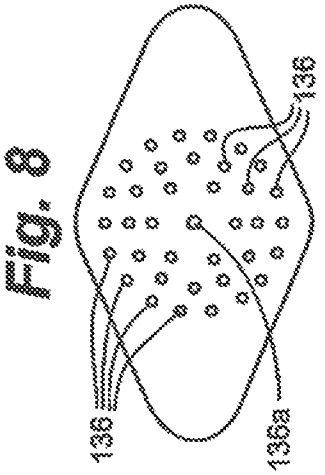
FIG. 8 is a front view of a plate for a stranding process step of the process of FIG. 7.

Referring also to FIG. 8, in an embodiment, perforated plate 135 includes multiple apertures 136, including a central aperture 136*a*. Conductor strands 104 are threaded through various apertures 136, as are one or more reinforcing strands 102. In the embodiment depicted, only one reinforcing strand 102 is used, and is located centrally, such that it passes through aperture 136.

During the stranding process, in an embodiment, conductor strands 104 and reinforcing strand 102 are fed to rotating cylinder 137, which may comprise a capstan 137, which rotates, causing conductor strands 104 and strand 102 to be twisted about one another. The selection of the apertures 136 through which the conductors are threaded, at least in part, determines the nature of the resulting wound or twisted strand combination. In the embodiment depicted, eight conductor strands 104 are twisted about a central reinforcing strand 102. Conductor strands 104 pass through one or more apertures 136 in FIG. 8, while reinforcing strand 102 passes through central aperture 136*a*. Such an embodiment results in a predetermined pattern of a single conductor strand 104 layer about a single, central reinforcing strand 102.

As will be described further below with respect to FIGS. 9A-13B, other patterns defined by selection of apertures 136 may be used to create other embodiments of multi-stranded wire 100 having. In an embodiment, more than one reinforcing strand may be used, and more than one layer of conductor strands 102 may be used.

After passing through apertures 136 of plate 135, strands 104 and 102 couple with a rotating structure, such as capstan 137, which rotates, causing strands 104 to be twisted about strand 102.

In embodiment process 130 includes a re-heat process step 138. Re-heat process step 138 raises the temperature of conductor strands 104 and reinforcing strand 102 prior to extrusion step 139. The increased temperature aids in the extrusion process.

At process step 139, insulative layer 106 is added to the twisted assembly of strands 104 and 102 via an extrusion process. As will be understood by those skilled in the art, in an embodiment, insulative material is fed into an extruder, heated, and drawn or pushed through a die onto the exterior of the twisted assembly of strands 104 and/or reinforcing strand 102 to form layer 106, thereby creating finished reinforced wire 100.

It will be understood that other steps or processes may be used to manufacture and assemble embodiments of reinforced wire 100. Referring to FIGS. 9A-13B, a number of embodiments of reinforced wire 100 are depicted. FIGS. 9A, 11A, 12A, and 13A depict patterns of conductor strands 104 in relation to one another and to a central reinforcing strand 102 at a pre-assembly, or initial positional relationship, prior to completion of the stranding process. Strands 104 and 102 are depicted in cross section. In each embodiment, conductor strands 104 are arranged circumferentially about reinforcing strand 102. In an embodiment, strands 104 are arranged equidistantly about strand 102, or substantially equidistantly, about reinforcing strand 102. In other embodiments, conductor strands 104 may not be circumferentially arranged equidistantly.

It will be understood that although strands 104 are depicted as having circular cross sections in this view, during actual assembly, a cross-sectional view of strands 104 after some twisting of strands 104 would cause a shape of each strand in cross section to appear somewhat non-circular, similar to the cross-sectional shapes of strands 104 depicted in FIGS. 4 and 5. For the sake of illustration and simplicity, strands 104 are depicted as having circular cross-sectional shapes.

In contrast, FIGS. 9B, 111B, 12B, and 13B depict embodiments of wire 100 in cross-section after assembly via manufacturing assembly process 130. As depicted, the final positions or final positional relationships of conductor strands 104 relative to reinforcing strand 102 are different as compared to the initial positions of conductor strands 104 relative to reinforcing strand 102.

In the embodiments of reinforced wire 100 depicted in FIGS. 9B-13B, the shape of reinforcing strand 102 as viewed in cross-section, i.e., radially, has been transformed from a generally circular shape to an asymmetrical shape due to pressure and heat applied to reinforcing strand 102 during the manufacturing process. Dots, or small solid circles in the Figures in each conductor strand 104 indicate central axes of each conductor strand 104. Further, the final, assembled positions of conducting strands 104 relative to reinforcing strand 102, and relative to one another are also changed as compared to an initial or pre-assembly position. The result is a change from a generally symmetrical configuration to an asymmetrical configuration.

Figure 9B:
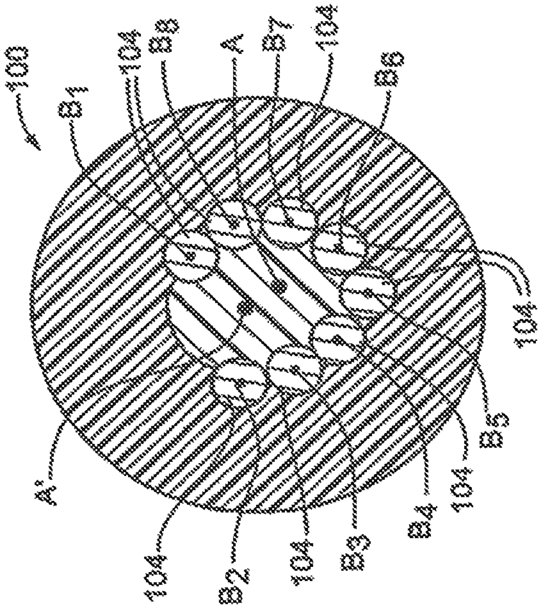
FIG. 9B is a cross-sectional view of an embodiment of a completed decorative wire having an asymmetrical configuration, according to the embodiment of FIG. 9A.
Figure 9A:
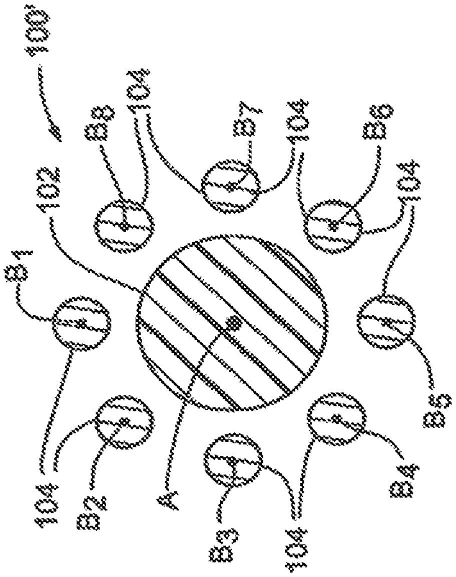
FIG. 9A is a cross-sectional view depicting eight conductor strands relative to a single, central reinforcing strand prior to final completion of an embodiment of the reinforced decorative wire of FIG. 1.
Figure 10:
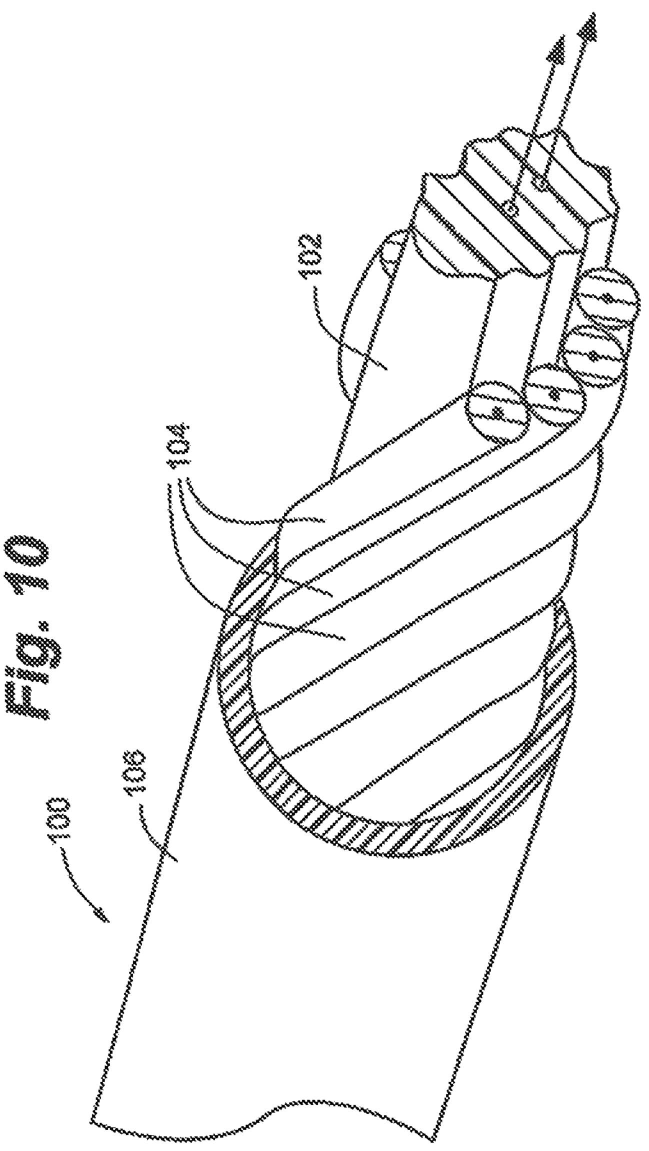
FIG. 10 is a perspective view of the reinforced wire of FIG. 9B.
Figure 11A:
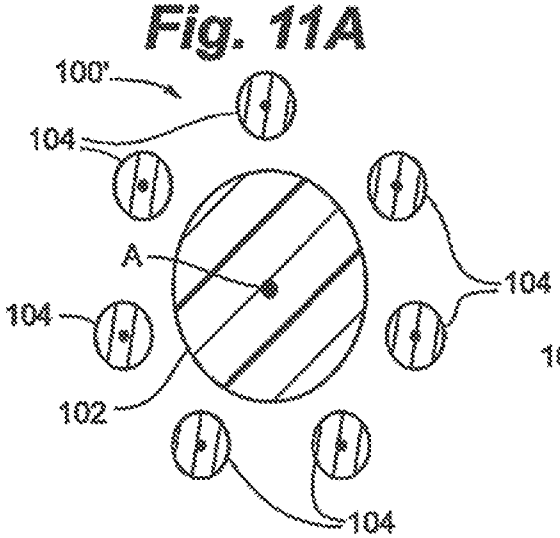
FIG. 11A is a cross-sectional view depicting seven conductor strands relative to a single reinforcing strand prior to final completion of an embodiment of the reinforced decorative wire of FIG. 1.
Figure 11B:
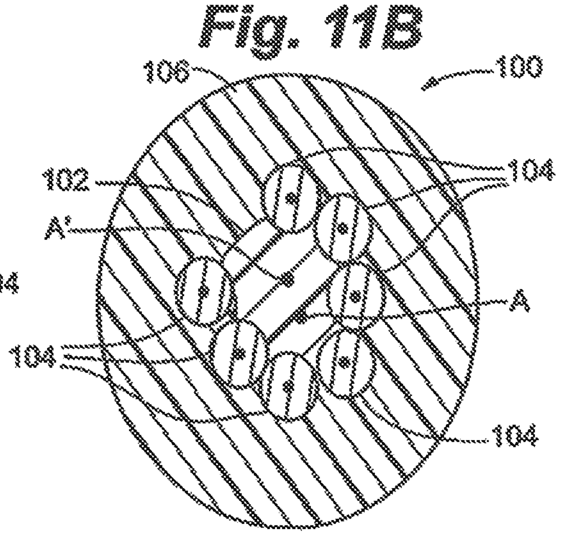
FIG. 11B is a cross-sectional view of an embodiment of a completed decorative wire having an asymmetrical configuration, according to the embodiment of FIG. 11A.
Figure 12A:
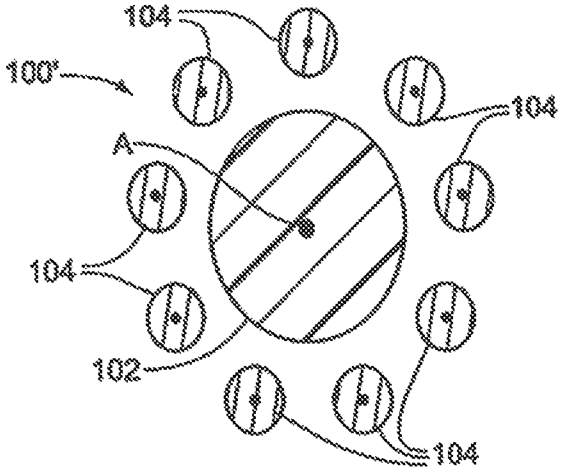
FIG. 12A is a cross-sectional view depicting nine conductor strands relative to a single reinforcing strand prior to final completion of an embodiment of the reinforced decorative wire of FIG. 1.
Figure 12B:
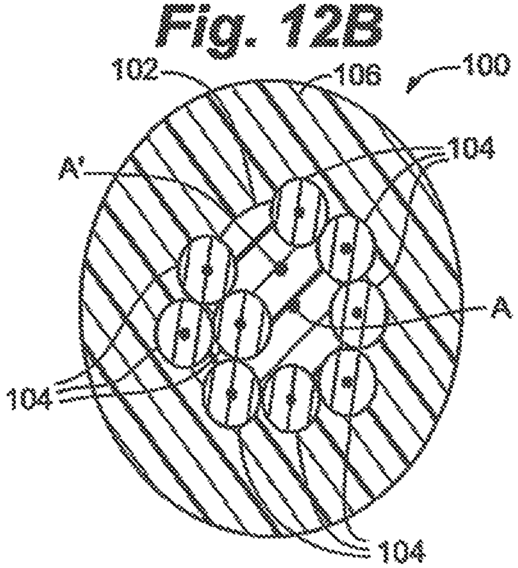
FIG. 12B is a cross-sectional view of an embodiment of a completed decorative wire having an asymmetrical configuration, according to the embodiment of FIG. 12A.
Figure 13A:
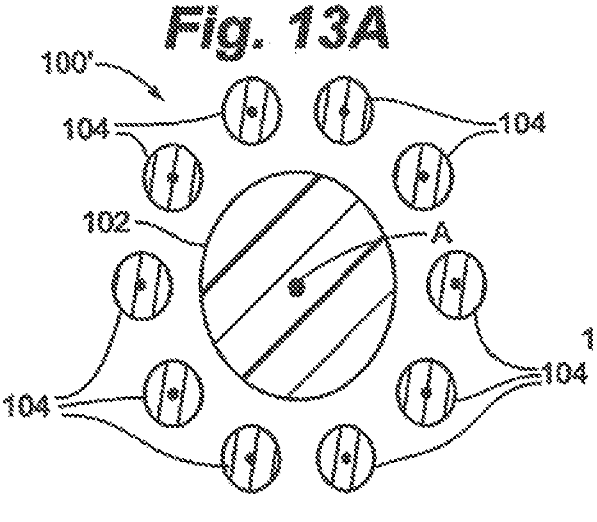
FIG. 13A is a cross-sectional view depicting ten conductor strands relative to a single reinforcing strand prior to final completion of an embodiment of the reinforced decorative wire of FIG. 1.
Figure 13B:
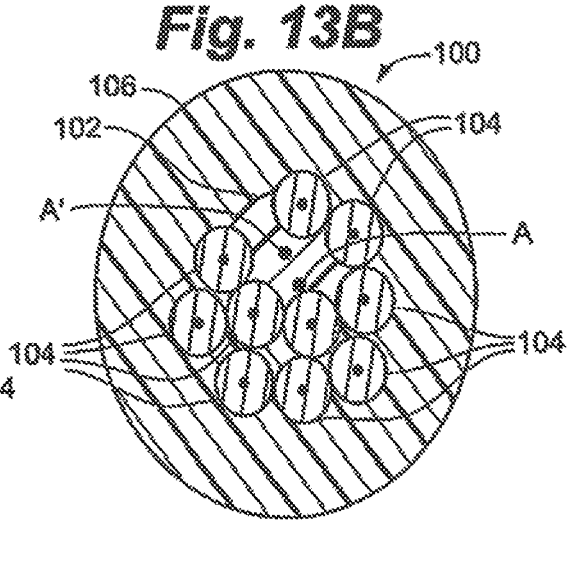
FIG. 13B is a cross-sectional view of an embodiment of a completed decorative wire having an asymmetrical configuration, according to the embodiment of FIG. 13A.

Referring to FIGS. 9B and 10, an embodiment of reinforced wire 100 is depicted in further detail. As viewed in a cross-section normal to axis A of wire 100, reinforcing strand 102 defines an asymmetrical shape. An axis passing through the area centroid of reinforcing strand 102 (indicated by the point at which axis A' intersects reinforcing strand 102) is defined as a central reinforcing-strand axis A'. Due to the deformation of reinforcing strand 102 during the manufacturing process, central reinforcing-strand axis A' is offset radially from wire axis A.

The amount that axis A' is offset from axis A may vary from embodiment to embodiment, depending on a number of factors including material properties and manufacturing process settings. With respect to materials, softer, more pliable materials used for reinforcing strands 102 may result in a more conformable, malleable, or deformable reinforcing strand 102. In an embodiment, reinforcing strand 102 comprises a PET material with one or more of the properties described above. Manufacturing process settings include pressure applied by conductor strands 104 onto reinforcing strand 102 during the stranding process, conductor strand 104 and reinforcing strand 102 material temperature during stranding, as well as pre-heat and extrusion process temperatures.

In an embodiment, the offset of axis A' to axis A may vary from 1% to 50%; in another embodiment, the offset may range from 5% to 35%.

The asymmetrical shape of reinforcing strand 102 may vary along axis A', as may the offset of axis A' from axis A.

As depicted, deformation of reinforcing strand 102 may result in conductor strands 104 being wound or twisted asymmetrically about the circumference of reinforcing strand 102, such that some space may exist between strands 104. In such an embodiment, portions of outer insulating layer 106 may be extruded directly onto exposed portions of reinforcing strand 102 that are not covered by a conductor strand 104. In an embodiment, the contact between layer 106 and reinforcing strand 102 creates a strengthening bond between the materials of layer 106 and reinforcing strand 102 that may be stronger than the bond created between layer 106 and metal conductor strands 104, thereby adding further tensile strength to reinforced wire 100. In one such embodiment, insulating layer 106 comprises a first polymer material, and reinforcing strand 102 comprises a second, different, polymer material. In one such embodiment, reinforcing strand 102 comprises a PET material, and insulating layer 106 comprises a PVC material.

In one such embodiment, reinforced wire 100 comprises a longitudinally-extending reinforcing strand 102 comprising a first polymer material, a plurality of conductor strands 104 helically wound about reinforcing strand 102, and outer insulating layer 106 comprising a second polymer material, the outer insulating layer adjacent to, and in contact with, one or more of conductor strands 104. The plurality of conductor strands 104 define a gap between two conductor strands 104, and outer insulating layer 106 is in direct contact with the portion of the reinforcing strand 102 in the gap such that the second polymer material is bonded to the first polymer material.

In one such embodiment, conductor strands 104 are asymmetrically wound about the reinforcing strand such that central longitudinal wire axes of the conductor strands 104 are not equidistantly spaced about the central longitudinal wire axis A.

In an embodiment, the gap as measured radially from a first conductor strand 104 to a second conductor strand 104 along an axis normal to the central longitudinal axis of the wire, and defines a width that is greater than 10% of a diameter of any of the plurality of conductor strands 104, but not greater than a diameter of reinforcing strand 102.

The asymmetrical winding of conductor strands 104 about deformable reinforcing strand 102 may result in the lineal lengths of each conductor strand 104 varying per unit length of finished wire 100. In other words, some conductor strands 104 may be wound slightly differently about strand 102, e.g., different lengths of lay, different helical radius, etc., such that some strands may be slightly longer than others when straightened. While such variance may affect final ampacity of wire 100, for decorative lighting applications, such variances in ampacity may be tolerated. Further, on average, variances in lengths of strands 104 may average out such that overall ampacity is not affected, or not greatly affected.

Further, length of lay may also vary from strand 104 to strand 104 in some embodiments, such that a length of lay of all strands 104 in a reinforced wire 104 may not be equal.

Further, the deformable properties of reinforcing strand 102 may allow some portions of some or all conductor strands 104 to embed in part into reinforcing strand 102, which results in greater contact area between some conductor strands 104 and reinforcing strand 102, thereby increasing the structural strength, including tensile strength, of reinforcing wire 102.

In addition to the additional structural enhancements to reinforced wire 100, manufacturing process 130 and its resultant reinforced wire 100 having an asymmetrical configuration provides a number of manufacturing benefits, including ease of manufacturing and cost savings. Unlike wires and cables known in the art, the asymmetrical reinforcing wire configuration 100 herein does not require that all conductor strands 104 be precisely wound about reinforcing strand 102, such that process 130 may be completed quicker and with less waste.

Referring specifically to FIGS. 9B, 111B, 12B, and 13B, in an embodiment a set of reinforced decorative lighting wire 100, outside diameters of one or more wire 100 configurations may be substantially equal. In an embodiment, the assembled 7, 8, 9 and 10 conductor strand reinforced wire 100 embodiments all have substantially the same outside diameter. In an embodiment, such an outside diameter may be 2.2 mm+/−0.2 mm, though it will be understood that other embodiments may have other outside diameters based upon desired insulating layer 106 thickness, overall strength requirements, and so on. In other embodiments, 7 and 8 conductor embodiments may have the same outside diameter, while 9 and 10 conductor strand embodiments have substantially the same outside diameter. In an embodiment, 7, 8, and 9 conductor strand wires 100 have substantially the same outer diameter, which in an embodiment may be 2.22 mm+−0.5 mm.

In an embodiment of a set having substantially the same outer diameters, yet different numbers of conductor strands 104 of a same or similar diameter, the overall outer diameter of the wire 100 may be controlled by manipulating the thickness/diameter of reinforcing strand 102 and/or the thickness of insulating layer 106. In an embodiment, the outer diameter is held constant for wires 100 having different quantities of strands 104 by decreasing the diameter of reinforcing strand 102 when increasing the number of strands 104.

For example, an 8-conductor strand wire 100 having a 1500 Denier reinforcing strand and an outer layer 106 may have the same wire diameter as a 9-conductor strand wire 100 having a 1000 Deneier reinforcing strand 102 and an outer layer 106. The difference in diameters being attributed in whole, or in part, to the change in size of reinforcing strand 102. In such an embodiment, an average thickness of insulating wire 106 may be substantially the same for both wires 100 having a different number of strands 104.

One advantage of having substantially the same outside diameter on different configurations of reinforced wire 100 is that a common lamp holder 150 (see FIG. 14 below), may be used with more than one wire 100 configuration, rather than requiring a larger lamp holder be used for wires having more conductors and a smaller lamp holder be used for wires having fewer conductors.

In another set of reinforced wires 100, a thickness of reinforced wire 100 insulating layer 106 is substantially the same independent of the number of conductor strands 104 of the wire 100. In an embodiment, an insulating layer 106 is the same thickness for reinforced wire 100 comprising 7, 8, 9, or 10 conductor strands 104. In one such embodiment, an average thickness of layer 106 is within a range of 0.75 to 0.81 mm; in one such embodiment, an average thickness of layer 106 is within the range of 0.79 mm+/−2 mm.

Referring generally to FIGS. 14A-33, reinforced decorative lighting wire 100 may be used to create a variety of reinforced decorative lighting structures, including reinforced light strings, reinforced net lights, lighted trees with reinforced decorative lighting, outdoor sculptures with reinforced decorative lighting, and so on.

Several embodiments of reinforced decorative light strings and structures of the present invention are depicted in FIGS. 14A-24.

Figure 14A:
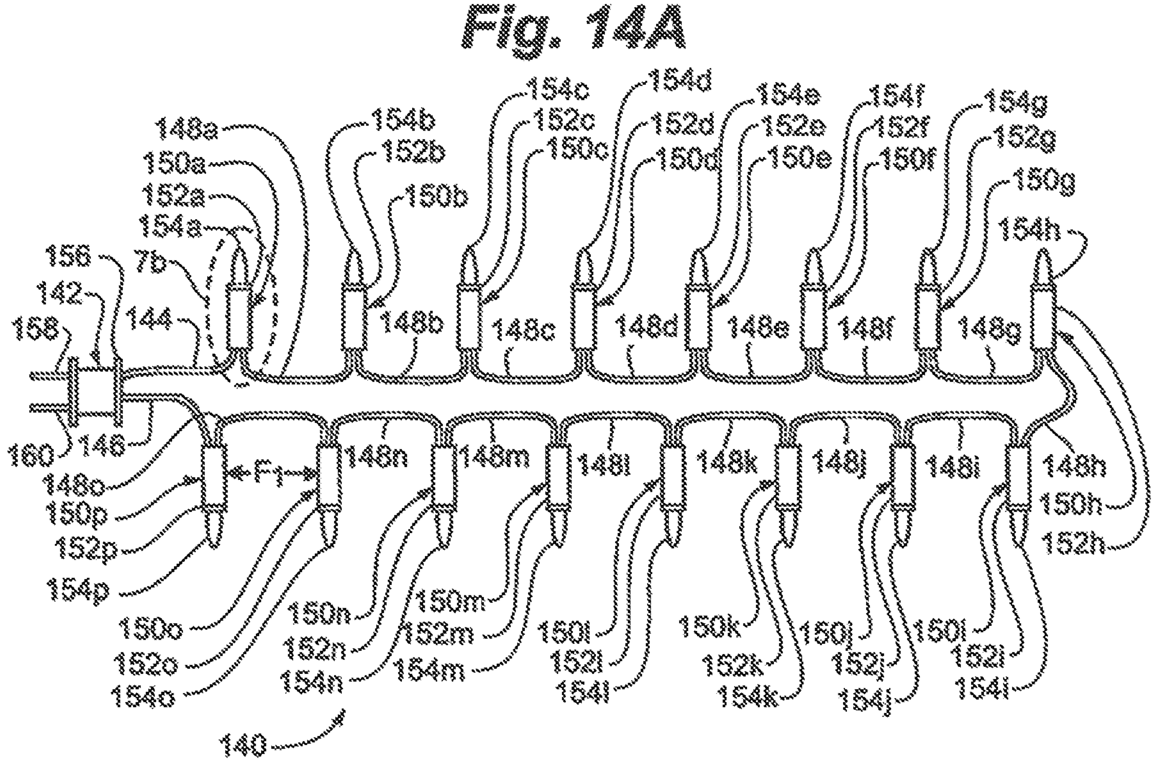
FIG. 14A is a view of a reinforced, series-connected, decorative light string, according to an embodiment of the claimed invention.

Referring specifically to FIG. 14A, reinforced decorative light string 140 is depicted. In this embodiment, reinforced decorative light string 140 comprises optional power plug 142, first power-terminal wire 144 (also referred to herein as a first power wire 144), second power-terminal wire 146 (also referred to herein as a second power wire 146), multiple light-connecting wires **148*a*-148*o*, and a plurality of lamp assemblies 150*a*-150*p*. Lamp assembly 150*a* comprising a “first” lamp assembly, lamp assembly 150*p* comprising a “second” or “last” lamp assembly, and lamp assemblies 150*b*-150*o* comprising “intermediate” lamp assemblies (located “intermediate” or between lamp assemblies 150*a* and 150*p*). In an embodiment, first power-terminal wire 144, second power-terminal wire 146 and light-connecting wires 148 all comprise reinforced decorative lighting wire 100. In another embodiment, only some of wires 144, 146, and 148 comprise reinforced decorative lighting wire 100, while some of wires 144, 146, and 148 comprise traditional, non-reinforced wire having the same or similar conductive properties of reinforced lighting wire 100. In one such embodiment, first power-terminal wire (or “lead”) wire 144 and second power-terminal (“return”) wire 146 comprise reinforced wire 100, while light-connecting wires 148 comprise traditional, non-reinforced wire. Such a structure may be particularly suited for use on a lighted artificial tree where wires 144 and 146 connect to a tree trunk and require greater strength. In another such embodiment, wires 144, 146, and one or several wires 148 may comprise reinforced lighting wire 100. In one such embodiment for use on a lighted artificial tree, wires 148 that span or crossover from one branch to another branch may comprise reinforced wire 100, while other wires 148 adjacent a single branch, do not comprise reinforced wire 100**.

Power plug 142 may comprise a traditional power plug comprising housing 156, first power terminal 158 and a second power terminal 160 for plugging into an outlet of an external power source, which may be an alternating-current (AC) power source. In an embodiment, power plug 142 may include a power transformer or power adapter that transforms the external source power to a lower voltage. For example, power plug 142 may transform a received 110 or 120 VAC power to 9 VDC (volts direct-current). In another embodiment, housing 156 and terminals 158/160 may comprise different shapes and sizes appropriate for a particular application. For example, if reinforced decorative light string 140 is used on a lighted tree (as will be described further below), a non-traditional plug and terminal arrangement may be used.

In other embodiments, reinforced decorative light string 140 may not include power plug 142. In one such embodiment, first and second power wires 144 and 146 may connect directly to a wiring harness of a lighted tree, or connect to a wiring harness or external source using individual wire connectors for each terminal or power wire 144 and 146.

In an embodiment, first power-terminal wire 144 is coupled to power plug 142 and in electrical connection with first power terminal 158. Second power-terminal wire 146 is also coupled to power plug 142, but electrically connected with second power terminal 160. For the particular electrical configuration depicted, first power-terminal wire 144 comprises a first electrical polarity, and second power-terminal wire 146 comprises a second, opposite, electrical polarity. In the case of DC power, a first electrical polarity may comprise a positive, while a second electrical polarity may comprise a negative polarity, or vice versa.

In the embodiment depicted, each of intermediate light-connecting wires 148, namely **148*a*-148*o*, makes an electrical connection between adjacent lamp assemblies to form a series electrical connection between lamp assemblies 150**.

Although depicted as a single series circuit, in other embodiments, decorative light string 140 may comprise multiple electrical circuits, such as two or more series circuits, each series circuit in parallel with the other. In one such embodiment, and as described further below with respect to FIG. 22, first power wires **144*a* and 144*b*, and second power wires 146*a* and 146*b* will conduct current from multiple circuits, and therefore, may be configured to have a higher ampacity than individual wires 148. In one such embodiment, first power-terminal wires 144*a* and 144*b* and second power wires 146*a* and 146*b* will comprise more or larger conductor strands 104, which increase the tensile strength relative to intermediate wires 148, and as such, in an embodiment may not comprise reinforcing strands 102, thereby, may not comprise reinforcing wires 100**.

Figure 14B:
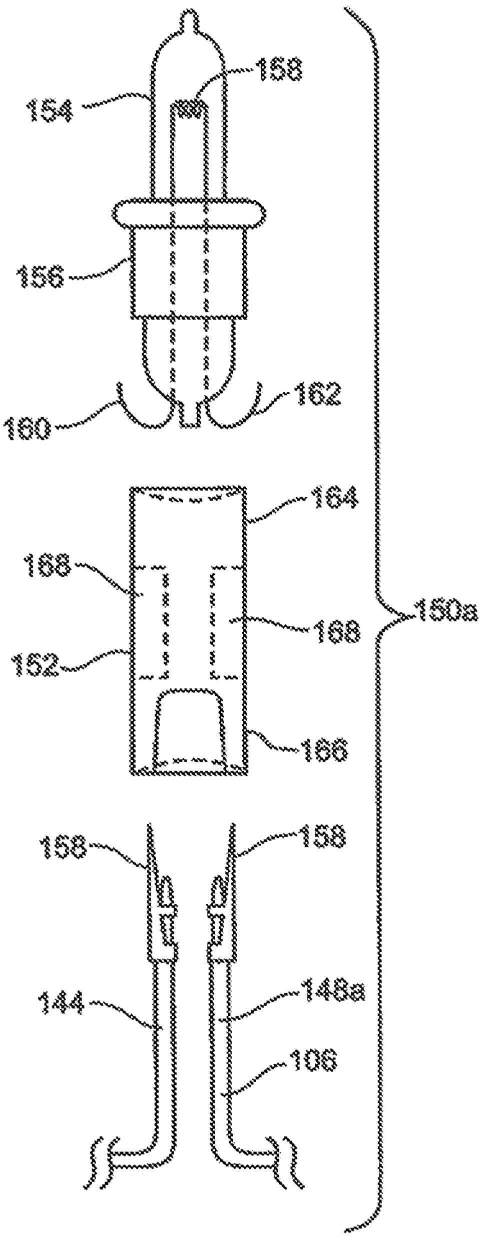
FIG. 14B is a front, exploded view of a lamp assembly of the decorative light string of FIG. 14A, according to an embodiment of the claimed invention.
Figure 15:
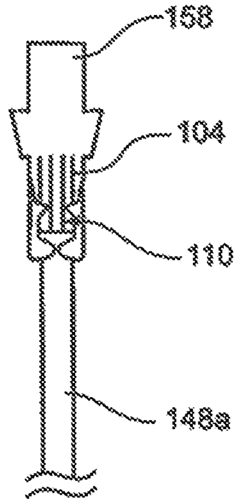
FIG. 15 is a front view of a reinforced wire attached to a wire terminal of the reinforced decorative light string of FIG. 14A.

Referring also to FIGS. 14B and 15, further details of the electrical connection between the wires of decorative light string 140 and lamp assemblies 148, using lamp assembly 150*a* as an example, are depicted.

As depicted and exemplified in the exploded view of FIG. 14B, each lamp assembly 150 includes a socket 152 and lamp element 154. As depicted, lamp assembly 150*a* includes socket 152*a* and lamp element 154. In an embodiment, lamp assembly 150 may also include an adapter or base attached to the lamp element 154.

In the depicted embodiment, lamp element 154 comprises an incandescent lamp or bulb having a filament 158 electrically connected to a first lead 160 and a second lead 162. However, in other embodiments, lamp elements 154 may comprise other types of lamp elements, including light-emitting diodes (LEDs) or LED lamps that comprise an LED chip and a pair of electrical leads in electrical connection with the LED chip.

In the embodiment depicted, reinforced decorative light string 140 comprises 16 lamp assemblies 150 (150*a* to 150*p*), however, other embodiments may include more or fewer lamp assemblies 150. In an embodiment, reinforced decorative light string 140 includes 50 lamp assemblies, intended to be connected to an AC power source, such as a 110 VAC power source, such that each lamp assembly is configured to operate at approximately 2.2 VAC.

In an embodiment, and as depicted, an end of each wire electrically connected to lamp element 154 includes a wire terminal 158. As depicted, each of wires 144 and 148*a* have a portion of insulation layer 106 is stripped at an end to expose conductor layer 110 and conductors 104. In an embodiment, wire terminal 158 is crimped on to the end of each wire or wire segment, such that a portion of terminal 158 is crimped onto a portion of insulation layer 106 and a portion is crimped onto, or otherwise in contact with, conductors 104, thereby forming an electrical connection between each wire terminal 158 and its respective wire 144 or 148.

Socket 152 generally comprises a generally hollow, cylindrical body having an opening at opposite ends, and comprising a polymer material. Socket 152 is configured to receive lamp element 154 at a top end 164, and when present, adapter 156. Socket 152 is also configured to receive wires 144 and 148*a* with their respective wire terminals 158 at bottom end 166. In an embodiment, socket 164 defines a pair of slots 168 for receiving and securing wire terminals 158 inside the cavity formed by socket 164.

Although the above description refers to wires 144 and 148*a*, as depicted, it will be understood that each lamp assembly 150 connects to wires 144, 146, and/or 148 in a similar manner.

Still referring to FIGS. 14A, 14B, and 15, an embodiment of the invention comprises a reinforced decorative lighting structure that includes wires 144, 146, 148, each wire having at least one crimped-on terminal 158, with each terminal 158 inserted into a lamp holder 152. In such an embodiment, the decorative lighting structure may comprise a sub-assembly of reinforced decorative light string 140 without power plug 142 and without lamp elements 154. Such a structure may be common to a variety of decorative light strings, trees with decorative lighting, net lights, sculptures or so on. Lamp elements 154 such as LEDs may be used in one embodiment, or incandescent bulbs in another embodiment. A power plug 142 may be added, and so on.

Figure 16:
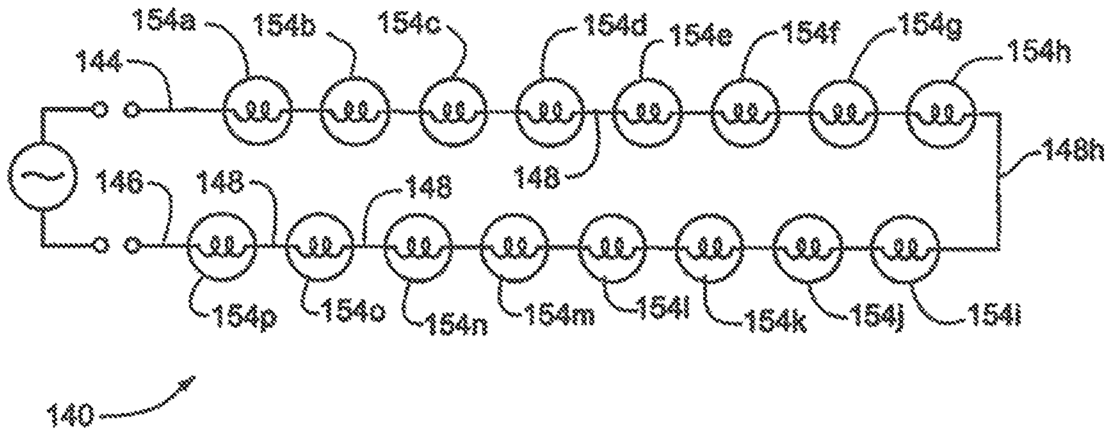
FIG. 16 is an electrical schematic of the reinforced decorative light string of FIG. 14A.

Referring to FIG. 16, an electrical schematic of reinforced decorative light string 140 is depicted. As depicted, reinforced decorative light string 140 comprises a series-connected configuration, such that each lamp element 154, including lamp elements 154*a*-154*p*, are electrically connected in series.

Comparing FIG. 14A, depicting a series-connected, reinforced decorative light string 140 of the claimed invention, to FIG. 1, depicting a prior-art decorative light string that includes standard wires twisted about one another, benefits of reinforced decorative light string 140 become apparent. As described briefly above, prior art light strings using standard, non-reinforced wire typically rely on the twisting of wires to create a stronger light string that resists breaking when subjected to axial pulling forces (see also force F1 depicted in FIG. 14A).

The use of reinforced wire 100 with its increased tensile strength alleviates the need to twist wires together, such that the "single-wire" configuration of reinforced decorative light string 140 is possible. The term "single wire" herein refers to a light string, such as reinforced decorative light string 140, that includes wires with reinforced wire 100, and only a single wire extending between, and connected to, a pair of lamp holders or sockets 152, the single wire not being twisted about another wire or a reinforcing strand. For example, and as described above, wires 148*a*-148*o* are not twisted about each other, nor are external strands twisted or wrapped about such wires.

In contrast, the "twisted pair" prior art depicted in FIG. 1 relies on twisting of wires or pairs of wires between lamp holders in order to increase overall tensile strength of the light set wiring, and to prevent wire breakage.

Although embodiments of a single-wire configuration comprise the present invention, embodiments of the present invention may also comprise a twisted-pair configuration for even further strength.

In addition to increased tensile strength and elongation, another advantage of a non-twisted-pair, or single-wire light string, such as single-wire reinforced decorative light string 140, lies in the ability of the light string to be flexibly distributed about a structure, such as an artificial tree. The decorative light string of FIG. 1 extends from one end to another in a linear fashion. In contrast, reinforced, single-wire decorative light string 140 may be flexibly adjusted to form a two-dimensional distribution, e.g., a square, circle, etc. Such flexibility allows reinforced decorative light string 140 to be attached to multiple branches and sub-branches of a tree, or portions of a lighted sculpture, in more creative and flexible ways, and at the same time, display less wire in any particular viewed area of the tree or sculpture.

Although reinforced decorative light string 140 is depicted as a simple single-circuit, series connected light string in FIGS. 14A-16, reinforced decorative light string 140 may comprise other configurations. Such configurations include series-parallel (multiple sets of series-connected lights, the sets in parallel), parallel, or parallel-series (multiple sets of parallel connected lights, the sets connected in series) configurations, or combinations thereof. The physical wire configurations may also vary, and are not necessarily limited to single-wire configurations. A number of such embodiments are depicted and described with respect to FIGS. 17-18.

Although each light string 140 is depicted as including a power plug 142, it will be understood that embodiments of a light string 140 may not include a power plug 142. In one such embodiment, light string 140 is configured to be applied to a lighted artificial tree such that wires 144 and 146 are electrically connected to power conductors of the tree by means other than a power plug 142. In other embodiments of a light string 140, alternate types of power plugs 142 may be used, such as a locking-connector power plug 142.

Figure 17:
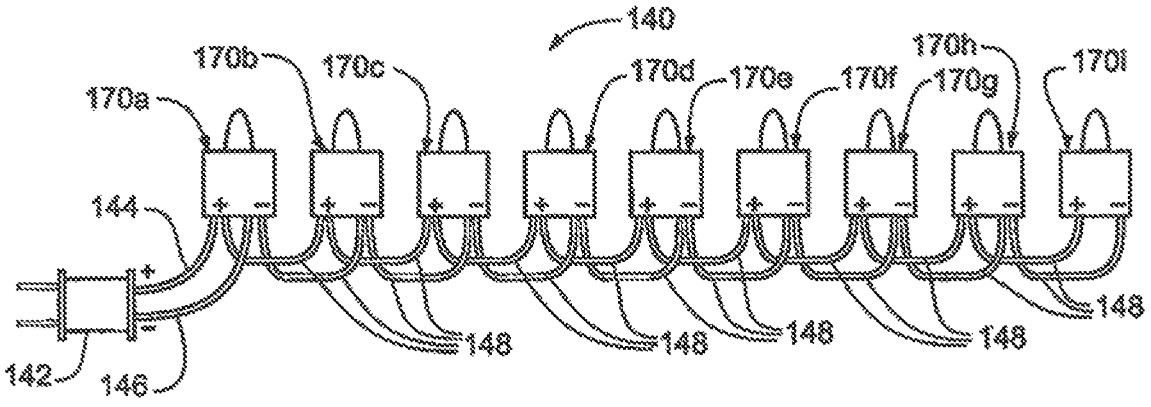
FIG. 17 is a view of a reinforced, parallel-connected, decorative light string, according to an embodiment of the claimed invention.
Figure 18:
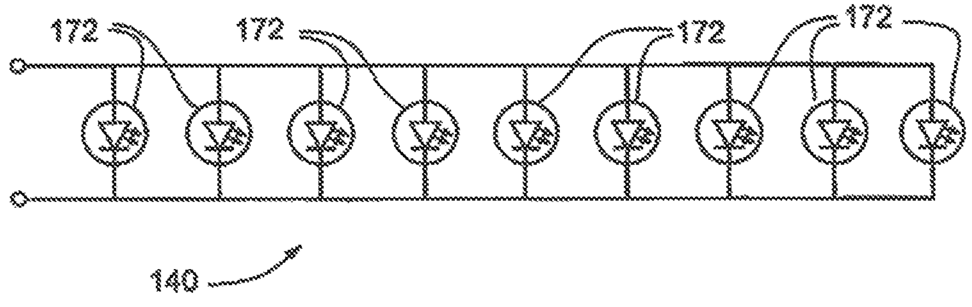
FIG. 18 is an electrical schematic of the reinforced decorative light string of FIG. 17.

Referring specifically to FIGS. 17 and 18, reinforced decorative light string 140 comprises an electrically parallel decorative light string. In the parallel embodiment depicted, decorative light string 140 comprises optional power plug 142, first power-terminal wire 144, second power-terminal wire 146, multiple light-connecting wires 148, and a plurality of lamp assemblies 170. First power-terminal wire 144, second power-terminal wire 146 and light-connecting wires 148 comprise reinforced decorative lighting wire 100. In an alternate embodiment, first power-terminal wire 144 and second power-terminal wire 146 do not comprise reinforced wire 100 due to their larger wire size and inherent strength relative to wires 148 (as similarly described above)

Although the plurality of reinforced wires 148 may be twisted for additional strength, in an embodiment, and as depicted, wires 148 may not be generally twisted about one another, though some wires 148 may cross one another, and be adjacent one another.

Lamp assemblies 170 (170*a*-170*j*) may be substantially the same as lamp assemblies 150, and connect to wires 148 and other wires in a manner substantially the same as lamp assemblies 150. In an embodiment, lamp assemblies 170 may be configured for incandescent bulbs 154, similar to lamp assemblies 150. In such a configuration, differences between lamp assemblies 150 and 170 relate to the number of wires received by each lamp assembly. As depicted, lamp assemblies 170 each receive four wires 148, with the exception of the lamp assembly 170*j* further from plug 142, which receives only two wires 148.

In another embodiment, lamp assemblies 170 may include lamp elements that comprise LEDs 172, rather than incandescent bulbs 154. The number of lamp assemblies 170 may vary, depending on a number of factors, including desired lamp assemblies in a single string, desired string length, tree size, and so on. In an embodiment, reinforced decorative light string 140 includes 20 to 100 lamp assemblies, though more or fewer lamp assemblies may be used.

As depicted in FIG. 18, LEDs 172 of reinforced decorative light string 140 may all be electrically connected in parallel. In one such embodiment, each LED 172 is configured to receive a low-voltage power, such as 3 VDC, though low-voltage AC power, or other voltages may also be used. Just as the lamp elements of parallel-configured reinforced decorative light string 140 are not limited to incandescent bulbs or LEDs, so too may the power delivered to reinforced decorative light string 140 not be limited only to DC power, or to a particular voltage.

Figure 19:
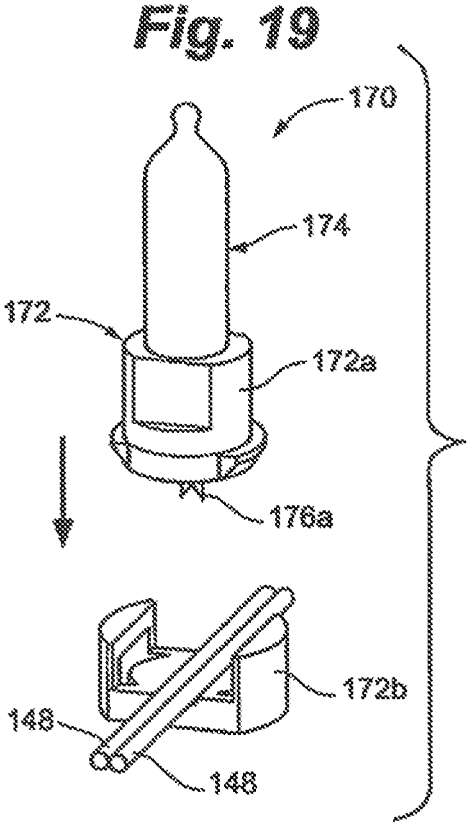
FIG. 19 is a front, perspective exploded view of a lamp assembly of the decorative light string of FIG. 17, according to an embodiment of the claimed invention.
Figure 20:
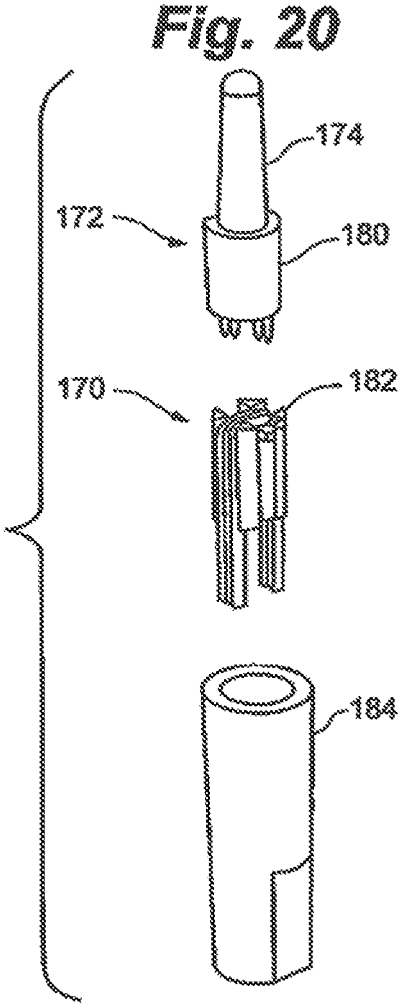
FIG. 20 is a front, perspective exploded view of another embodiment of a lamp assembly of the decorative light string of FIG. 17.
Figure 21:
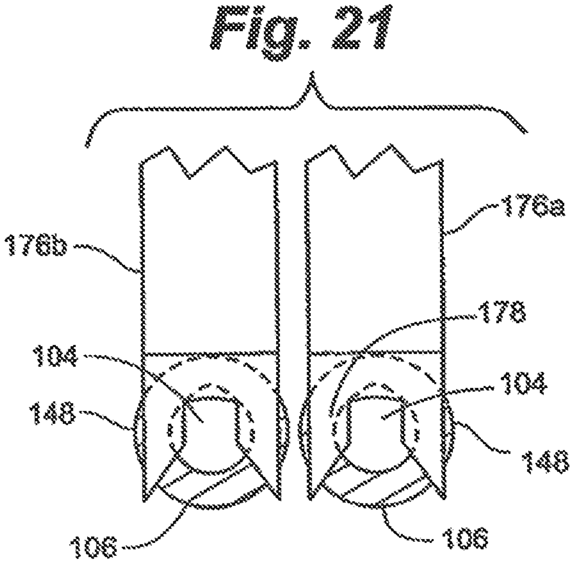
FIG. 21 is a front view of a pair of wire-piercing terminals of a lamp assembly of the reinforced decorative light string of FIG. 17.

Referring to FIGS. 19-21, lamp assemblies 170 may connect to embodiments of reinforced wire 100, such as wires 148, in a manner different from that as described with respect to FIGS. 14B and 15. In an embodiment, rather than stripping ends of wires 148 and crimping on a terminal 158, lamp assemblies 170 may comprise wire-piercing lamp assemblies that attach to continuous wires or wire segments.

Referring specifically to FIGS. 19 and 21, in an embodiment, lamp assembly 170 of reinforced decorative light string 140 comprises a wire-piercing lamp assembly that includes lamp holder 172, lamp element 174, and wire-piercing elements 176*a* and 176*b*. Wire-piercing elements 176*a* and 176*b* are in electrical connection to first and second leads of lamp element 174. In an embodiment, lamp holder 172 includes top portion 172*a* and bottom portion 172*b*. Bottom portion 172*b* is configured to receive and secure wires 148. Top portion 172*a* is configured to receive lamp assembly 174, which may comprise an incandescent bulb, LED or other lamp element.

As depicted in FIG. 21, when top portion 172*b* is coupled to top portion 172*a*, wire piercing elements 176*a* and 176*b* pierce insulating layer and make contact with conductor strands 104, which includes making contact with one or more of layers 108 and 110. As such, an electrical connection is made between a first lead of lamp element 174 and a wire 148, and a second lead of lamp element 174 and a wire 148. In such a configuration, wires 148 are continuous between lamp holders 172, rather than comprising wire segments with ends received by lamp holders 172.

Embodiments of wire-piercing light-assemblies are depicted and described in US 2011/0286223 A1, published Nov. 24, 2011, and entitled "Wire-Piercing Light-Emitting Diode Illumination Assemblies", which is herein incorporated by reference in its entirety.

Another embodiment of a wire-piercing light assembly 170 is depicted in FIG. 20. In this embodiment, lamp assembly 170 includes lamp element 174, top portion 180, insert 182, and socket 184. Embodiments of this wire-piercing wire-assembly and similar assemblies are depicted and described in US 2013/0163250 A1, published Jun. 27, 2013, and entitled "Decorative Lamp Assembly and s Including a Lamp Assembly", which is herein incorporated by reference in its entirety. Other embodiments of wire-piercing lamp assemblies that may be used with reinforced wire 100 are depicted and described in the following publications, which are also incorporated by reference in their entireties: US 2013/0078847 A1 and US 2013/0214691 A1.

Figure 22:
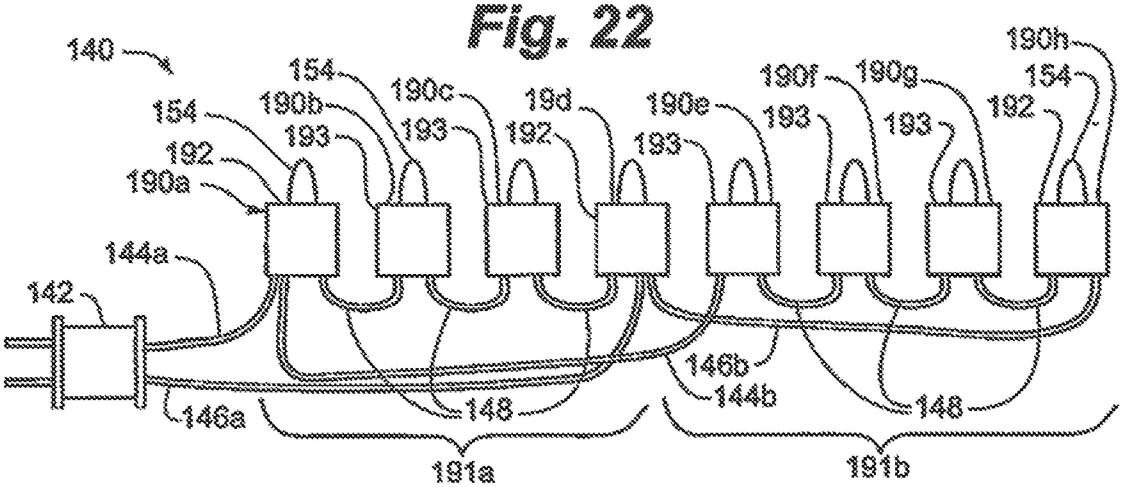
FIG. 22 is a view of a reinforced series-parallel connected decorative light string, according to an embodiment of the claimed invention.
Figure 23:
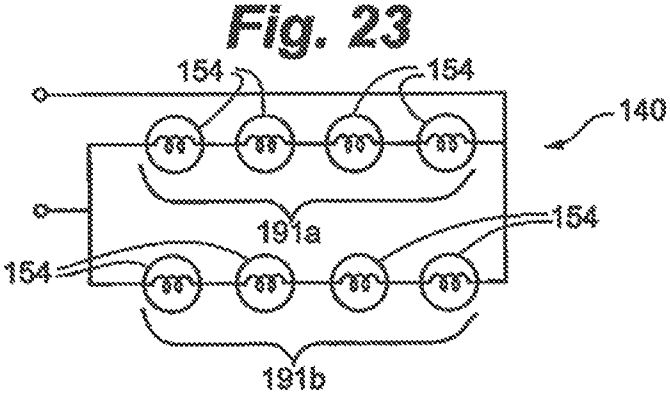
FIG. 23 is an electrical schematic of the reinforced decorative light string of FIG. 22.

Referring to FIGS. 22 and 23, another embodiment of a reinforced decorative light string 140 is depicted. In this embodiment, reinforced decorative light string 140 comprises a series-parallel-connected reinforced decorative light string.

In this embodiment, reinforced decorative light string 140 comprises optional power plug 142, first power-terminal wires 144*a* and 144*b*, second power-terminal wires 146*a* and 146*b*, multiple light-connecting wires 148, and a plurality of lamp assemblies 190*a* to 190*h*. First power wires 144 (144*a* and 144*b*), second power wires 146 (146*a* and 146*b*) and light-connecting wires 148 comprise reinforced decorative lighting wire 100. In other embodiments as described below, power wires 144 and 146 do not comprise reinforced wire 100.

Each lamp assembly 190 comprises a lamp element 154 (e.g., incandescent lamp or LED), and a lamp holder 192 or 193. Lamp holders 192*a* are configured to receive three wires, which may be a combination of wires 144 and 148 or 146 and 148 or only wires 148; lamp holders 193 are configured to receive two wires. As depicted, lamp assemblies 190*a* (first lamp assembly), and lamp assembly 190*d* comprise three-wire lamp holders 192, while the remaining lamp holders comprise two-wire lamp holders 193. In other embodiments, lamp assemblies 190*e* and 190*h* may comprise three-wire lamp holders and reinforced decorative light string 140 may include an additional first power-terminal wire and an additional second power-terminal wire connected to lamp assemblies 190*e* and 190*h* and to an end connector plug for connecting to another (not depicted).

In the embodiment depicted, reinforced decorative light string 140 comprises two sets of lamp elements 154, first set 191*a* and second set 191*b*. Lamp elements 154 of first set 191*a* are electrically connected in series; lamp elements 154 of second 191*b* are electrically connected to one another; and first set 191*a* is electrically connected in parallel with second set 196*b*. The number of lamp elements 154 in each set may vary, and in particular, may be larger than that depicted. In an embodiment, each of first and second sets 191*a* and 191*b* include 50 lamp elements. In an embodiment, each lamp element is configured to receive approximately 2.2 VAC power. Further, the number of sets of lamp assemblies is not limited to two sets, and may be larger for an individual reinforced decorative light string 140 having a series parallel construction.

In an embodiment, all intermediate or shorter wires 148 may comprise reinforced wire 100, while first and second power wires 144 and 146 do not comprise reinforced wire 100, but rather, comprise traditional decorative lighting wire that does not include an internal reinforcing strand 102.

In one such embodiment, each of non-reinforced first and second power wires 144 and 146 comprise more conductor strands 104 as compared to each intermediate wire 148, or alternatively, wires 144 and 146 have a greater cross-sectional area of conductor as compared to intermediate wires 148, which may be due to a greater current carrying requirement of power wires 144 and 146 as compared to intermediate wires 148. This may be the case for multiple circuits of wires 148 all powered by a single set of wires 144 (144*a* and 144*b*) and 146 (146*a* and 146*b*). However, in an embodiment, a tensile strength or axial pulling force at breakage of wires 144 and 146 as compared to wires 148 is approximately the same. In an embodiment, approximately the same means within 10%; in another embodiment, approximately the same means within 5%; in another embodiment, approximately the same means within 1% difference between wires 144/146 and wires 148. The advantage is that wires of the decorative lighting string 140 have substantially the same strength, regardless of whether standard wire or reinforced wire. Further, it will be understood that such configurations apply to decorative lighting strings as applied to trees, net lights, sculptures, and other decorative lighting assemblies as described herein and further below.

In an embodiment, a thickness of an insulating layer 106 of each wire 148 is approximately the same as an insulating layer of a non-reinforced wire 144 or 146. In one such embodiment, the tensile strength of the light string 140 for wires 144/146 and wires 148 are approximately the same, In an embodiment, an outside diameter of non-reinforced power wires 144/146 are approximately the same as intermediate wires 148. Such an embodiment provides a more uniform, and therefore aesthetically pleasing, look to the reinforced decorative light string 140 or reinforced decorative lighting assembly.

In an embodiment, each series circuit of reinforced decorative light string 140 is has an overall length that does not exceed 13 feet, while the overall length of the light string 140 does not exceed 51 feet, as required in some decorative lighting applications. In one such embodiment, reinforced decorative light string 140 is configured to conduct a maximum of 170 mA.

In an embodiment, reinforced decorative light string 140 includes reinforced wire 100 that comprises 7-10 conductor strands 104. In an embodiment, the number of conductor strands 104 depends upon desired ampacity. In an embodiment, the reinforced wire 100 used may comprise 8 or 10 conductor strands. In one such embodiment having 8 strands, each conductor defines an average diameter that is within a range of 0.15 mm to 0.16 mm.

In an embodiment, intermediate wires 148 comprise reinforced wire configured for a first ampacity, and power wires 144 and 146 are configured for a second, higher ampacity. In one such embodiment, a sum of the cross-sectional area of conductor strands 104 of either of power wire 144 or 146 is greater than a sum of the cross-sectional area of all of conductor strands 104 of an intermediate wire 148, wherein "cross-sectional" refers to a section normal to a wire axis A.

In an embodiment, all intermediate wires 148 are limited to an average maximum of 20 inches in length.

Figure 24:
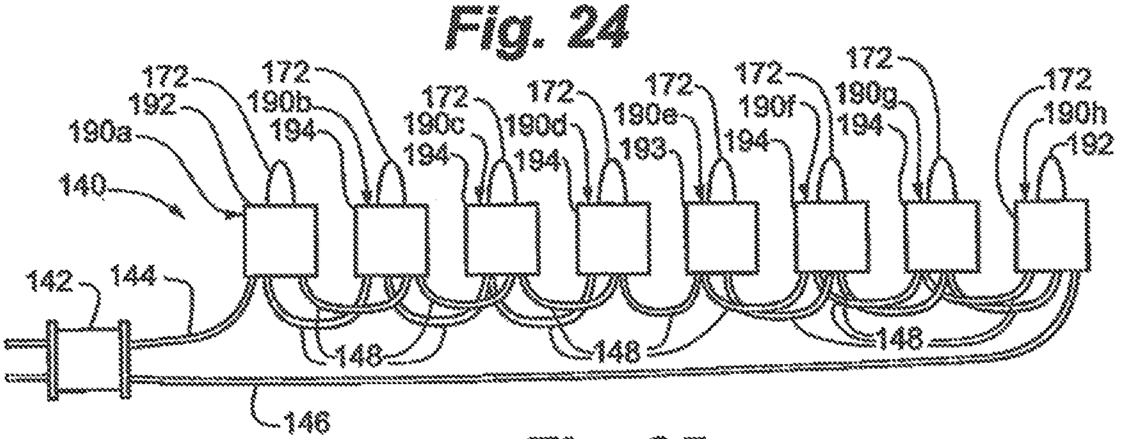
FIG. 24 is a view of a reinforced parallel-series connected decorative light string, according to an embodiment of the claimed invention.
Figure 25:
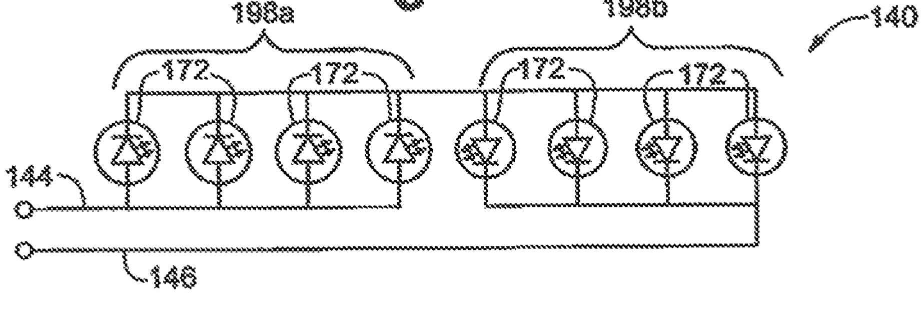
FIG. 25 is an electrical schematic of the reinforced decorative light string of FIG. 24.

Referring to FIGS. 24 and 25, another embodiment of reinforced decorative light string 140 is depicted. In this embodiment, reinforced decorative light string 140 comprises a parallel-series configuration.

In this embodiment, decorative light string 140 comprises optional power plug 142, first power-terminal wire 144, second power-terminal wire 146, multiple light-connecting wires 148, and a plurality of lamp assemblies, including lamp assemblies 190*a* to 190*h*. First power-terminal wires 144, second power-terminal wires 146 and light-connecting wires 148 comprise reinforced decorative lighting wire 100.

Each lamp assembly 190 (190*a* to 190*h*) comprises a lamp element 172, such as an LED, and a lamp holder 192 or 194. Lamp holders 192 are configured to receive three wires, which may be a combination of wires 144 and 148 or 146 and 148 or only wires 148; lamp holders 194 are configured to receive four wires. As depicted, lamp assemblies 190*a* (first lamp assembly), and lamp assembly 190*d* comprise three-wire lamp holders 192, while the remaining lamp holders comprise four-wire lamp holders 193. In other embodiments, lamp holders 190*e* and 190*h* may comprise three-wire lamp holders and decorative light string 140 may include an additional first power-terminal wire and an additional second power-terminal wire connected to lamp holders 190*e* and 190*h* and to an end connector plug for connecting to another (not depicted).

In the embodiment depicted, reinforced decorative light string 140 comprises two sets of lamp elements 172, first set 198*a* and second set 198*b*. Lamp elements 172 of first set 196*a* are electrically connected in parallel; lamp elements 172 of second 198*b* are electrically connected to one another in parallel; and first set 198*a* is electrically connected in series with second set 198*b*, to form a parallel-series light string. The number of lamp elements 172 in each set may vary. In an embodiment, the number of lamp elements 172 in each set 198 ranges from 3 to 60; in an embodiment, the number of lamp elements 172 ranges from 10 to 20 lamp elements; in an embodiment, the number of lamp elements 172 is the same in each set, but different in other embodiments. Each lamp element 172 may be configured to operate at a particular voltage or range. In an embodiment, lamp elements 172 may be configured to operate at 3V, AC or DC, though lamp elements 172 may be configured to receive any designed voltage, including generally used voltages such as 2.5V, 3V, 6V, 12V, and so on.

Further, the number of sets 198 of lamp elements 172 may be greater than the two sets 198*a* and 198*b* depicted. In an embodiment, the number of sets ranges from 2 sets to 50 sets; in an embodiment, the number of sets ranges from 3 sets to 10 sets.

The resultant voltage at each light set 198 at each lamp element 172 In an embodiment, each lamp element 172 is configured to receive 3V power (AC or DC); in another embodiment, each lamp element 172 is configured to receive 2.5V; in other embodiments, lamp elements 172 are configured for other voltages as needed and depending on the particular power source available and a reinforced decorative light string 140 configuration. Further, the number of sets of lamp assemblies is not limited to two sets, and may be larger for an individual reinforced decorative light string 140 having a series-parallel construction. In an embodiment, reinforced decorative light string 140 includes three sets 198, each set 198 and each lamp element 172 configured to receive 3V.

Figure 26:
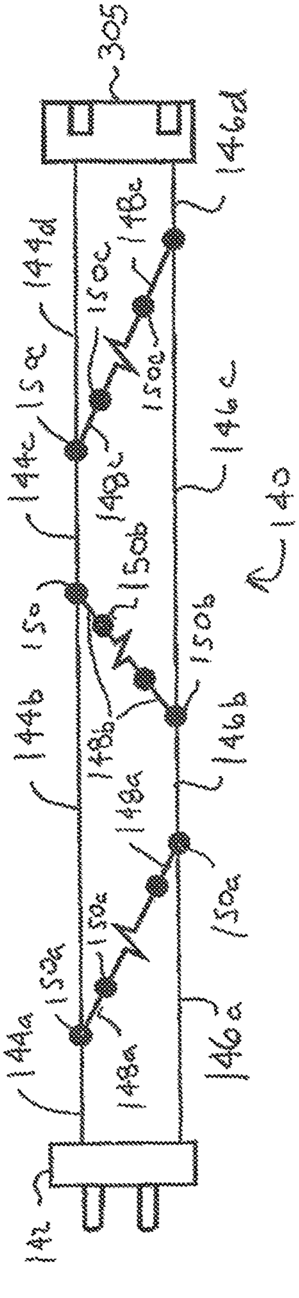
FIG. 26 is a schematic and wire layout of a 3-circuit reinforced decorative light string with a power end connector, according to an embodiment of the claimed invention.

Referring to FIG. 26, an embodiment of a reinforced decorative light string 140 comprising three electrical circuits is depicted. Similar to light string 140 as depicted and described with respect to FIG. 22 above, light string 140 of FIG. 26 includes multiple sets of lamp assemblies 150 wired in series, each set wired in parallel (parallel-series configuration).

While FIG. 26 comprises a schematic depiction of this particular embodiment of reinforced decorative lighting string 140, it will be understood that each line represents a wire or wire segment, e.g., 144*a*, 148, etc., such that FIG. 26 also depicts an actual wire layout (though lengths of wires are representational only).

In this embodiment, reinforced decorative light string 140 comprises power plug 142, first power or power-terminal wires 144, second power or power-terminal wires 146, first series-circuit lamp assemblies 150*a* interconnected by first intermediate wires 148*a*, second series-circuit lamp assemblies 150*b* interconnected by second intermediate wires 148*b*, third series-circuit lamp assemblies 150*c* interconnected by third intermediate wires 148*c*, and power end connector 305. In an embodiment, power wires 144 include power wires 144*a*, 144*b*, 144*c*, and 144*d*, while power wires 146 includes power wires 146*a*, 146*b*, 146*c* and 146*d*. Power wires 144 and 146 conduct current for the entire light string 140, as well as power for other light strings that may be plugged into end connector 305. Conversely, each intermediate wire 148 conducts current only for its respective single series circuit.

In an embodiment, all wires, including wires 144*a-d*, 146*a-d*, and 148*a-c* comprise reinforced decorative lighting wire 100.

In another embodiment, only intermediate wires 148*a-c* comprise reinforced wires 100, while power wires 144*a-d* and 146*a-d* comprise standard, non-reinforced wires. As discussed above with respect to FIG. 22, for multiple circuit light strings, power wires 144 and 146 in a non-reinforced configuration will generally be configured with more conductor strands and ampacity, such that their inherent strength is similar to, approximately the same as, or greater than, the strength of individual reinforced intermediate wires 148. In such a configuration, it may not be necessary to reinforce power wires 144 and 146 since the outcome would be to have power wires that may be unnecessarily stronger than wires 148.

In an embodiment, intermediate wires 148 comprise reinforced wire configured for a first ampacity, and power wires 144 and 146 are configured for a second, higher ampacity. In one such embodiment, a sum of the cross-sectional area of conductor strands 104 of either of power wire 144 or 146 is greater than a sum of the cross-sectional area of all of conductor strands 104 of an intermediate wire 148, wherein "cross-sectional" refers to a section normal to a wire axis A.

Figure 27:
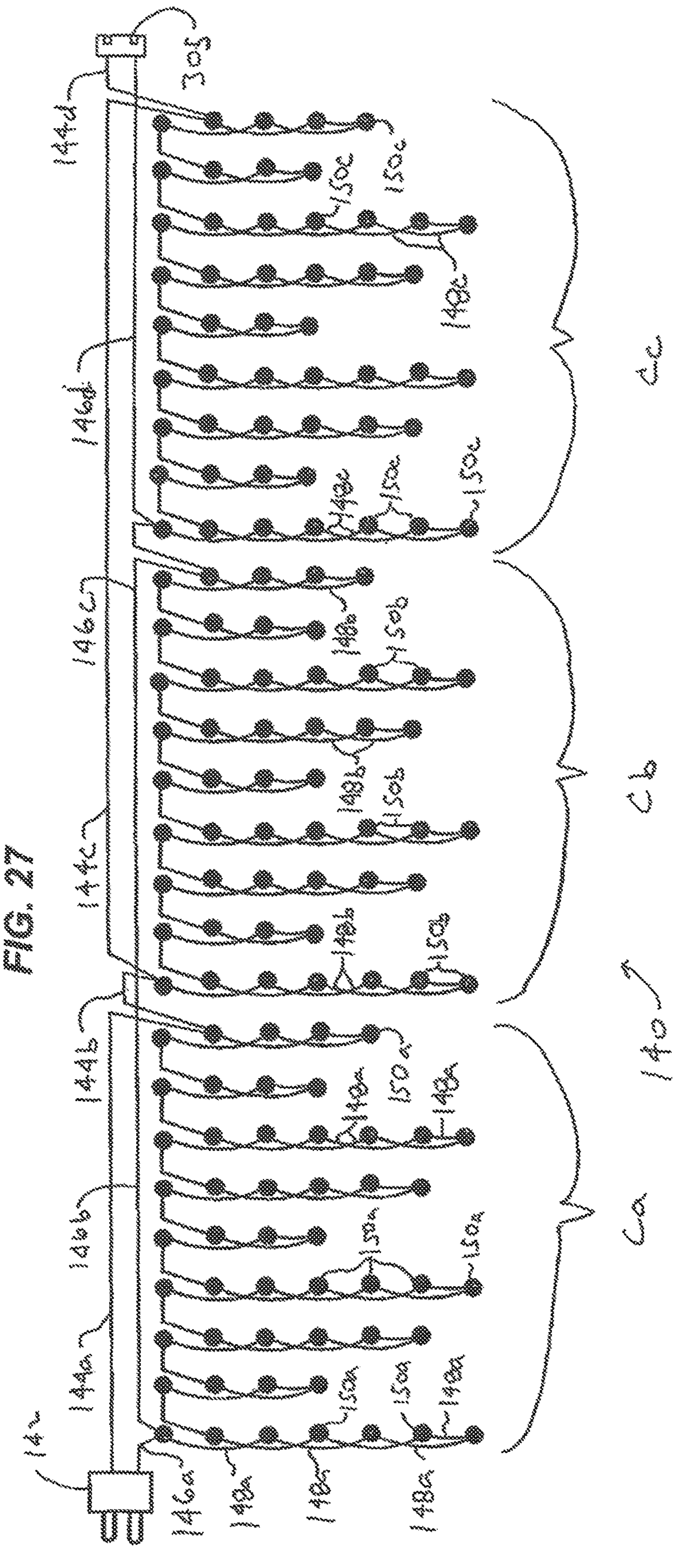
FIG. 27 is a schematic and wire layout of a 3-circuit reinforced decorative light string with a power end connector, the light string configured as an icicle light string, according to an embodiment of the claimed invention.

Referring to FIG. 27, in an embodiment, reinforced light string 140 may be configured in an "icicle" configuration, as will be understood by those skilled in the art. In an icicle configuration, a set of wires extends horizontally, while multiple sets of wires extend vertically away from the horizontally extending wires to form an "icicle" pattern. In one such embodiment, the total length of wire 100 used in a series circuit may be limited to 12 feet maximum.

As depicted, icicle light string 140 is substantially the same as decorative light string 140 as depicted in FIG. 26, with the exception of the various lengths of wires, and wire configurations. In an embodiment, icicle light string 140 comprises power plug 142, first power or power-terminal wires 144, second power or power-terminal wires 146, first series-circuit (circuit Ca) lamp assemblies 150*a* interconnected by first intermediate wires 148*a*, second series-circuit (circuit Cb) lamp assemblies 150*b* interconnected by second intermediate wires 148*b*, third series-circuit (circuit Cc) lamp assemblies 150*c* interconnected by third intermediate wires 148*c*, and power end connector 305. In an embodiment, power wires 144 include power wires 144*a*, 144*b*, 144*c*, and 144*d*, while power wires 146 includes power wires 146*a*, 146*b*, 146*c* and 146*d*. Power wires 144 and 146 conduct current for the entire light string 140, as well as power for other light strings that may be plugged into end connector 305. Conversely, each intermediate wire 148 conducts current only for its respective single series circuit.

In an embodiment, all wires of icicle light string 140 comprise reinforced wire 100.

In another embodiment, only intermediate wires 148*a-c* comprise reinforced wires 100, while power wires 144*a-d* and 146*a-d* comprise standard, non-reinforced wires for reasons described above with respect to light string 140 of FIG. 26.

Because an icicle configuration include multiple strands of downward (as would be the case when applied to a house or similar outdoor structure) hanging strands comprising multiple wires 148 and lamp assemblies 150 may be particularly prone to tangling and pulling when being applied to a structure. The use of reinforced wire 100 on an icicle light string 140 minimizes to possibility of wire damage or breakage under such conditions.

Figure 28:
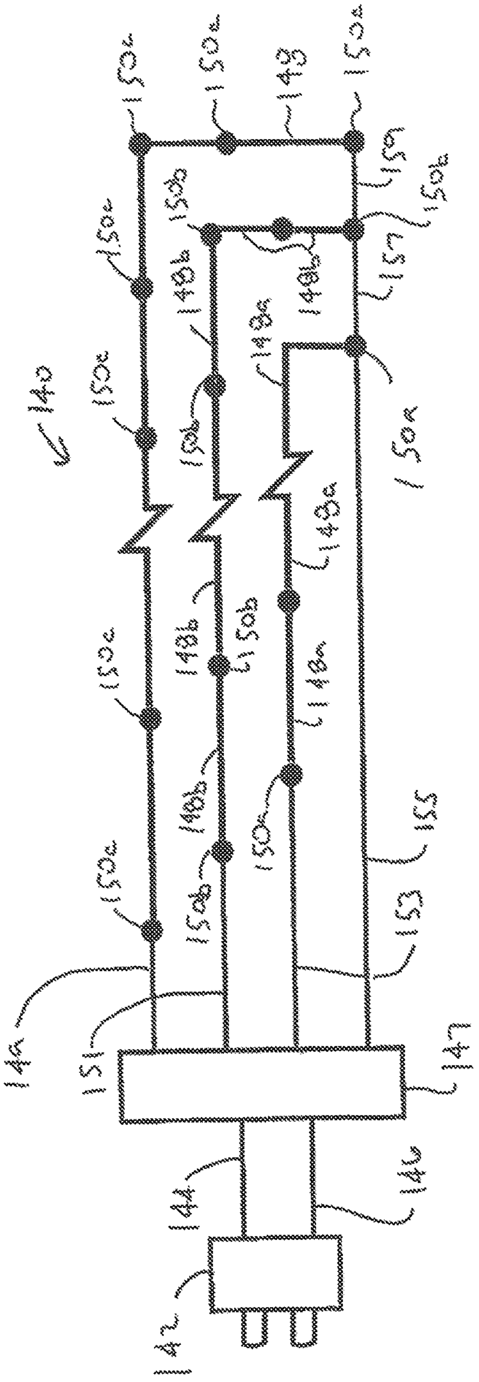
FIG. 28 is a schematic and wire layout of a multi-circuit, reinforced chasing decorative light string, according to an embodiment of the claimed invention.

Referring to FIG. 28, an embodiment of a "chasing" reinforced decorative light string 140 is depicted. Chasing light string 140 includes power plug 140, first power wire 144 and second power wire 146, controller 147, first circuit power wires 149, 151 and 153, second circuit power wires 155, 157 and 159, and three series circuits a, b, and c. In an embodiment, first circuit power wires 149, 151 and 153 are "live", "hot" or positive wires, while second circuit power wires 155, 157, and 159 are "neutral" or ground wires.

Each series circuit a, b, and c is controlled by controller 147, as will be understood by those skilled in the art. In an embodiment, controller 147 may comprise a processor, microcontroller, microcomputer, microprocessor, or similar such processing unit. Controller 147 may also include memory devices in electrical communication with the processor and storing software including algorithms for controlling the multiple circuits.

Series circuit a comprises series power wire 153, and a plurality of lamp assemblies 150*a* connected in series by a plurality of intermediate wires 148*a*. Series circuit b comprises series power wire 151, and a plurality of lamp assemblies 150*b* connected in series by a plurality of intermediate wires 148*b*. Series circuit c comprises series power wire 149, and a plurality of lamp assemblies 150*c* connected in series by a plurality of intermediate wires 148*c*.

In an embodiment, wires of chasing light string 140 may be twisted along a longitudinal or horizontal axis parallel to depicted wires 149-155, such that chasing light string 140 resembles a single strand of sequential lights, the lights being a sequence comprising a light assembly 150*a* followed by a light assembly 150*b*, followed by a light assembly 150*c*, and so on. Various patterns of turning circuits a, b, and c on and off can create a variety of lighting effects.

Similar to embodiments described above, all wires of chasing reinforced decorative light string 140 may comprise reinforced decorative lighting wire 100. In other embodiments, only selected wires, and in particular main or power wires, may comprise reinforced wire 100.

In one such embodiment, first and second power wires 144 and 146 do not comprise reinforced wire, nor do wires 149, 151, 153, 155, 157, and 159, though all wires 148 comprise reinforced wire 100, for reasons and advantages similar to those described above with respect to FIGS. 22, 26 and 27.

Figure 29:
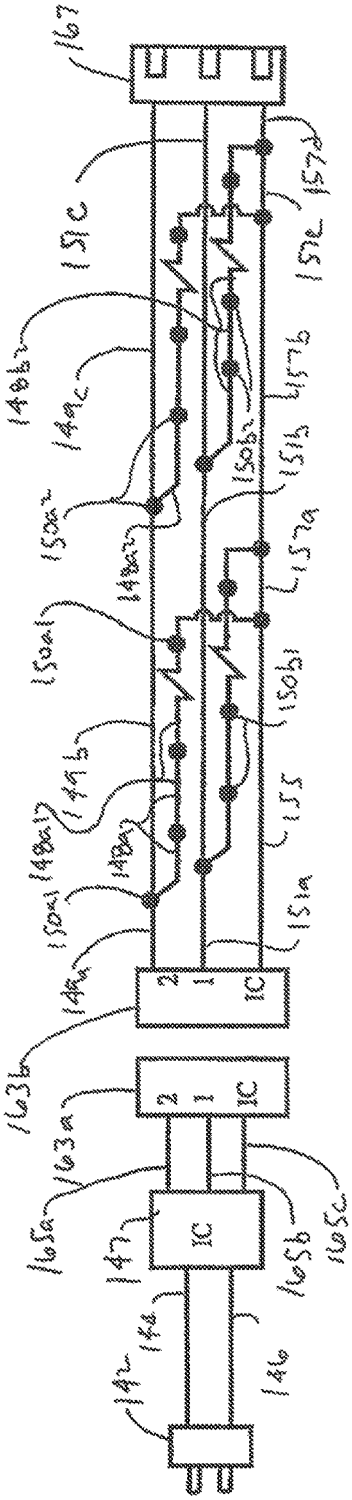
FIG. 29 is a schematic and wire layout multi-circuit, synchronized decorative light string, according to an embodiment of the claimed invention.

Referring to FIG. 29, a synchronized, multi-circuit reinforced decorative light string 140 is depicted. Synchronized light string 140 of FIG. 29 is similar to chasing light string 140 of FIG. 28 above, in that a controller 147 provides control over multiple circuits of lamp assemblies 150.

In an embodiment, synchronized light string 140 includes power plug 142, first power wire 144, second power wire 146, main controller 147, first synchronized connector 163*a*, second synchronized connector 163*b*, connector 167, controller-connector wires 165*a*, 165*b*, and 165*c*, circuit power wires 149*a-c*, 151*a-c*, 155 and 157*a-d*, a plurality of intermediate wires 148, and a plurality of lamp assemblies 150. Connector 167 in an embodiment is configured to communicatively coupled to a synchronized connector 163*a* of another synchronized light string 140.

As depicted, synchronized light string 140 comprises multiple circuits of series connected lamp assemblies 150, each two series circuits connected in parallel. Series circuits a1 and a2 are wired in parallel, while series circuits b1 and b2 are wired in parallel to one another.

In an embodiment, synchronized connectors comprise 3-wire connectors, and may each may comprise a sub-controller in communication with main controller 147. As such, main controller 147 may communicate with multiple sub-controllers of multiple synchronized light strings 140 that may be connected one to another using synchronized connectors 163 and connectors 167. In an embodiment, sub-controllers control power to the series circuits of lights to create different lighting effects.

In an embodiment, all wires of synchronized, reinforced light string 140 comprise reinforced wire 100.

In other embodiments, only intermediate wires 148 comprise reinforced wire 100 for reasons similar to those described above with respect to FIGS. 22, 26, and 27, and may have a lower ampacity than those of power wires 144 or 146, or other non-intermediate wires. In one such embodiment, intermediate wires 148 comprise reinforced wire configured for a first ampacity, and power wires 144 and 146 are configured for a second, higher ampacity. In one such embodiment, a sum of the cross-sectional area of conductor strands 104 of either of a power wire 144 or 146 is greater than a sum of the cross-sectional area of all of conductor strands 104 of an intermediate wire 148, wherein “cross-sectional” refers to a section normal to a wire axis A.

Each of the above reinforced decorative light string 140 include reinforced wire 100 in any of the first and second power-terminal wires 144, 146, intermediate light-connecting wires 148, or other wires. Each reinforced decorative light string 140 may be a single-wire as described above, wherein one or more light-connecting wires 148 is generally not twisted about another light-connecting wire 148 or reinforcing strand. In one such embodiment, a wire 148 of reinforced decorative light string 140 does not turn or twist about another wire at all, which in an embodiment means another wire does not make a full turn about another wire. In other embodiments, reinforced decorative light string 140 includes wires 148 that only make up to three full turns about another wire, such that they are partially twisted. In other embodiments, reinforced decorative light string 140 may include twisting of wires 148 in any fashion, such that the reinforced decorative light string comprises a “twisted-pair” light string.

Embodiments of reinforced decorative light strings 140 as described in the figures above may be applied to artificial trees, outdoor sculptures, and so on in order to create safer, stronger, and more attractive decorative lighting products.

In an embodiment, all wires of light string 140 comprise reinforced lighting wire 100. In another embodiment, only wires 144 and 146 comprise reinforced lighting wire 100, while wires 148 comprise standard, non-reinforced wires. In yet another embodiment, wires 144 and 146 comprise reinforced wires, and fewer than all of the wires 148 comprise reinforced lighting wire 100. In one such embodiment, only one of wires 148 comprises a reinforced lighting wire 100. In such an embodiment, the one reinforced wire 148 may be a wire configured to extend from a first branch of an artificial tree to a second branch of an artificial tree. The various light strings 140 depicted in the other figures may comprise similar such embodiments.

Figure 30:
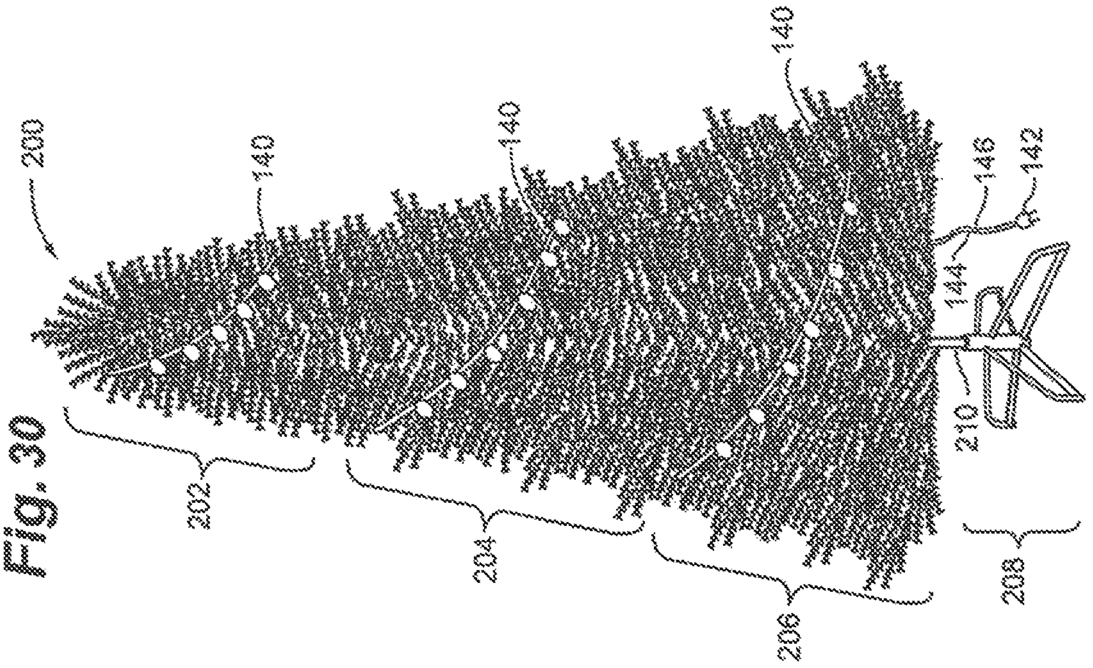
FIG. 30 is a front view of an artificial tree including a reinforced light string, according to an embodiment of the claimed invention.

Referring to FIG. 30, an embodiment of reinforced-wire artificial lighted tree 200 is depicted. Reinforced wire tree 200 may include multiple tree sections, including top section 202, middle section 204 and bottom section 206, as well as trunk 210. Tree sections may be separable along trunk 210. In other embodiments, tree 200 may not be separable, and trunk 210 may be a continuous trunk. Tree 200 may also include base 208 supporting reinforced wire tree 200.

Reinforced-wire lighted tree 200 also includes a plurality of reinforced decorative light strings 140, according to any of the embodiments described above, including light strings 140 in a series, parallel, series-parallel, or parallel-series, electrical configuration. In the embodiment depicted, tree 200 includes reinforced light strings 140 distributed about branches of the various tree sections 202 to 206, with one or more power plugs 142 accessible to a user of tree 200. In this embodiment, reinforced decorative light strings are located externally on tree sections 202 to 206.

In an embodiment, a light string 140 is distributed over more than one branch, such that one or more wires span two branches, or extend from one branch to another branch. In such an embodiment, at least the wire spanning from one branch to another branch may comprise reinforced lighting wire 100.

The use of reinforced decorative light strings 140 on tree 200 provides a number of advantages over the use of conventional light strings. For example, and as mentioned briefly above, the use of reinforced wire provides additional safety benefits by strengthening the wires of the light strings 140 on tree 200, decreasing the likelihood that manipulation of the tree causes wiring to break. Further, the use of single-wire constructed reinforced light strings 140 decreases the amount of wire generally used, as twisted pairs of wires are avoided, thereby increasing the aesthetic appearance of tree 200.

Figure 31:
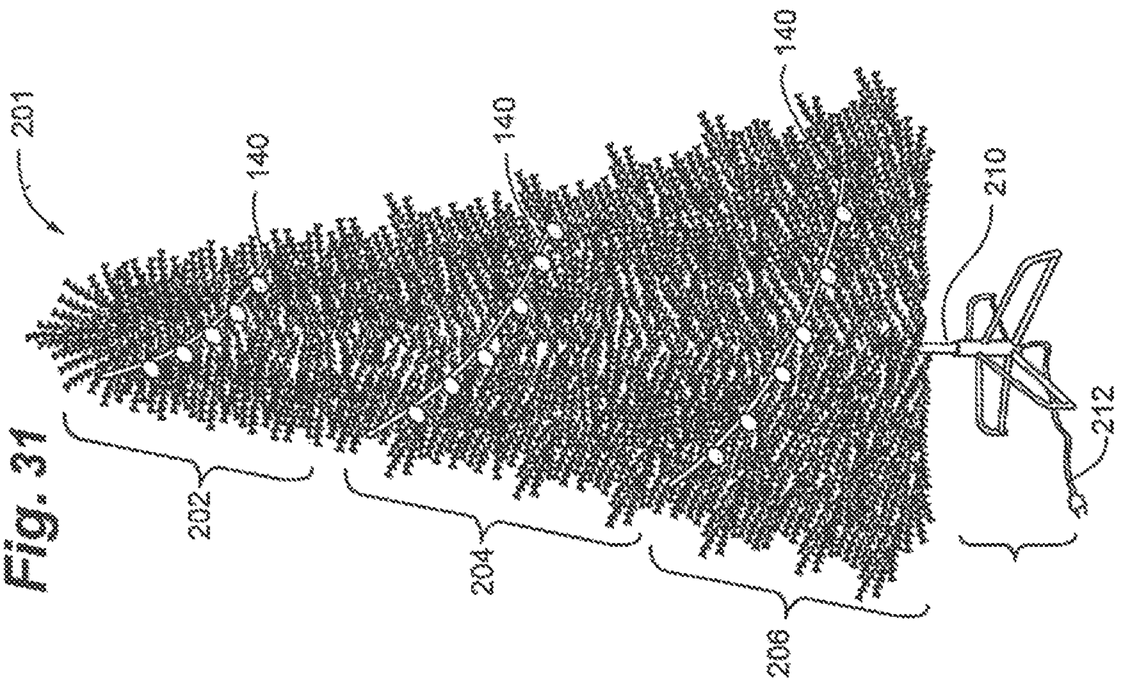
FIG. 31 is a front view of a reinforced-wire, lighted artificial tree including a reinforced light string and trunk wiring system, according to an embodiment of the claimed invention.

Referring to FIG. 31, in another embodiment, embodiments of light strings 140 as described above are applied to another lighted artificial tree 201 having a central wiring system housed at least in part inside trunk 210.

As depicted, reinforced-wire lighted tree 201 may also include tree sections 202, 204, and 206, base 208, trunk 210, power cord 212, and multiple reinforced decorative light strings 140. Unlike the embodiment of tree 200 described above, tree 201 includes a central wiring system 214 housed inside trunk 210, as described further below with respect to FIG. 32.

Figure 32:
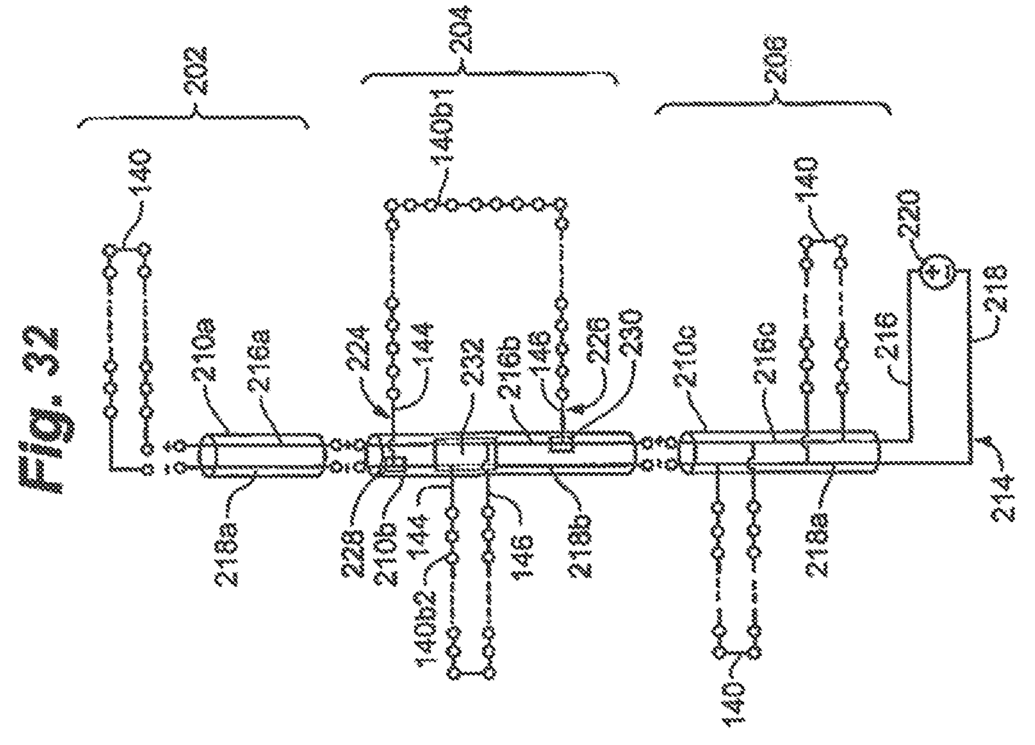
FIG. 32 is a block diagram of a trunk-wiring system of the lighted tree of FIG. 31 according to an embodiment of the claimed invention.

Referring to FIG. 32, central, trunk wiring system 214 in electrical connection with multiple reinforced decorative light strings 140 is depicted. In the depicted embodiment, trunk wiring system 214 includes a pair of power wires 216 and 218 extending (in segments) from a bottom area of trunk 210 to a top area of trunk 210. In the embodiment depicted, trunk 210 includes three trunk portions, top trunk portion 210*a*, middle trunk portion 210*b*, and bottom trunk portion 210*c*. In an embodiment, power wires 214 and 216 extend inside trunk 210, inside each trunk section 210*a* to 210*c*. As depicted, each power wire 214 comprises individual power wires 214*a*, 214*b*, and 214*c*, housed respectively, fully or partially, in trunk portions 210*a*, 210*b*, and 210*c*.

Trunk portion 210*a* is configured to mechanically connect to trunk portion 210*b*, and trunk portion 210*b* is configured to mechanically connect to trunk portion 210*c*, such that trunk 210 is formed. When the mechanical connections between trunk portions are made, electrical connections between portions of central wire system 214 are made. In other words, power wire portion 216*a* becomes electrically connected to power wire portion 216*b*, which becomes electrically connected to power wire portion 216*c*. Similarly, wire portions 218*a* to 218*c* become electrically connected. Wiring system 214 may comprise standard, non-reinforced wires, or may include reinforced wire 100 of the claimed invention. Although not depicted, wiring system 214 may include a power converter or adapter for changing a power source voltage, for example, from 110 VAC to 9 VDC, which may be internal to, or external, to trunk 210.

Mechanical and electrical connections may be made between tree sections 202, 204, and 206, and their respective trunk portions and wiring sub-systems in a number of ways, some of which are described herein, and some of which are known and described in patent publications including: U.S. Pat. No. 8,454,186, entitled "Modular Lighted Tree with Trunk Electrical Connectors"; US20120075863, entitled "Decorative Light Strings for Artificial Lighted Tree; and US 20130163231, entitled "Modular Lighted Artificial Tree", which are all herein incorporated by reference in their entireties.

Still referring to FIG. 32, each reinforced decorative light string 140 is electrically connected to one of power wire pairs 216 and 218 so as to receive power from an external power source 220. Reinforced decorative light strings 140 are depicted in a simplified manner, resembling a series connection, but it will be understood, and as described above, that tree 201 may include light strings 140 having any combination of the above-described electrical configurations.

As depicted, tree section 202 includes a single reinforced light string 140 connected to central wiring system 214 above, or at a top portion of trunk portion 210*a*. In this embodiment, power wires 216*a* and 218*a* extend outside trunk portion 210 to connect to a light string 140.

As depicted, and in an embodiment, tree section 204 includes two reinforced decorative light strings 140, namely, 140*b*1 and 140*b*2. In this embodiment, reinforced decorative light string 140*b*1 comprises a single-wire light string, such as a series-connected string or a series-parallel light string. Reinforced decorative light string 140*b*1 is electrically connected to power wires 214*b* and 216*b*, which represent a first electrical polarity and a second electrical polarity, at first end 224 of 140*b*1 and second end 226 of 140*b*1, respectively. First end 224 includes first power-terminal wire 144, which is electrically connected to power wire 214*b*, while second end 226 includes second power-terminal wire 146, which is electrically connected to power wire 216*b*.

In the embodiment depicted, first terminal wire 144 enters generally hollow trunk portion 210*b* at a first location 228, which may be an aperture, then connects inside trunk portion 210*b* to power wire 214*b*. In another embodiment, first terminal wire 144 may terminate at an electrical connector at first location 228 (see description below regarding FIGS. 33A to 33D), and make electrical connection to power wire 214*b* via the electrical connector.

Second terminal wire 146 enters generally hollow trunk portion 210*b* at second location 230, which may be an aperture, then connects inside trunk portion 210*b* to power wire 216*b*. In another embodiment, second terminal wire 146 may terminate at an electrical connector at first location 230, and make electrical connection to power wire 216*b* via the electrical connector.

In an embodiment, first location, aperture, or opening 228 will be unique from second location, aperture or opening 230. In an embodiment, and as depicted, first location 228 is located vertically above second location 230. In such an embodiment, and particularly for a single-wire light string 140, lamp elements and wiring may be more easily distributed about a greater external area (more branches) of tree section 204. In another embodiment, first location 228 is located at a same vertical level, but opposite, or even adjacent second location 230.

In other embodiments, both power wires 144 and 146 may electrically connect to central wiring system 214 at approximately the same location. Still referring to FIG. 32, reinforced light string 140*b*2 electrically connects to trunk wiring system 214 at location 232, which may also comprise an opening or aperture in the trunk, with or without an electrical connector.

Referring also to FIGS. 33A to 33D, several embodiments of electrical trunk connectors 240 coupled to trunk 210 (including any of trunk portions 210*a*, 210*b*, or 210*c*), are depicted.

Figure 33B:
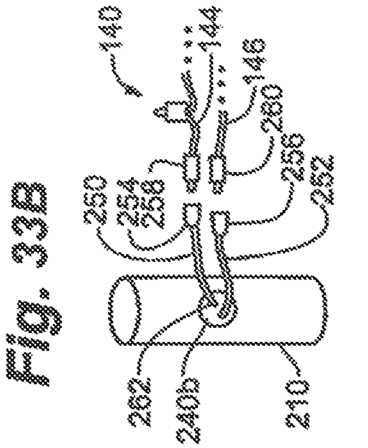
FIGS. 33A-33D are front views of electrical connectors in trunk portions of the lighted tree of FIG. 31.
Figure 33D:
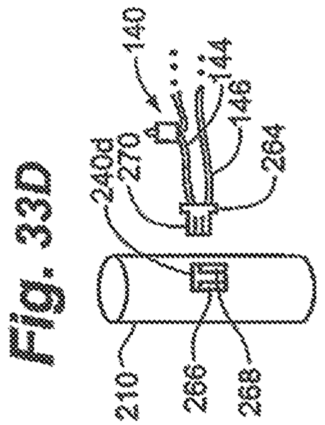
Figure 33A:
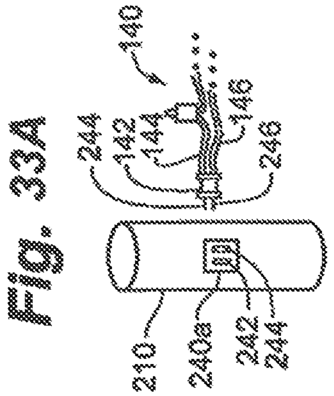

Referring specifically to FIG. 33A, in an embodiment, trunk 210 of tree 201 includes one or more electrical connectors 240*a* configured to receive power plug 142 of reinforced light string 140. In this embodiment, electrical connector 240*a* comprises a pair of slotted openings 242 and 244 configured to receive a pair of electrical terminals 246 and 248, respectively of power plug 142. Electrical connector 240*a* is in electrical connection with central wiring system 214, and may include a pair of electrical terminals adjacent slotted openings 242 and 244 such that power wire 214 electrically connects to a first terminal of electrical connector 240*a*, which electrically connects to terminal 244 of plug 142, which electrically connects to first power-terminal wire 144 of reinforced light string 140. Similarly, power wire 216*a* electrically connects to a second terminal of electrical connector 240*a*, which electrically connects to terminal 246 of plug 142, which electrically connects to second power-terminal wire 146 of reinforced light string 140. As such, power source 220 provides electrical power to reinforced light string 140 via trunk wiring system 214 and electrical connector 240*a*.

Referring to FIG. 33B, and still to FIG. 32, a different embodiment of an electrical connector 240 is depicted. Electrical connector system 240*b* includes a pair of connecting wires 250 and 252 in electrical connection with power wires 216 and 218, respectively. Electrical connector 240*b* system also includes a pair of electrical connectors 254 and 256, each electrically connected to each of connecting wires 250 and 252, respectively. In an embodiment, electrical connectors 254 and 256 comprise a female connector adapted to receive a corresponding male electrical connector, such as an embodiment of electrical connectors 258 and 260, respectively. Electrical connectors 258 and 260 are in electrical connection with first power-terminal wire 144 and second power-terminal wire 146. In other embodiments, the electrical connection system may include different kinds of connector sets 254/256 and 258/260, such as spade terminal connectors, coaxial connectors, ring terminals, and other such connector sets for connecting a pair of wires.

In an embodiment, grommet 262 may be inserted into opening 232 to secure and protect connecting wires 250 and 252.

Figure 33C:
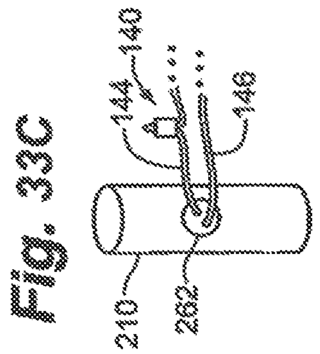

Referring to FIG. 33C, in an embodiment, first power wire 144 and second power wire 146 are directly connected to power wires 216 and 218 inside trunk 210. In such an embodiment, wires 144 and 146 may pass through opening 232, which may include a grommet or other securing device 262.

Referring to FIG. 33D, another embodiment of an electrical connector 240 coupled to trunk 210 is depicted. Similar to the embodiment depicted in FIG. 33A, electrical connector 240*d* is electrically connected to trunk wiring system 214, such that a pair of electrical contacts or terminals 266 and 268 are in electrical connection with power wires 216 and 218. Electrical connecter 240*d* is coupled to the wall of trunk 210 at location/opening 232, and is configured to receive a power plug 264 so as to provide power to reinforced light string 140. In this embodiment, a non-traditional electrical connector system is used. Electrical connector 264 includes flat terminals 270 positioned adjacent connector body 264 that are configured to make electrical connection to terminals 266 and 268. It will be understood that various methods and devices, such as electrical connectors, may be used to electrically connect reinforced decorative light strings 140 to trees 200 or 201, and the claimed invention is not intended to be limited to the specific embodiments described above.

In an embodiment, reinforced-wire lighted tree 201 includes one or more reinforced decorative light strings 140 that include non-reinforced wire for first and second power wires 144 and 146, and reinforced wire 100 for intermediate wires 148. Further, some, and in an embodiment, a majority, of intermediate wires 148 are in contact with branches of reinforced-wire lighted tree 201, thereby receiving some degree of support from the branches.

The increased tensile strength of reinforced decorative light strings 140 in conjunction with the various connectors described above, provides additional safety for a user of tree 200 or 201. For example, it is not uncommon for persons removing light strings from outlets to pull on the light string wiring to disconnect the light string from the power source. If a user were to attempt to disconnect a light string 140 from its connection to trunk 210 by pulling on wires 144, 146, or 148, the increased tensile strength of reinforced wire 100 would decrease that chances that the light string wiring would break, and increase the chances that the plug would be become disconnected from the electrical trunk connector, thereby further increasing the overall safety of the lighted tree.

As described in part above, in an embodiment, all wires comprising a light string 140 may include reinforced wiring. In other embodiments only some wires in a light string 140 may be reinforced. In one such embodiment, and still referring to FIGS. 32-33D, one or both of a lead wire 144 and a return wire 146 may comprise reinforced wiring 100. Because the lead and/or return wires that form the connection between the rest of the light string 140 and a power plug or power source tend to be handled by a user and potentially are subject to pulling forces, the use of reinforced wiring at the lead and return portion of the light string 140 advantageously strengthens the light string 140 at the point where it is most needed.

Figure 34:
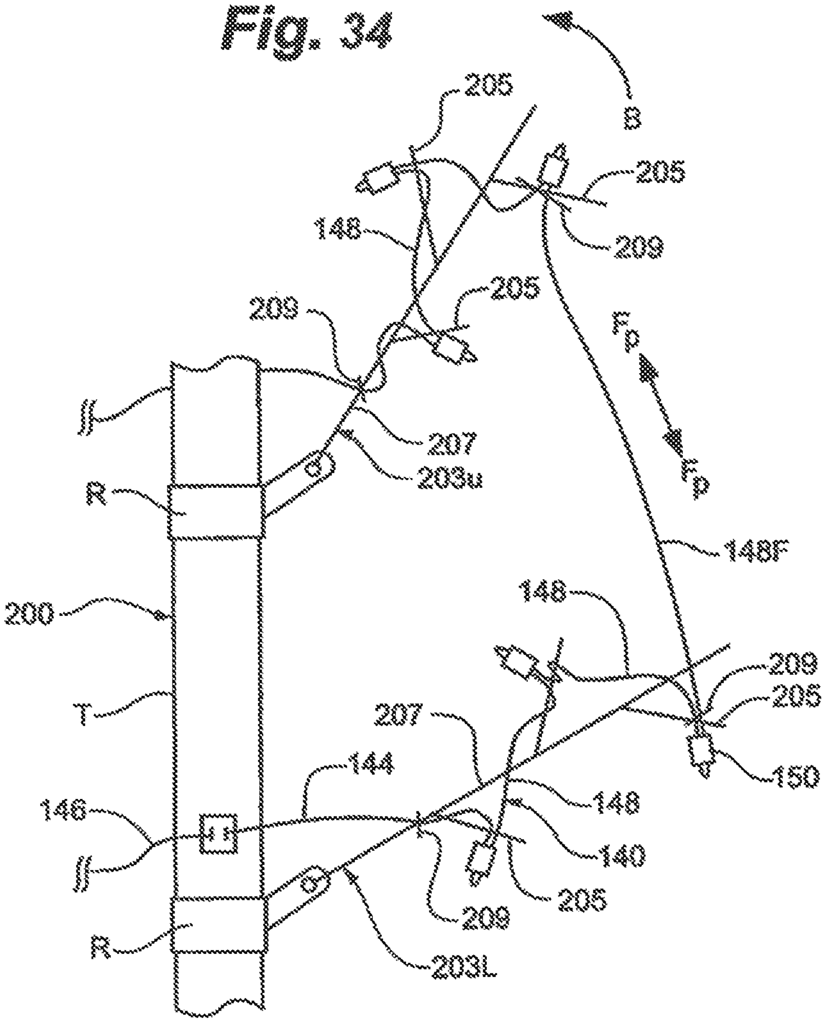
FIG. 34 is a front view of a portion of the lighted tree of FIG. 31, depicting a light string attached to multiple trees and extending between two branches.

Further, it would not be uncommon for a person or user to move, pivot, or bend branches of a tree 200, thereby pulling on attached lights strings. Consequently, in other embodiments, portions of a light string 140 that span multiple branches may comprise reinforced wiring 100. Branches of a tree 200 may be hinged, or in some way able to pivot at connection to a trunk of the tree 200. If a light string 140 spans multiple branches of a tree 200, as depicted in FIGS. 30 and 31, a pulling force may be exerted on a light string 140 on that portion of the light string 140 that extends between the branches. FIG. 34 depicts such a situation.

In FIG. 34, a portion of tree 200 with reinforced decorative light string 140 is depicted. In the depicted portion, tree 200 includes lower branch 203L and upper branch 203U both pivotally connected to trunk T at trunk rings R. Each branch 203 includes multiple sub-branches 205. Branch 203U is depicted as being moved in a generally upward direction B.

Reinforced decorative light string 140 is attached to each of branches 203U and 203L. As depicted, intermediate light-connecting wires 148 are wrapped about branches 203U and 203L, including at their various sub-branches 205, or may be attached to branches 203 or sub-branches 205 via clips 209. As specifically depicted, light string 140 may be clipped to a branch 203 at two or more points, including at a branch point proximal trunk T, and a point distal trunk T.

When branch 203U is pivoted in a direction indicated by arrow B, intermediate light-connecting wire 148F is subjected to a pulling force Fp, as depicted. To prevent damage or breakage in such a situation, intermediate wire 148F may comprise reinforced decorative wire 100. In an embodiment, other intermediate light-connecting wires 148 may not include reinforced decorative wire 100 as they may not be subjected to force Fp caused by branch movement.

In an embodiment, wires 144 and/or 146, in addition to intermediate wire 148F may comprise reinforced wire. In yet another embodiment, multiple intermediate wires 148, such as those adjacent to intermediate wire 148F may be reinforced. In an embodiment, wherein light string 140 spans more than two branches 203, light string 140 may include multiple intermediate wires 148F that extend from branch-to-branch, such that all such intermediate wires 148F are reinforced. Intermediate wire 148F extends from branch 203L to 203U, and comprises reinforced decorative wire 100.

Further, it will be understood that such a light string 140 having intermediate wire 148F may also be distributed about branches that are adjacent one another, meaning at approximately the same height relative to trunk T. In such an embodiment, wire 148F may still span from one branch 203 to another branch 203, but will do so in approximately the same horizontal plane, rather than extending from a lower branch to an upper branch.

In another embodiment, such a light string 140 may extend between upper and lower branches, and between adjacent, same-height branches.

Figure 35:
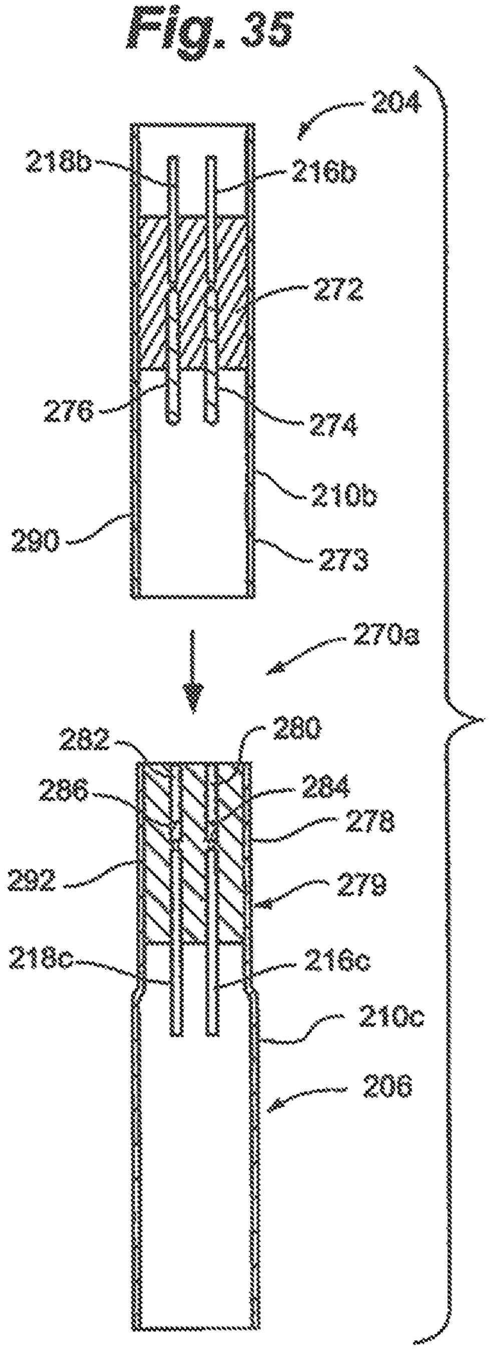
FIG. 35 is a front view of a mechanical and electrical trunk connection system of the tree of FIG. 31, according to an embodiment of the claimed invention.
Figure 36:
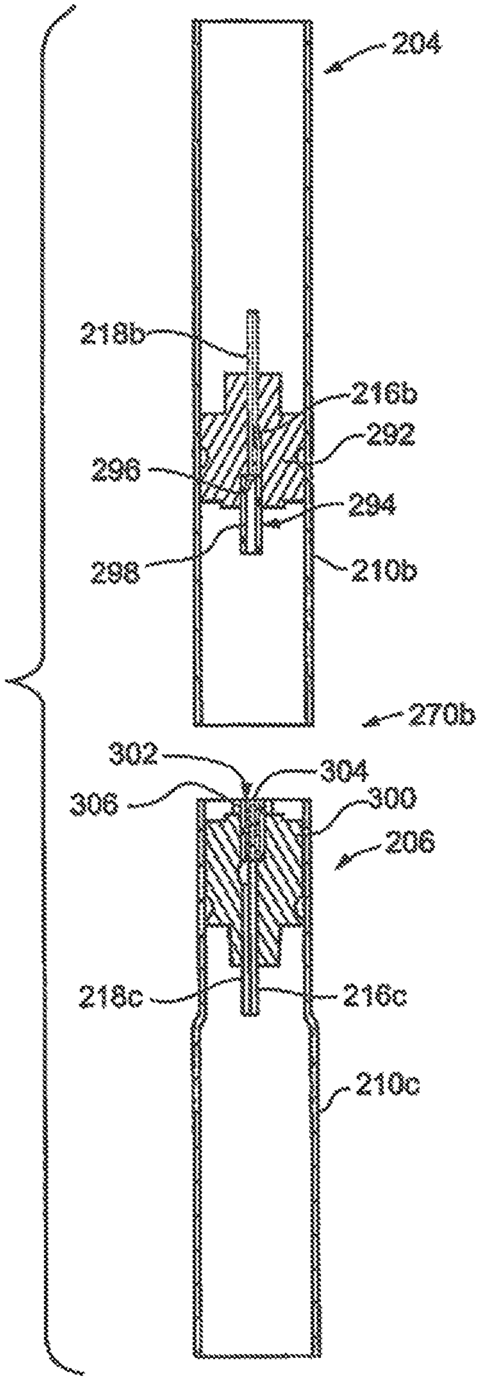
FIG. 36 is a front view of a mechanical and electrical trunk connection system of the tree of FIG. 31, according to another embodiment of the claimed invention.

Referring to FIGS. 35 and 36 two embodiments of an internal trunk connector system 270*a* and 270*b* are depicted. Such internal trunk connector systems 270 may be used together with trunk wiring system 214 and reinforced decorative light strings 140 described above, in trees 201. In some embodiments, trunk wiring system 214 may include reinforced decorative lighting wire 100 inside trunk portions of a modular lighted tree 201.

Referring specifically to FIG. 35, in an embodiment, trunk connector system 270 couples two tree sections together, such as tree section 204 and tree section 206 of tree 201 having an internal trunk wiring system 214, mechanically, and electrically (see also FIG. 31).

In an embodiment, trunk portion 210*b* houses connector body 272 at first end 273 of trunk portion 210*b*. Connector body 272 may be inserted into trunk portion 210*b* such that it is fully inside trunk portion 210*b*, or in other embodiments, portions of connector body 272 may extend out of, or be even/flush with, end 273. A pair of electrical terminals 274 and 276, which may have a first and second electrical polarity, are in electrical connection with power wires 216*b* and 218*b*, respectively. In an embodiment, power wires 216*a* and 218*b* may comprise reinforced wire 100. Using reinforced wiring internal to tree 201 increases the durability of wiring system 214, and prevents damage that might occur during manufacturing or use. In other embodiments, power wires 216*a* and 218*b* may comprise known, non-reinforced decorative wire. Connector body 272 receives and secures at least a portion of terminals 274 and 276, and in an embodiment, terminals 274 and 276 extend outwardly and away from connector body 272, forming "male" terminals. Terminals 274 and 276 may form other types of electrical contacts or terminals in addition to the pin-like terminals depicted, such as spade terminals, coaxial terminals, and so on. In an alternate embodiment, a mechanical sleeve may be used to join trunk portions.

In an embodiment, trunk portion 210*c* houses connector body 278 at first end 279 of trunk portion 210*c*. Connector body 278 may be inserted into trunk portion 210*b* such that it is fully inside trunk portion 210*b*, or in other embodiments, portions of connector body 272 may extend out of, or be even/flush with, end 273. As depicted, connector body 278 is flush with the very end of end 279. A pair of electrical terminals 284 and 286, which may have a first and a second electrical polarity, are in electrical connection with power wires 216*c* and 218*c*, respectively. Terminals 284 and 286 may also form, or be in contact with, a pair of sockets 282 and 284 configured to receive male terminals 274 and 276.

When trunk portion 210*b* of tree section 204 is coupled to trunk portion 210*c* of tree section 206, terminals 274 and 276 are received by sockets 280 and 282, making electrical connection with terminals 284 and 286, such that power wires 216*a* and 216*b* are in electrical connection, and power wires 218*a* and 218*b* are in electrical connection with one another. Consequently, electrical power is available in tree section 204 at power wires 216*b* and 218*b*.

When trunk portion 210*b* of tree section 204 is coupled to trunk portion 210*c* of tree section 206, a mechanical connection is also made. In the depicted embodiment, first end 273 of trunk portion 210*b* is generally not tapered, while first end 279 of trunk portion 210*c* is tapered so as to be received by end 273. Consequently, when trunk portions 210*b* and 210*c* are coupled together, both an electrical and mechanical connection are made.

Referring specifically to FIG. 36, an alternate embodiment of a connector system 270 is depicted. Connector system 270*b* comprises a generally coaxially connection system. In the embodiment depicted, trunk 210*b* houses connector body 290 securing electrical terminal set 292. Electrical terminal set 292 forms cavity or socket 294 and includes first terminal 296 and second terminal 298.

First electrical terminal 296 is electrically connected to power wire 218*b*, and is located at a base of socket 294. In an embodiment, terminal 296 may form a simple flat conductive portion. In another embodiment, terminal 296 is formed of a conductive inside surface of socket 294.

Second electrical terminal 298, in an embodiment, forms a cylindrical portion having a conductive outer surface, or portion thereof.

Trunk portion 210*c* of tree section 206 houses connector body 300, which in turn supports electrical terminal set 302. Electrical terminal set 302 includes first electrical terminal 304 and second electrical terminal 306. In an embodiment, first terminal 304 comprises a pin terminal projecting upwardly along a central axis of trunk 210*c*. In an embodiment second terminal 306 comprises a cylindrical conductive portion, including a conductive inner surface or portion thereof.

Electrical terminal 304 is electrically connected to power wire 216*c*, and terminal 306 is electrically connected to power wire 218*c*.

When trunk portion 210*b* is coupled to trunk portion 210*c*, a mechanical and electrical connection is made between tree sections 204 and 206. Terminal 304 is received into socket 294 and makes electrical connection to terminal 296; terminal 306 receives terminal 298 and the two terminals make electrical connection. Consequently, power wires 216*b* and 216*c* are in electrical connection, as are power wires 218*b* and 218*c*.

In embodiments of reinforced decorative light wire trees 201, including those described above, may comprise decorative light strings 140 having intermediate wires 148 that are each 20 inches or less in length, and comprise 8 conductor strands. In one such embodiment tree 201 is configured not to conduct more than 300 mA total current. In an embodiment, wires 148 include an outer layer configured to withstand a 60 degrees C. temperature.

Embodiments of this connector system 270*b* are depicted and described in U.S. Pat. No. 8,454,186, entitled "Modular Lighted Tree with Trunk Electrical Connectors", which is herein incorporated by reference in its entirety.

Reinforced decorative light strings 140 and reinforced decorative lighting wire may be used to create other reinforced-wire decorative lighting products in addition to trees. Such reinforced products include net lights, outdoor sculptures, lawn stakes, and other such goods.

Figure 38:
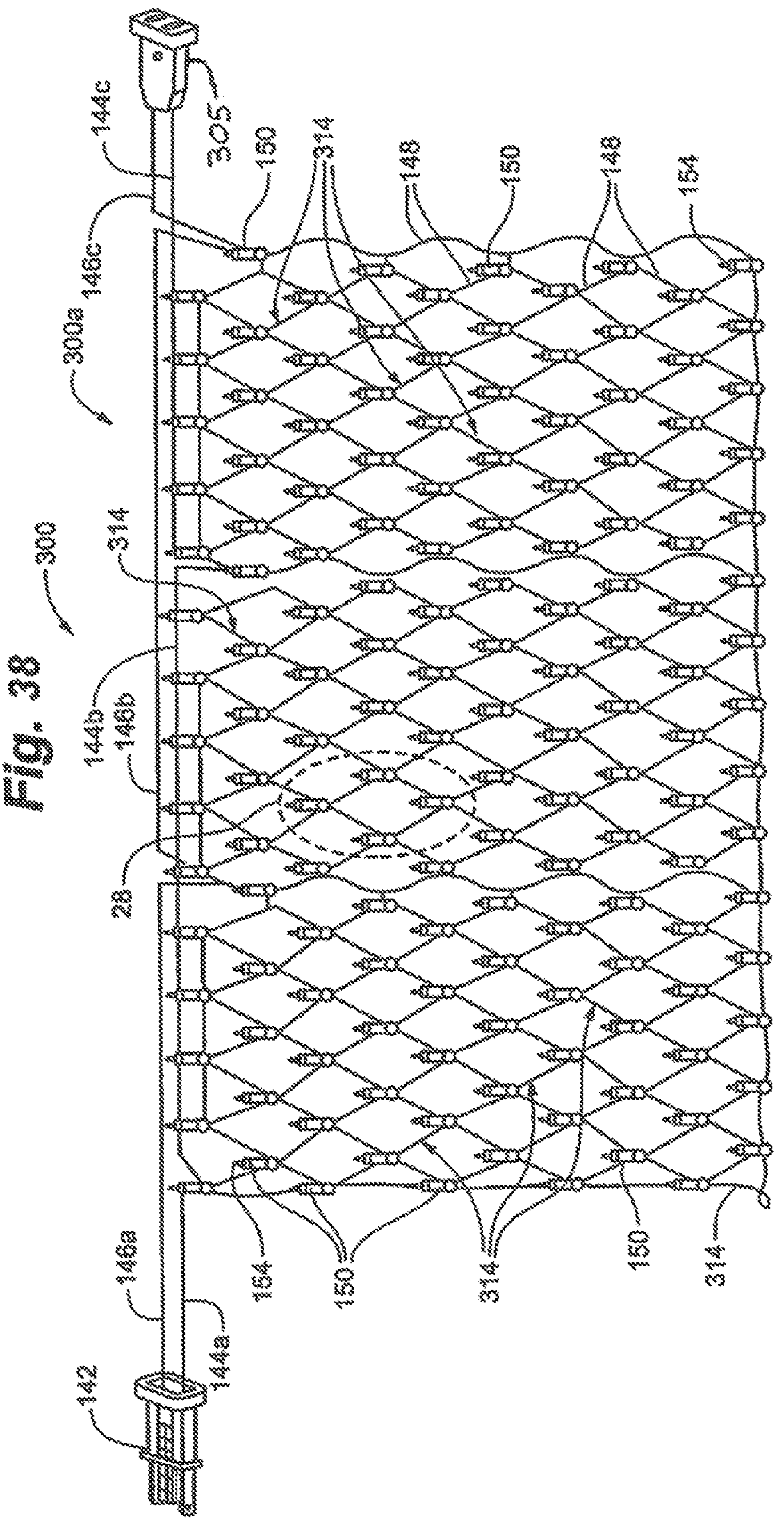
FIG. 38 is a front view of a reinforced-wire net light, according to an embodiment of the claimed invention.
Figure 39:
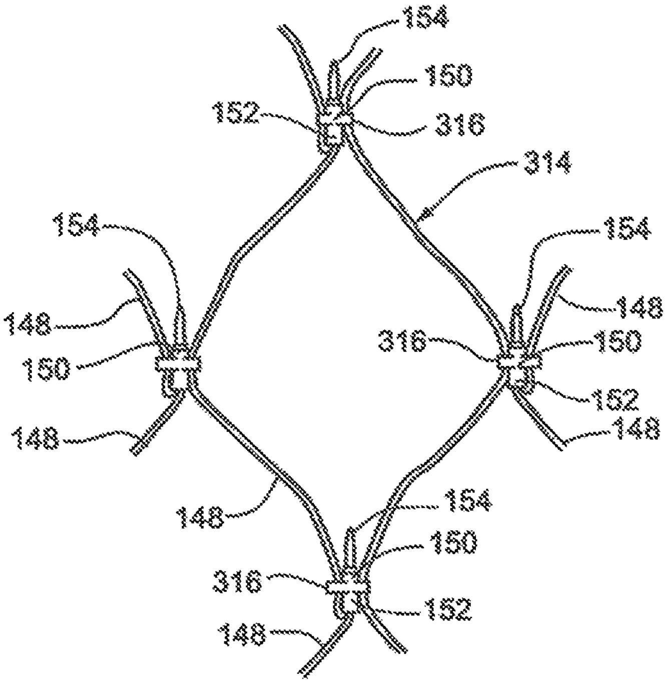
FIG. 39 is a front view of a portion of the reinforced-wire net light of FIG. 38.
Figure 40:
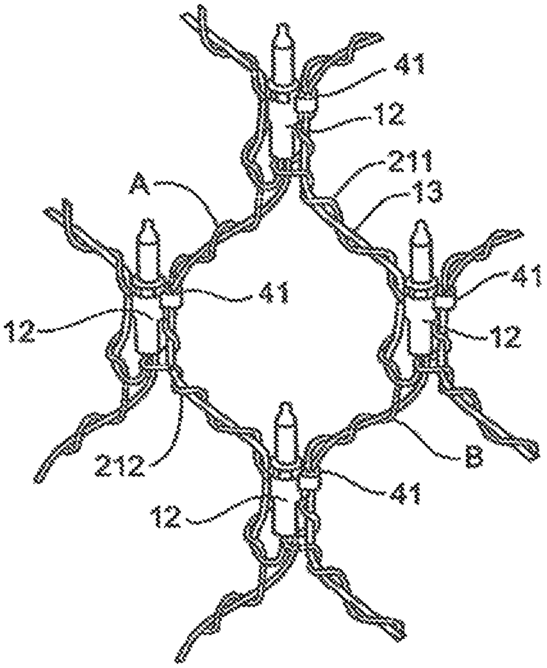
Fig. 40 Prior Art
FIG. 40 is a front view of a portion of a prior-art net light.

Referring to FIGS. 37-39 and 41-45, embodiments of reinforced-wire net light 300 is depicted. Net light 300 generally comprises a patterned array of lamp elements 154 and reinforced wires 100 forming a two-dimensional decorative lighting structure. Known net lights typically require some kind of reinforcing strands wrapped about the various wiring segments so as to provide additional strength. FIG. 40 depicts a portion of a prior-art design of a net light that includes non-conductive strands A and B wrapped about each wire segment, such as wire segment 13. While embodiments of reinforced-wire net light 300 could include non-conductive strands wrapped about conductive wire segments for even more strength, the use of reinforced wire 100 reduces or eliminates the need for such non-conductive strands wrapped about the net wires.

Figure 37:
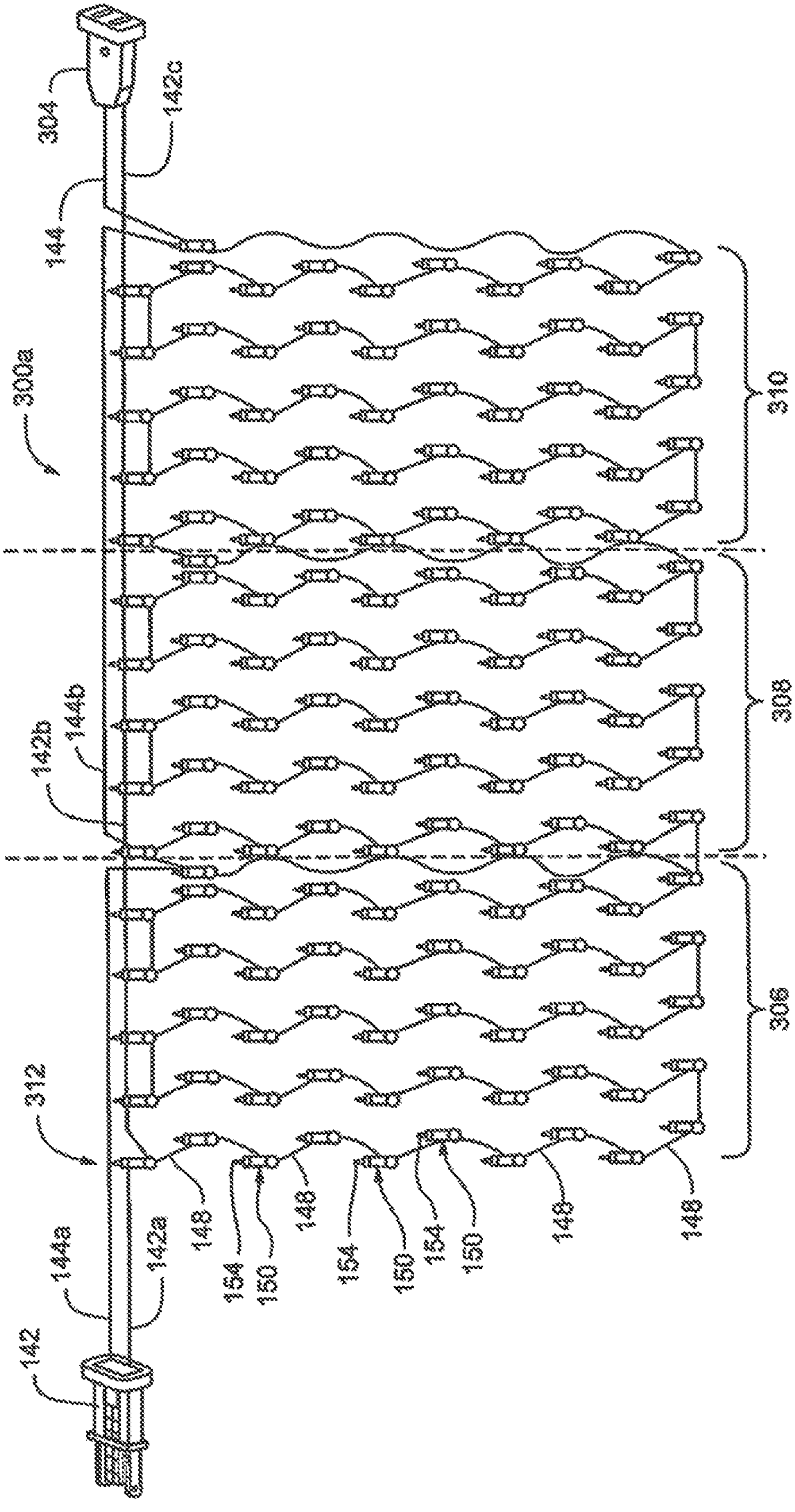
FIG. 37 is a front view of a sub-net of a reinforced-wire net light, according to an embodiment of the claimed invention.
Figure 41:
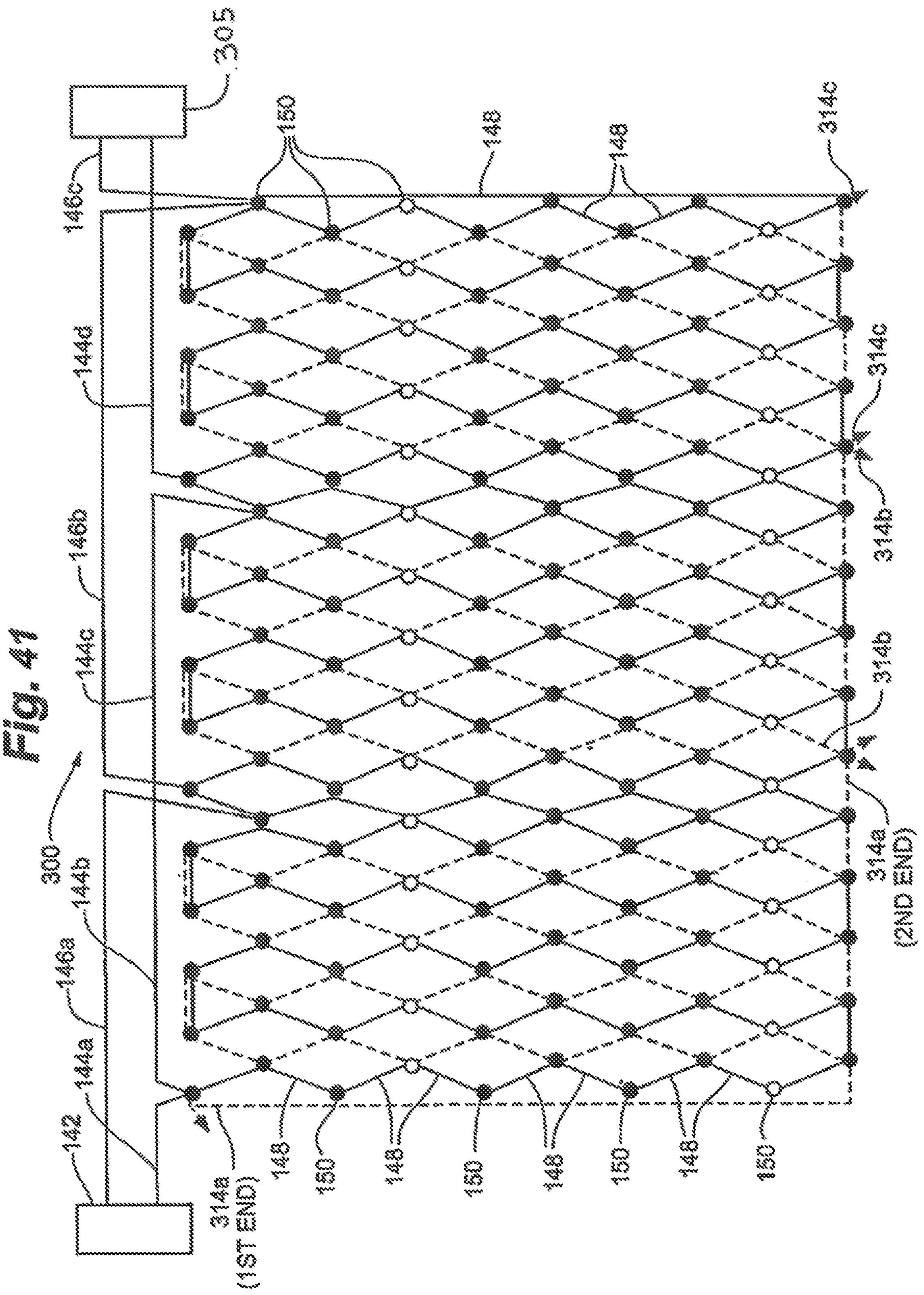
FIG. 41 is a schematic of the reinforced-wire net light according to FIG. 38.

FIG. 37 depicts sub-net 300*a* depicting an embodiment of a wiring layout, while FIGS. 38 and 41 depict completed net light 300 comprising sub-net 300*a* with pattern-support cords 302. FIG. 39 depicts a portion of net light 300 illustrating an embodiment of a connection scheme for attaching and aligning pattern-support cords 302 to sub-net 300.

Referring specifically to FIG. 37, sub-net 300*a* includes power plug 142, first power-terminal wires 144*a, b*, and *c*, second power-terminal wires 146*a, b*, and *c*, end connector 305, and three light sets 306, 308, and 310, of lamp assemblies 150. End connector 305 is electrically connected to power plug 142 and configured to receive a power plug 142 of a second net light or other electrically powered device, thereby providing power to such a device when power plug 142 is connected to an external power source.

In the embodiment depicted, first light set 306, second light set 308, and third light set 310 each include 50 lamp assemblies 150, and a plurality of intermediate, light-connecting wires 148, as well as first and second power-terminal wires 144 and 146. As described above, each lamp assembly 150 includes a lamp element 154, which could be an incandescent light, LED, or other light source. As depicted, lamp elements 154 of each set are electrically connected in series, while each set 306, 308, and 310 are electrically connected to one another in parallel, thereby forming a series-parallel light set. It will be understood that reinforced net lights of the claimed invention are not limited to series-parallel electrical configurations, and as described above with respect to reinforced decorative light strings 140, may include other electrical configurations such as series, parallel, parallel-series, and combinations thereof. Similarly, embodiments of sub-net 300*a* and net light 300 are not limited to the specific quantity of lamp elements 150 and light sets 306-308 depicted.

In the embodiment depicted, lamp assemblies 150 are arranged in a matrix pattern with lamp assemblies 150 aligned horizontally in rows, and lamp assemblies aligned in columns vertically, with sub-net 300*a* and net light 300 forming a two-dimensional rectangular shape. As also depicted, and referring to column 312, every other lamp assembly 150 is staggered from another in a left-to-right pattern so as to create a diamond pattern as depicted (and further described) with respect to FIG. 38. In other embodiments, sub-net 300*a* and net light 300 is not limited to a rectangular shape, and may form a square, triangle, polygonal, or other shape. Further, sub-net 300*a* and net light 300 is not limited to a diamond pattern, and could define a square or other pattern.

Referring specifically to FIGS. 38, 39 and 41, an embodiment of reinforced-wire net light 300 is depicted. Reinforced-wire net light 300 includes sub-net 300*a* and one or more pattern-support cords 314.

Pattern-support cords 314 may comprise a cord, strand, twine, fiber, rope, wire, or other flexible, cord-like material coupled to sub-net 300*a*. Support cord 314 may comprise any of a variety of materials, including polymeric material, such as PVC, PE, PET, and so on. In an embodiment support cords 314 comprise the same material as reinforcing strands 104 of reinforced wire 100. In an embodiment, support cord 314 has a diameter that is approximately the same as the diameter of conducting wires 148; in an embodiment, the diameter of support cord 314 ranges from 50% to 150% of the diameter of wires 148; in an embodiment, support cords 314 have substantially the same coloring as conducting wires 148 so as to appear to be actual conducting wires, thereby enhancing the appearance of net light 300.

In an embodiment, one or more support cords 314 are strung vertically, from a top (side with plug 142) to a bottom of sub-net 300*a*, alternately connecting lamp assemblies 150. Referring specifically to FIG. 39, a support cord 314 is depicted as coupled to three lamp holders 152. In an embodiment, each lamp holder 152 includes a clip portion 316 that clips support cord 314 to lamp holder 152 and lamp assembly 150. In the embodiment depicted, a support cord 314 forms a zig-zag, or back-and-forth pattern as it alternately couples to lamp holders 152 of net light 300. Support cords 314 may also connect horizontal portions of net light 300 as depicted.

The addition of support cords 314 to sub-net 300*a* provides the structural connections to the sub-net to form the final three-dimensional "net" shape with its diamond, square, or other pattern. Unlike known net lights that require support cords also be wrapped about wires 148 to supplement the lower tensile strength of the non-reinforced wiring, embodiments of reinforced-wire net lights 300 do not require that support cords or other external reinforcing strands be wrapped about wires 148.

FIG. 41 depicts a wire-cord schematic of reinforced net light 300, wherein dotted lines represent support cords 314, solid lines represent reinforced decorative wires, including wires 144 (which include first power wires 144*a*-144*d*), 146 (which include second power wires 146*a*-146*d*), and intermediate wires 148, and circles represent lamp assemblies 150. In the depicted embodiment, three individual, continuous strands of support cord 314 are used, 314*a*, 314*b*, and 314*c*. In other embodiments, more lengths of cord 314 may be used, and any of cords 314*a, b*, or *c* may comprise multiple portions. In this depiction, solid lines intersecting approximately a center of a circle indicate that the wire is electrically connected to the lamp assembly, while solid lines contacting a side of a circle indicate that the wire is not electrically connected to the lamp assembly but is adjacent to, and in embodiments, connected to the lamp assembly.

Such a layout of wires and cords provides minimal overlap of wiring and cord, thereby minimizing the amount and length of wire used, and also providing an aesthetically pleasing uniform appearance.

Further, in an embodiment of reinforced net light 300, all wires, including wires 144, 146 and 148 may comprise reinforced wire 100; in other embodiments, only some wires may comprise reinforced wire 100. In one such embodiment, only wires 144 and 146 may comprise reinforced wire 100 as these wires are more likely to be subjected to unusual pulling forces due to their connections to power plug 142 and end connector 305. In one such embodiment, one some of power wires 144 and 146 comprise reinforced wire 100, such as only wires 144*a* and 146*a*. In another embodiment, only wires 148 extending between lamp assemblies 150 may comprise reinforced wire 100, while power wires 144 and 146 do not comprise reinforced wire 100. In one such embodiment, power wires 144 and 146 do not comprise reinforce wire 100 because wires 144 and 146 may be twisted together for added strength, unlike wires 148 which generally are not twisted about one another.

In an embodiment, each of four lamp assemblies 150 define a diamond shape, as depicted. In such an embodiment, an end of cord 314, end 314*a* is located at one corner of net 300, extends downward along a side of net 300, then extends upwardly, connected from lamp assembly 150 to lamp assembly 150 in a zig-zag pattern. Cord 314 then extends horizontally, or laterally toward the other side of net 300, then extends downwardly in a zig-zag pattern again. The up and down zig-zag pattern is repeated laterally across net 300.

In an embodiment, the majority of lamp assemblies 150 not located at the edges of net 300 connect to two wires 148, and a cord 314.

Figure 42:
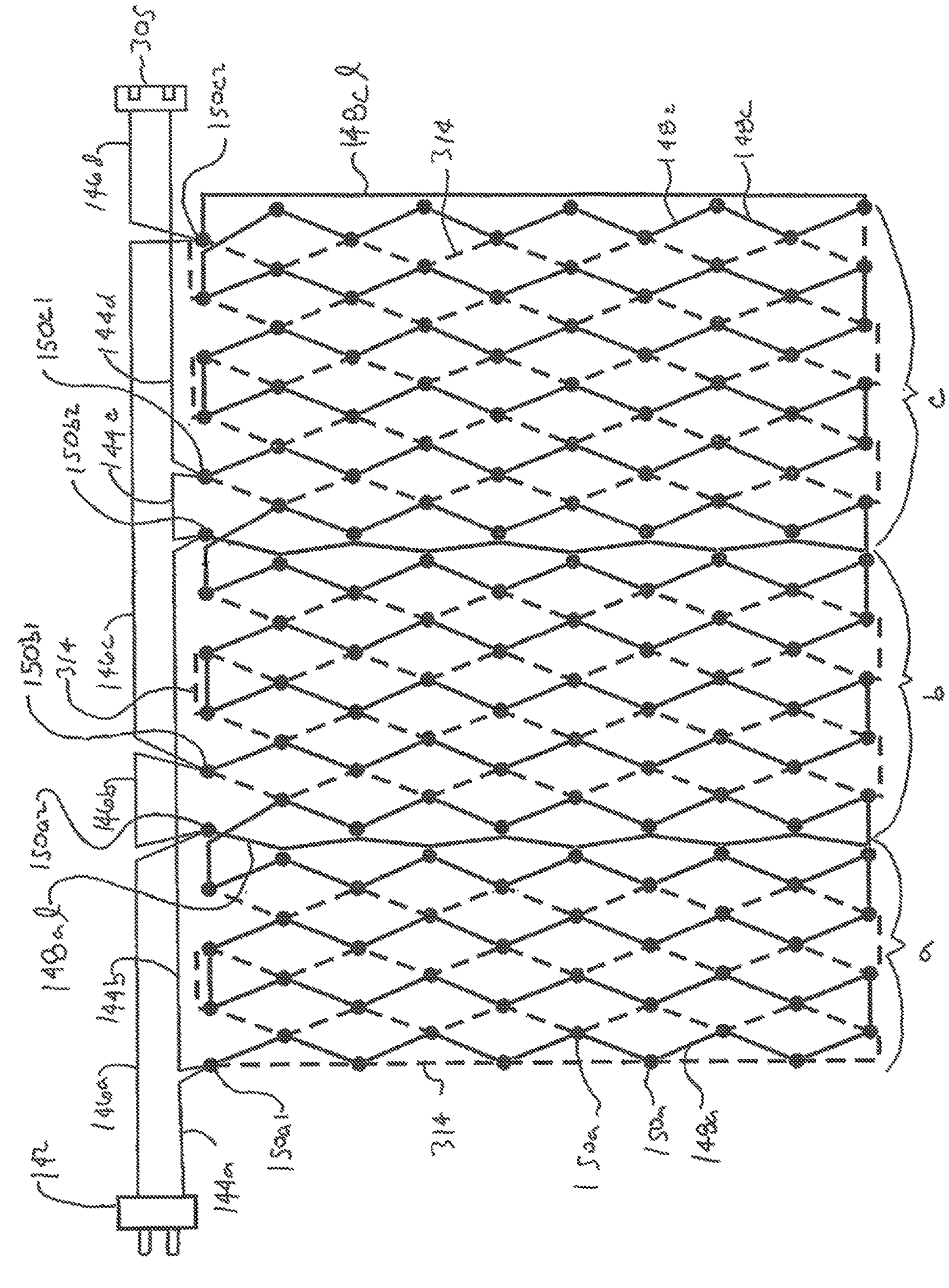
FIG. 42 is a schematic of another embodiment of a reinforced-wire net light.

Referring to FIG. 42, another embodiment of a net light 300 is depicted. Net light 300 of FIG. 42 is substantially the same as net light 300 of FIGS. 38 and 41, with the exception of some wiring configuration and connection configurations.

Net light 300 similarly includes three circuits, circuits a, b, and c. Each circuit a, b, and c comprises multiple light assemblies 150 (150*a* for circuit a, 150*b* for circuit b, and 150*c* for circuit c) wired in series, with intermediate wires 148*a, b, c*, respectively interconnecting the lamp assemblies. Some intermediate wires 148 extend from a top portion of net light 300 to a bottom portion (wires 148*al*, 148*bl*, and 148*cl*). In an embodiment, reinforced net light 300 of FIG. 42 also includes external support cords 314, similar to the configuration of reinforced net light 300 of FIG. 41.

Net light 300 also includes first power wires 144*a*, 144*b*, 144*c*, and 144*d*, and second power wires 146*a*, 146*b*, 146*c*, and 146*d*. Reinforced net light 300 of FIG. 42 differs somewhat from reinforced net light 300 of FIG. 41 at least in the aspect of the electrical connection point of first and second power wires 144/146 and lamp assemblies 150. In the depicted embodiment of FIG. 42, first power wires 144*a* and 144*b* connect at a common lamp assembly 150*al*, first power wires 144*b* and 144*c* connect at a common lamp assembly 150*bl*, first power wires 144*c* and 144*d* connect at a common lamp assembly 150*cl*. Second power wires 146*a* and 146*b* connect at a common lamp assembly 150*a*2, second power wires 146*b* and 146*c* connect at a common lamp assembly 150*b*2, second power wires 146*c* and 148*d* connect at a common lamp assembly 150*c*2.

In an embodiment, first power wires 144*a-d* and second power wires 146*a-d* are configured to conduct a greater electrical current than each of intermediate wires 148, similar to embodiments of light strings 140 as described above. In an embodiment, only intermediate wires 148 comprise reinforced wire 100 for reasons similar to those described above with respect to FIGS. 22, 26, and 27, and may have a lower ampacity than those of power wires 144 or 146, or other non-intermediate wires. In one such embodiment, intermediate wires 148 comprise reinforced wire configured for a first ampacity, and power wires 144 and 146 are configured for a second, higher ampacity, and do not comprise reinforced wire. In one such embodiment, a sum of the cross-sectional area of conductor strands 104 of either of a power wire 144 or 146 is greater than a sum of the cross-sectional area of all of conductor strands 104 of an intermediate wire 148, wherein "cross-sectional" refers to a section normal to a wire axis A. In one such embodiment power wires 144 and 146 in a non-reinforced configuration will generally be configured such that their inherent strength is similar to, approximately the same as, or greater than, the strength of individual reinforced intermediate wires 148. In such a configuration, it may not be necessary to reinforce power wires 144 and 146 since the outcome would be to have power wires that may be unnecessarily stronger than wires 148.

Figure 43:
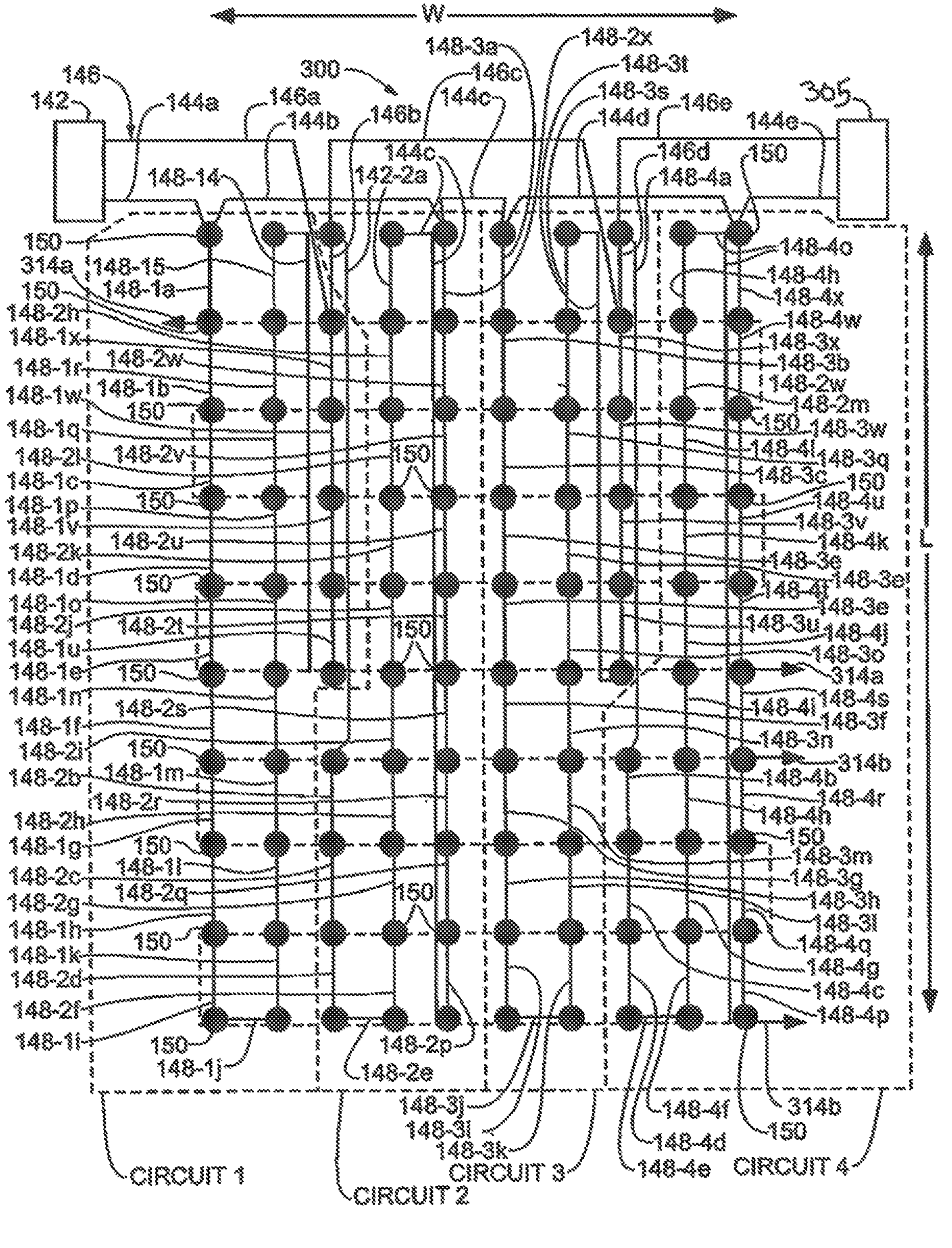
FIG. 43 is a schematic of another embodiment of a reinforced-wire net light.
Figure 44:
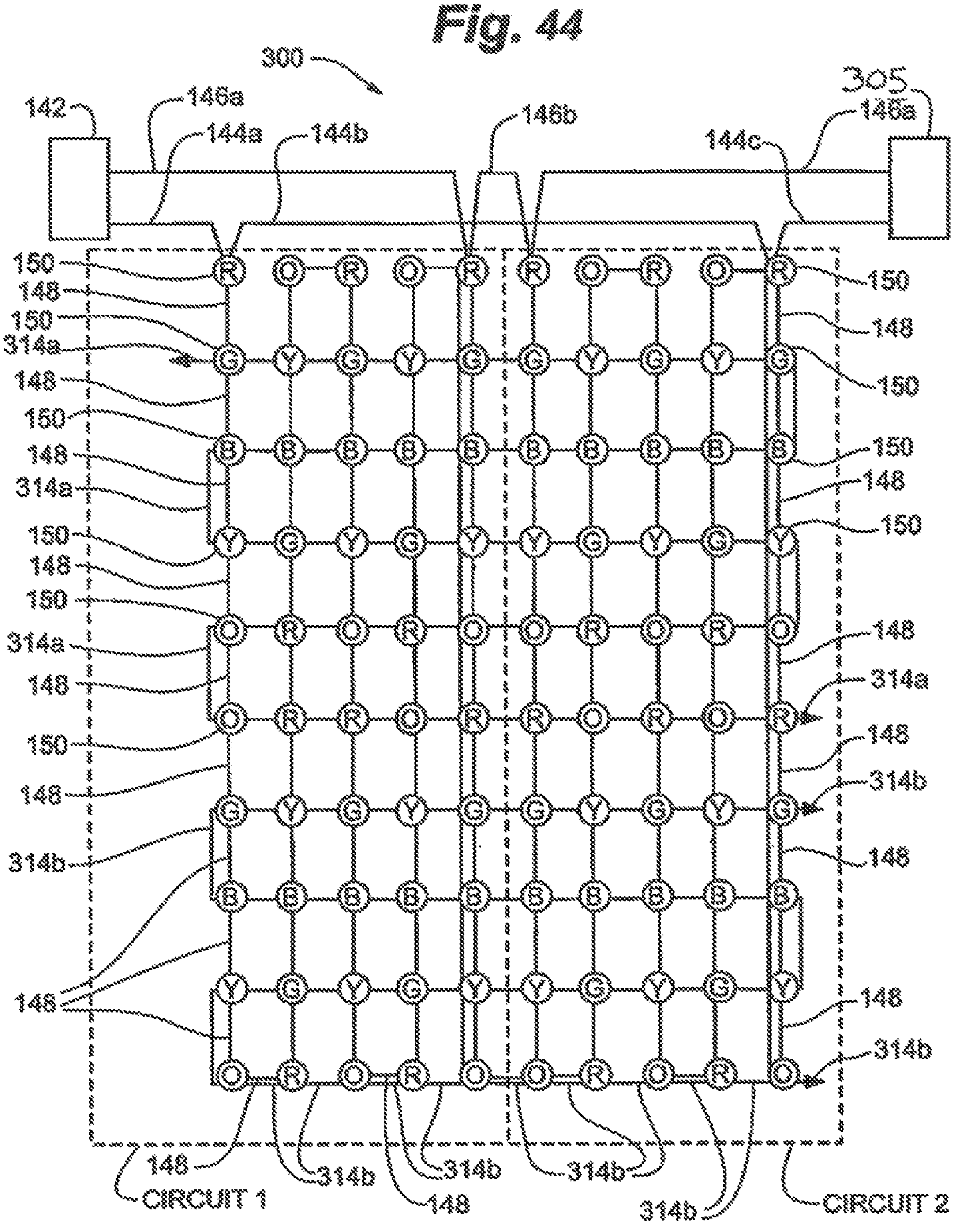
FIG. 44 is a schematic of yet another embodiment of a reinforced-wire net light
Figure 45:
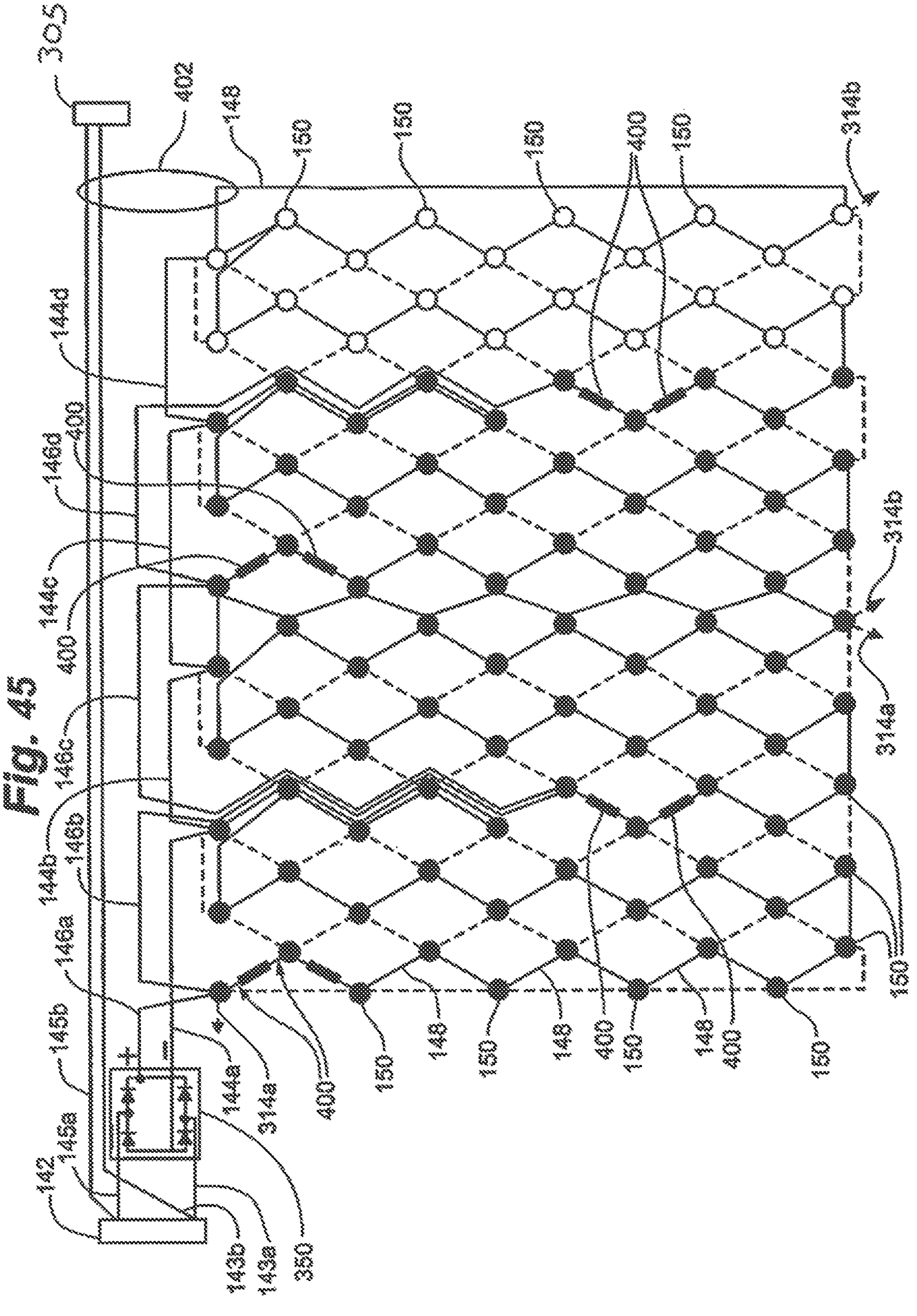
FIG. 45 is a schematic of an LED-based net light with reinforced wire.

FIGS. 43-45 depict additional embodiments of net light 300.

Referring to FIG. 45, a wire-cord schematic of a net light 300 having 100 lamp assemblies 150 is depicted. In this embodiment, net light 300 defines a rectangular perimeter shape, with smaller rectangular shapes formed by sets of four lamp assemblies 150 in an interior of net light 300. Connections between wires, cords, and lamp assemblies are substantially similar to those described above.

In this embodiment, dashed lines represent cords 314, solid lines represent wires, some or all of which may comprise reinforced decorative light wire 100, and circles represent lamp assemblies 150. In this embodiment, a majority of wires 148 extend in a first direction, which for purposes of description will herein be referred to as a "lengthwise" direction along length L, while the majority of cord or portions or cord 314, extend in a second direction, referred to as a "widthwise" direction along width W. In such an embodiment, most wire extends transverse to, or as depicted, perpendicular to, adjacent portions of cord 314.

In the embodiment depicted, cord 314 comprises two portions, cord portion 314*a* and cord portion 314*b*. Arrowheads represent ends of cord portions. Each cord portion extends horizontally from lamp assembly 150 to lamp assembly 150, across a width of net light 300, then vertically to a next lamp assembly 150, then back across the width W of net light 300. In an embodiment, each or cord portions 314*a* and 314*b* comprise contiguous cords. In other embodiments, each cord portion 314*a* or 314*b* may comprise multiple sub-portions of cords.

In this embodiment, net light 300 comprises 100 lamp assemblies 150, made up of 4 circuits, each circuit comprising 25 lamp assemblies in series with one another (the first to fourth series circuits labeled as Circuit 1 to Circuit 4). In the depicted embodiment, each of the four circuits are wired in parallel to one another. In an embodiment, and as depicted, Circuit 1 comprises 25 lamp assemblies 150, intermediate wires 148-1*a* to 148-1*x* and power wires 144*a* and 146*a*); Circuit 2 comprises 25 lamp assemblies 150, intermediate wires 148-2*a* to 148-2*x* and power wires 144*b* and 146*b*; Circuit 3 comprises 25 lamp assemblies 150, intermediate wires 148-3*a* to 148-3*x* and power wires 144*c* and 146*c*; and Circuit 4 comprises 25 lamp assemblies 150, intermediate wires 148-4*a* to 148-3*x* and power wires 144*d* and 146*d*. End connector 305 is electrically connected to power wires 144*e* and 146*e* to make power available to other lighted devices at an end opposite plug 142.

FIG. 44 depicts another embodiment of a net light 300 having 100 lamp assemblies 150. In this embodiment, net light 300 is substantially similar to the net light 300 depicted and described above with respect to FIG. 43, except that the net light 300 of FIG. 44 comprises two circuits of 50 lamp assemblies connected in series, Circuit 1 and Circuit 2, each of the two circuits connected in parallel to one another. In the depicted embodiment, lamp assemblies comprise a variety of colors, as indicated by letter designation at the circle: R for red, G for green, B for blue, Y for yellow, and O for orange. In such an embodiment, lamp assemblies may be arranged in a color pattern as depicted. Further, although only two circuits are depicted, it will be understood that more than two circuits may be used, and further that net light 300 and its circuits may comprise any of a variety of electrical connections, including series circuits wired in parallel (depicted), parallel circuits wired in series, all parallel, or all series.

FIG. 45 depicts yet another embodiment of a net light 300. In this embodiment, net light 300 comprises LED-based lamp assemblies 150. LED-based lamp assemblies 150 operate on DC power supplied by power conditioning circuit 350, which may comprise a rectifier circuit, as depicted, a transformer, or other such power conversion or conditioning circuit. As depicted, net light 300 comprises power plug 142, incoming power wires 143*a*, 143*b*, 145*a*, and 145*b*, power-conditioning circuit 350, first and second power wire sets 144 and 146 delivering negative and positive polarity power, respectively, to lamp assemblies 150 via intermediate wires 148. In the depicted embodiment, net light 300 comprises four 25 lamp circuits, each circuit having lamp assemblies 150 wired in series, each circuit or group of lamp assemblies 150 wired in parallel.

In an embodiment, net light 300 may also include current-limiting resistors 400. In one such embodiment, and as depicted, each circuit includes one or more current-limiting resistors 400 wired in series with lamps 150.

Further, in the embodiment depicted, net light 300 may receive an incoming power, such as an AC power, that is rectified or conditioned by circuit 350, thereby supplying DC power to lamps 150. At the same time, the incoming power is also transmitted to an end connector plug 304, such that both AC and DC power flow through net light 300 and are available for use.

Net light 300 also includes support cords 314, including cords 314*a* and 314*b*. Similar to the embodiments described above, the amount or length of cord 314 wrapped about wires 148 is minimal. As depicted, only several perimeter wires 148 at opposite ends are adjacent, intertwined, or wrapped about cords 314.

In an embodiment, net light 300 may also comprise restraining cord 402 that structurally couples a perimeter wire 148 conducting DC power to power wires 145*a* and 145*b*.

In an embodiment, any of the net light configurations described above may include reinforced wire 100 that can withstand 46 lbf axially-applied pulling force before breaking; in one such embodiment, an average axially-applied pulling force before breakage averages 56 lbf+/−10%.

Figure 46:
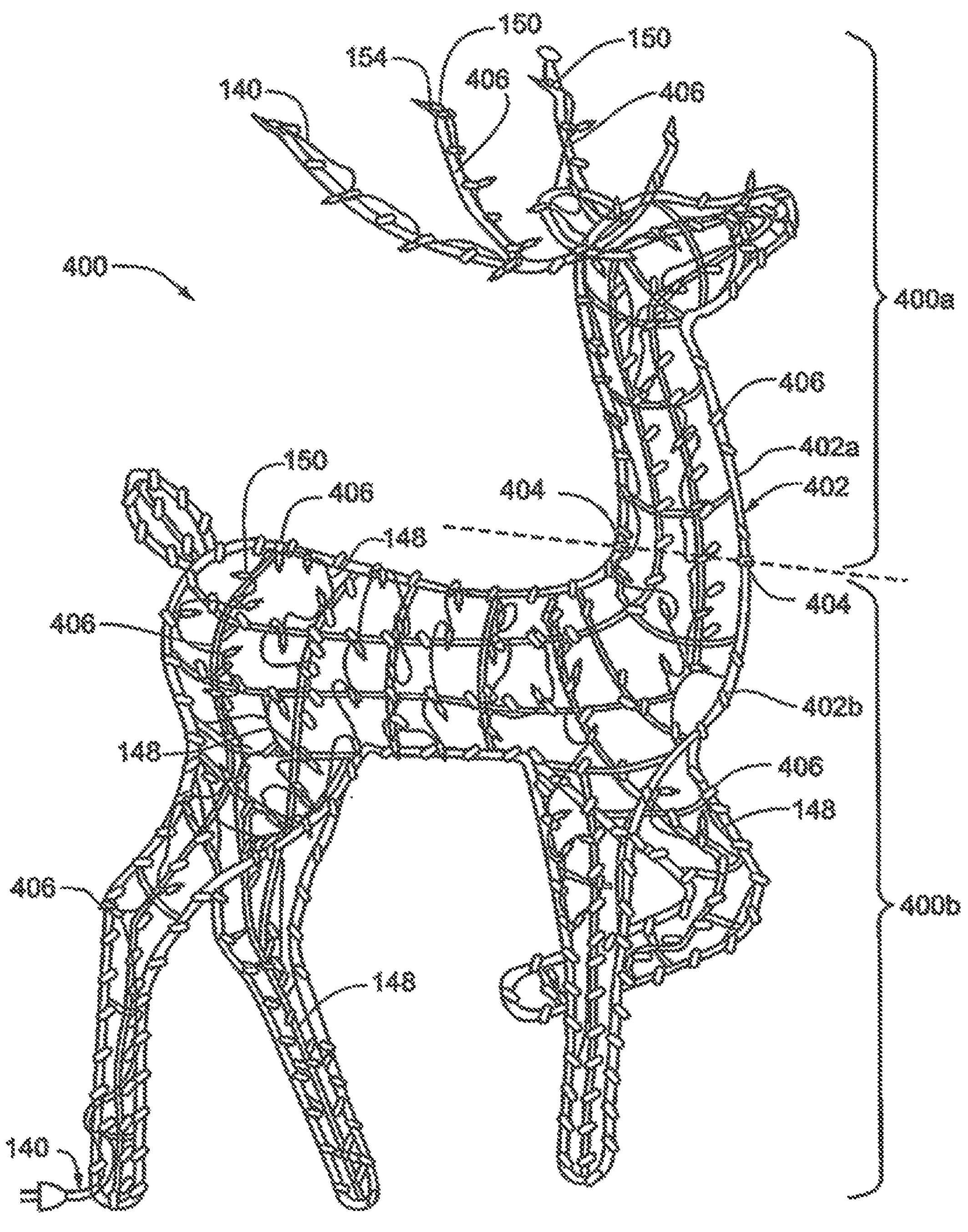
FIG. 46 is a front view of a reinforced-wire decorative sculpture, according to an embodiment of the claimed invention.

Referring to FIG. 46, an embodiment of a reinforced-wire decorative-lighting sculpture 400 is depicted.

Reinforced-wire decorative lighting sculpture 400 includes one or more reinforced decorative light strings 140 coupled to frame 402. Sculpture 400 may comprise multiple portions, such as an upper or first portion 400*a* and a lower or second portion 400*b*, as depicted. In an embodiment, first portion 400*a* may be fully or partially separable from second portion 400*b* at coupling devices 404, which may be comprise clips, hooks, hinges, or other such coupling devices, or combinations thereof.

Frame 402, in an embodiment, comprises a generally rigid material, such as metal or plastic, or a natural material such as grapevine, configured to maintain a frame shape. Shapes include animals, such as the deer depicted, human figures or characters, icons such as stars, snowflakes, or other such shapes. Frame 402 may include multiple portions, such as first frame portion 402*a* corresponding to first sculpture portion 400*a* and second frame portion 402*b* corresponding to second sculpture portion 400*b*.

One or more reinforced decorative light strings 140, such as those described above, may be fastened or draped onto frame 402. When reinforced light strings 140 are fastened onto frame 402, sculpture 400 may include a plurality of frame clips 406 coupling wires 148 of a reinforced decorative light string 140 to frame 402.

The use of reinforced decorative light strings 140, including reinforced wire 100, provides benefits over known decorative-lighting sculptures, particularly those that have separable portions, such as sculpture portions 400*a* and 400*b*. Lighted sculptures often are separable so that the sculpture may be taken apart, or otherwise broken down into a storage position. The movement and manipulation of the frame portions may cause portions of the light strings to be pulled. Because embodiments of reinforced-wire decorative sculpture 400 include reinforced decorative light strings 140 having increased tensile strength, any unexpected strains applied to reinforced light strings 140 are less likely to cause wires 148 to break, thereby causing the set to fail and/or become a safety hazard. As described above, all wires of light string 140 may comprise reinforced decorative light wiring 100, or only some wires may comprise reinforced wire, such as only wires 144 and 146; in other embodiments only wires 144 and 146 and selected wires 148 are reinforced. In such an embodiment, intermediate wires 148 that extend from one sculpture portion or frame portion to another sculpture portion of frame portion may be reinforced wire 100, while other wires 148 do not comprise reinforced decorative light wire 100. Such an embodiment may not be limited to reinforced wires 148 that span sculpture or frame sections, but rather, wires 148 that may be expected to be subjected to pulling forces due to their location, position, function, and so on, may comprise reinforced wire. In another embodiment, only some intermediate wires 148 comprise reinforced wire 100, such as wires 148 extending between sculpture or frame sections, while other wires 148 and wires 144 and 146 do not comprise reinforced wire 100.

Further, in an embodiment of a sculpture 400, only wires 148 extending between lamp assemblies 150 may comprise reinforced wire 100, while power wires 144 and 146 do not comprise reinforced wire 100. In one such embodiment, power wires 144 and 146, and other wires, do not comprise reinforce wire 100 because wires 144 and 146 may be twisted together for added strength, unlike wires 148 which generally are not twisted about one another.

In an embodiment, any of the net light configurations described above may include reinforced wire 100 that can withstand 30 lbf axially-applied pulling force before breaking; in one such embodiment, an average axially-applied pulling force before breakage averages 33 lbf+/−10%.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A decorative lighting assembly, comprising:

a plurality of internally-reinforced decorative-lighting wires, each of the plurality of internally-reinforced decorative-lighting wires defining a lengthwise wire axis and including an outer insulation layer, a plurality of conductors, and a first reinforcing strand, wherein the outer insulation layer, plurality of conductors and the first reinforcing strand are arranged such that:

the outer insulation layer covers the plurality of conductors and the first reinforcing strand and is in direct contact with one or more of the plurality of conductors and with the first reinforcing strand; and when viewed in cross section normal to the wire axis, the plurality of conductors are arranged in an asymmetrical pattern about the wire axis; and a plurality of lamp assemblies electrically connected to one another by the plurality of internally-reinforced decorative-lighting wires, each lamp assembly including a lamp electrically connected to a first exposed plurality of conductors of a first internally-reinforced decorative-lighting wire of the plurality of internally-reinforced decorative-lighting wires at a first wire end that has been stripped of an outer insulation layer, and electrically connected to a second exposed plurality of conductors of a second internally-reinforced decorative-lighting wire of the plurality of internally-reinforced decorative-lighting wires at a second wire end that has been stripped of an outer insulation layer.

2. An artificial tree comprising the decorative lighting assembly of claim 1.

3. The decorative lighting assembly of claim 1, wherein at least a portion of the reinforcing strand lies along the wire axis.

4. The decorative lighting assembly of claim 1, wherein the reinforcing strand comprises a yarn of multiple strands or fibers.

5. The decorative lighting assembly of claim 1, wherein the reinforcing strand comprises a single, integral strand.

6. The decorative lighting assembly of claim 1, wherein the reinforcing strand comprises a single, integral strand.

7. The decorative lighting assembly of claim 1, wherein the plurality of conductors of each internally-reinforced decorative-lighting wire includes 7 to 9 conductors.

8. The decorative lighting assembly of claim 7, wherein each conductor of the plurality of conductors of each internally-reinforced decorative-lighting wire has an average diameter that is in a range of 0.15 mm to 0.16 mm.

9. The decorative lighting assembly of claim 1, wherein the plurality of conductors of each internally-reinforced decorative-lighting wire consists of 7 conductors.

10. The decorative lighting assembly of claim 9, wherein each conductor of the plurality of conductors of each internally-reinforced decorative-lighting wire has an average diameter that is in a range of 0.15 mm to 0.16 mm.

11. A decorative lighting string comprising one or more of the decorative lighting assemblies of claim 1, a power plug, and/or a power converter.

12. The decorative light string of claim 11, wherein the plurality of lamp assemblies are electrically connected to one another in parallel, and wherein the decorative light string includes another plurality of lamp assemblies electrically connected to one another in parallel, and the plurality of lamp assemblies is electrically connected to the other plurality of lamp assemblies in series.

13. An artificial tree comprising the decorative lighting assembly of claim 12.

14. A lighted artificial tree, comprising:

a first trunk portion defining a first central axis, a first plurality of branches connected to the first trunk portion, and a first decorative lighting string on the branches, the first decorative lighting string including;

a plurality of internally-reinforced decorative-lighting wires, each of the plurality of internally-reinforced decorative-lighting wires defining a lengthwise wire axis and including an outer insulation layer, a plurality of conductors, and a first reinforcing strand, wherein the outer insulation layer, plurality of conductors and the first reinforcing strand are arranged such that:

the outer insulation layer covers the plurality of conductors and the first reinforcing strand and is in direct contact with one or more of the plurality of conductors and with the first reinforcing strand; and when viewed in cross section normal to the wire axis, the plurality of conductors are arranged in an asymmetrical pattern about the wire axis; and a plurality of lamp assemblies electrically connected to one another by the plurality of internally-reinforced decorative-lighting wires, each lamp assembly including a lamp electrically connected to a first exposed plurality of conductors of a first internally-reinforced decorative-lighting wire of the plurality of internally-reinforced decorative-lighting wires at a first wire end that has been stripped of an outer insulation layer, and electrically connected to a second exposed plurality of conductors of a second internally-reinforced decorative-lighting wire of the plurality of internally-reinforced decorative-lighting wires at a second wire end that has been stripped of an outer insulation layer.

15. The artificial tree of claim 14, further comprising a first trunk electrical connector positioned within an interior cavity of the first trunk portion and in electrical connection with the decorative lighting string via the plurality of internally-reinforced decorative-lighting wires.

16. The artificial tree of claim 15, further comprising a second trunk portion, a second plurality of branches connected to the second trunk portion, a second trunk electrical connector and a second lighting string, the second trunk portion configured to connect to the first trunk portion, and the second trunk electrical connector configured to make an electrical connection at the same time that the first trunk portion is mechanically connected to the second trunk portion, thereby electrically connecting the first and second trunk electrical connectors and the first and second decorative lighting strings.

17. The artificial tree of claim 14, wherein the plurality of lamp assemblies of the are electrically connected to one another in parallel, and wherein the first decorative light string includes another plurality of lamp assemblies electrically connected to one another in parallel, and the plurality of lamp assemblies is electrically connected to the other plurality of lamp assemblies in series.

18. The artificial tree of claim 17, wherein the first plurality of branches are pivotally connected to the first trunk portion, and the first plurality of branches includes a first set of branches connected to the first trunk portion at a first trunk location and a second set of branches connected to the first trunk portion at a second trunk location, the second trunk location axiailly displaced from the first trunk location, and wherein the decorative lighting string is on the first set of branches and the second set of branches.

19. The artificial tree of claim 14, wherein the reinforcing strand comprises a single, integral strand.

20. The artificial tree of claim 14, wherein the reinforcing strand comprises a single, integral strand.

21. The artificial tree of claim 14, wherein the plurality of conductors of each internally-reinforced decorative-lighting wire includes 7 to 9 conductors.

22. The artificial tree of claim 21, wherein each conductor of the plurality of conductors of each internally-reinforced decorative-lighting wire has an average diameter that is in a range of 0.15 mm to 0.16 mm.

23. The artificial tree of claim 14, wherein the plurality of conductors of each internally-reinforced decorative-lighting wire consists of 7 conductors.

24. The artificial tree of claim 23, wherein each conductor of the plurality of conductors of each internally-reinforced decorative-lighting wire has an average diameter that is in a range of 0.15 mm to 0.16 mm.

* * * * *